(12) United States Patent
Nishida et al.

(10) Patent No.: US 8,467,023 B2
(45) Date of Patent: *Jun. 18, 2013

(54) ANTI-REFLECTION FILM AND DISPLAY DEVICE

(75) Inventors: Jiro Nishida, Kanagawa (JP); Yuji Egi, Kanagawa (JP); Takeshi Nishi, Kanagawa (JP); Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,892

(22) Filed: Dec. 13, 2011

(65) Prior Publication Data
US 2012/0081909 A1 Apr. 5, 2012

Related U.S. Application Data

(63) Continuation of application No. 11/950,607, filed on Dec. 5, 2007, now Pat. No. 8,102,494.

(30) Foreign Application Priority Data

Dec. 5, 2006 (JP) .................................. 2006-327789

(51) Int. Cl.
*G02F 1/1335* (2006.01)
(52) U.S. Cl.
USPC ........................................................ 349/137
(58) Field of Classification Search
None
See application file for complete search history.

(56) References Cited

U.S. PATENT DOCUMENTS

| | | |
|---|---|---|
| 4,721,361 A | 1/1988 | Van De Ven |
| 4,883,343 A | 11/1989 | Teshirogi |
| 5,657,408 A | 8/1997 | Ferm et al. |
| 5,805,252 A | 9/1998 | Shimada et al. |
| 5,909,314 A | 6/1999 | Oka et al. |
| 5,939,826 A | 8/1999 | Ohsawa et al. |
| 6,064,524 A | 5/2000 | Oka et al. |
| 6,255,705 B1 | 7/2001 | Zhang et al. |

(Continued)

FOREIGN PATENT DOCUMENTS

| | | |
|---|---|---|
| EP | 1 215 513 A1 | 6/2002 |
| JP | 07-168006 | 7/1995 |

(Continued)

OTHER PUBLICATIONS

International Search Report No. PCT/JP2007/073285 dated Jan. 8, 2008.

(Continued)

*Primary Examiner* — Wen-Ying P Chen
(74) *Attorney, Agent, or Firm* — Nixon Peabody LLP; Jeffrey L. Costellia

(57) ABSTRACT

An anti-reflection film that can provide high visibility and has an anti-reflection function by which reflection of incident light from external can be further reduced, and a display device having such an anti-reflection film. A plurality of contiguous pyramidal projections is arranged in a geometric pattern, so that reflection of incident light is prevented. In addition, a protective layer formed of a material having a lower refractive index than the pyramidal projections is provided so as to fill a space between the plurality of pyramidal projections. The plurality of pyramidal projections has a hexagonal shape and can be densely arranged with no space therebetween. Further, since six sides of each pyramidal projection are provided at a different angle from the base, light can be effectively scattered in many directions.

24 Claims, 36 Drawing Sheets

U.S. PATENT DOCUMENTS

| | | | |
|---|---|---|---|
| 6,261,665 B1 | 7/2001 | Murata et al. |
| 6,340,404 B1 | 1/2002 | Oka et al. |
| 6,417,831 B2 | 7/2002 | Kashima |
| 6,426,787 B1 | 7/2002 | Satake et al. |
| 6,433,841 B1 | 8/2002 | Murade et al. |
| 6,468,844 B1 | 10/2002 | Yamazaki et al. |
| 6,576,926 B1 | 6/2003 | Yamazaki et al. |
| 6,635,986 B2 | 10/2003 | Yaniv et al. |
| 6,717,359 B2 | 4/2004 | Kimura |
| 6,777,254 B1 | 8/2004 | Yamazaki et al. |
| 6,811,274 B2 | 11/2004 | Olczak |
| 6,825,896 B2 | 11/2004 | Goto et al. |
| 6,833,665 B2 | 12/2004 | Wachi et al. |
| 6,879,365 B2 | 4/2005 | Hedrick |
| 6,951,400 B2 | 10/2005 | Chisholm et al. |
| 7,034,808 B2 | 4/2006 | Sakata et al. |
| 7,094,452 B2 | 8/2006 | Yamashita et al. |
| 7,142,361 B2 | 11/2006 | Olofson et al. |
| 7,151,580 B2 | 12/2006 | Ueki et al. |
| 7,248,324 B2 | 7/2007 | Ono et al. |
| 7,253,955 B2 | 8/2007 | Watanabe et al. |
| 7,259,110 B2 | 8/2007 | Ohnuma et al. |
| 7,261,931 B2 | 8/2007 | Nishikawa et al. |
| 7,270,883 B2 | 9/2007 | Kato |
| 7,297,386 B2 | 11/2007 | Suzuki et al. |
| 7,301,264 B2 | 11/2007 | Ohsawa |
| 7,456,557 B2 | 11/2008 | Park et al. |
| 7,659,669 B2 | 2/2010 | Nishida et al. |
| 7,695,168 B2 | 4/2010 | Gueyvandov et al. |
| 7,781,768 B2 | 8/2010 | Sakakura et al. |
| 8,004,637 B2 | 8/2011 | Kawata et al. |
| 8,053,987 B2 | 11/2011 | Egi et al. |
| 8,102,494 B2 | 1/2012 | Nishida et al. |
| 2001/0030638 A1 | 10/2001 | Kashima |
| 2002/0044356 A1 | 4/2002 | Arakawa et al. |
| 2002/0089750 A1 | 7/2002 | Hoshi |
| 2002/0101155 A1 | 8/2002 | Kimura |
| 2003/0102286 A1 | 6/2003 | Takahara et al. |
| 2003/0169386 A1 | 9/2003 | Goto et al. |
| 2003/0180476 A1 | 9/2003 | Yamashita et al. |
| 2004/0109303 A1 | 6/2004 | Olczak |
| 2004/0109305 A1 | 6/2004 | Chisholm et al. |
| 2004/0191478 A1 | 9/2004 | Nishikawa et al. |
| 2004/0201795 A1 | 10/2004 | Paukshto |
| 2004/0227446 A1 | 11/2004 | Fujimoto et al. |
| 2005/0030461 A1 | 2/2005 | Ono et al. |
| 2005/0053790 A1 | 3/2005 | Kato |
| 2005/0074579 A1 | 4/2005 | Suzuki et al. |
| 2005/0094277 A1 | 5/2005 | Khusnatdinov et al. |
| 2005/0190321 A1 | 9/2005 | Ohsawa |
| 2005/0245078 A1 | 11/2005 | Ohnuma et al. |
| 2006/0012736 A1 | 1/2006 | Nishino et al. |
| 2006/0050387 A1 | 3/2006 | Arakawa et al. |
| 2006/0119269 A1 | 6/2006 | Park |
| 2006/0139749 A1 | 6/2006 | Watanabe et al. |
| 2006/0172119 A1 | 8/2006 | Hayashi et al. |
| 2006/0245060 A1 | 11/2006 | Goto |
| 2006/0250064 A1 | 11/2006 | Park et al. |
| 2007/0059490 A1 | 3/2007 | Kaneko |
| 2007/0115573 A1 | 5/2007 | Gueyvandov et al. |
| 2007/0131928 A1 | 6/2007 | Kwak et al. |
| 2007/0284991 A1 | 12/2007 | Egi et al. |
| 2008/0001156 A1 | 1/2008 | Sakakura et al. |
| 2008/0042926 A1 | 2/2008 | Egi et al. |
| 2008/0129183 A1 | 6/2008 | Egi et al. |
| 2008/0129184 A1 | 6/2008 | Nishida et al. |
| 2008/0129188 A1 | 6/2008 | Egi et al. |
| 2008/0129933 A1 | 6/2008 | Nishida et al. |
| 2008/0130122 A1 | 6/2008 | Egi et al. |
| 2008/0144180 A1 | 6/2008 | Nishida et al. |
| 2008/0158682 A1 | 7/2008 | Egi et al. |
| 2008/0165315 A1 | 7/2008 | Nishida et al. |
| 2010/0002306 A1 | 1/2010 | Goto |
| 2011/0134647 A1 | 6/2011 | Nishida et al. |
| 2012/0032581 A1 | 2/2012 | Egi et al. |

FOREIGN PATENT DOCUMENTS

| | | |
|---|---|---|
| JP | 08-297202 | 11/1996 |
| JP | 2001-272505 | 10/2001 |
| JP | 2002-182003 | 6/2002 |
| JP | 2002-321907 | 11/2002 |
| JP | 2003-177207 | 6/2003 |
| JP | 2003-240904 | 8/2003 |
| JP | 2003-248102 | 9/2003 |
| JP | 2003-279705 | 10/2003 |
| JP | 2003-295778 | 10/2003 |
| JP | 2004-069877 | 3/2004 |
| JP | 2004-085831 | 3/2004 |
| JP | 2004-177781 | 6/2004 |
| JP | 2004-219626 | 8/2004 |
| JP | 2004-258380 | 9/2004 |
| JP | 2004-291500 | 10/2004 |
| JP | 2005-064324 | 3/2005 |
| JP | 2005-099467 | 4/2005 |
| JP | 2005-173457 | 6/2005 |
| JP | 2005-181740 | 7/2005 |
| JP | 2005-221906 | 8/2005 |
| JP | 2005-264099 | 9/2005 |
| JP | 2006-010831 | 1/2006 |
| JP | 2006-128665 | 5/2006 |
| JP | 2006-133617 | 5/2006 |
| JP | 2006-171229 | 6/2006 |
| JP | 2006-189784 | 7/2006 |
| JP | 2008-009408 | 1/2008 |
| JP | 2008-009409 | 1/2008 |
| WO | WO 2004/051325 A1 | 6/2004 |
| WO | WO-2004/092808 A2 | 10/2004 |
| WO | WO2005/010572 A1 | 2/2005 |
| WO | WO-2005/088355 | 9/2005 |
| WO | WO-2007/139209 A1 | 12/2007 |
| WO | WO-2007/139210 A1 | 12/2007 |

OTHER PUBLICATIONS

Written Opinion of the International Searching Authority Application No. PCT/JP2007/073285 dated Jan. 8, 2008.

Machine translation of JP2006-010831A, Jan. 12, 2006.

"Development of a technique for forming an ultrafine nonreflective structure (moth-eye) useful for improving functions of a phonic device." MORITEX News Relaease, Jun. 20, 2002, MORITEX.

542
541  531  521  543

533 528 532    531    538  530   534 536 529

E 525a 503a 502  521  504  503b 525b  523 526 527 520 F

ANTI-REFLECTION FILM AND DISPLAY DEVICE

TECHNICAL FIELD

The present invention relates to an anti-reflection film with an anti-reflection function and a display device having such an anti-reflection film.

BACKGROUND ART

Some display devices having displays (such as a liquid crystal display or an electroluminescence display (hereinafter also referred to as an "EL" display)) can have low visibility when a surrounding image is reflected on the display screen due to surface reflection of incident light from external. This becomes a serious problem particularly when the display device has a larger size or the display device is used outdoors.

In order to prevent such reflection of incident light from external, a method of providing an anti-reflection film on a display screen of a display device has been developed. For example, there is known a method of providing an anti-reflection film that has a multilayer structure of layers having different refractive indices so that the film can effectively reflect light in the visible wavelength range (for example, see Reference 1: Japanese Published Patent Application No. 2003-248102). With a multilayer structure, incident light from external that is reflected at an interface between the stacked layers interferes with each other and is cancelled out, whereby an anti-reflection effect can be attained.

In addition, there is known an anti-reflection structure in which fine conical or pyramidal projections are arranged on a substrate so that the reflectivity of the surface of the substrate is reduced (for example, see Reference 2: Japanese Published Patent Application No. 2004-85831).

DISCLOSURE OF INVENTION

However, when the above-described multilayer structure is used, a part of incident light from external that is reflected at the interface between layers but is not cancelled out is emitted to a viewer side as reflected light. In order for incident light from external to cancel each other out, it is necessary to precisely control the optical characteristics of materials, thicknesses, and the like of the films that are stacked, and it has been difficult to apply anti-reflection treatment for all light from external that is incident at various angles. Also, the above-described anti-reflection structure with fine conical or pyramidal projections cannot attain a sufficient anti-reflection function.

Accordingly, conventional anti-reflection films have limitations in their functions, and it is demanded to develop an anti-reflection film with a higher anti-reflection function as well as a display device having such an anti-reflection function.

It is an object of the present invention to provide an anti-reflection film (substrate) that can provide high visibility and has an anti-reflection function by which reflection of incident light from external can be further reduced, and a display device having such an anti-reflection film.

According to the present invention, a plurality of contiguous projections having a pyramidal shape (hereinafter referred to as "pyramidal projections") is arranged in a geometric pattern, so that reflection of incident light is prevented. Specifically, because of the physical shape of a pyramid, the refractive index of each pyramidal projection varies from a portion closer to the surface of a display screen to a portion closer to outside (air). In addition, a protective layer formed of a material having a lower refractive index than the pyramidal projections is provided so as to fill a space between the plurality of pyramidal projections. A space between the plurality of pyramidal projections corresponds to a recess produced by the arrangement of the pyramidal projections.

The pyramidal projections preferably have a hexagonal pyramidal shape (hereinafter also referred to as "hexagonal pyramidal projections"). The plurality of hexagonal pyramidal projections can be densely arranged with no space therebetween. In addition, since six sides of each pyramidal projection are provided at a different angle from the base, light can be effectively scattered in many directions. One pyramidal projection is surrounded by other pyramidal projections, and a side of the base of each pyramidal projection is shared by an adjacent pyramidal projection.

The hexagonal pyramidal projections in accordance with the present invention can be most densely arranged with no space therebetween. Further, such a pyramidal projection can have the largest possible number of side surfaces of all similar pyramidal shapes. Therefore, it has an optimal shape to attain a high anti-reflection function that can effectively scatter incident light in many directions.

In the present invention, an interval between apexes of the plurality of pyramidal projections is preferably less than or equal to 350 nm and the height of each pyramidal projection is preferably greater than or equal to 800 nm. In addition, the fill rate per unit area of the display screen with the bases of the plurality of pyramidal projections (the percentage of a filled (occupied) area of the display screen) is preferably greater than or equal to 80%, or more preferably greater than or equal to 90%. The fill rate herein means the percentage of areas where the pyramidal projections are formed relative to the entire display screen. When the fill rate is greater than or equal to 80%, the percentage of a plane portion (that is parallel with the display screen and is flat against the sloping sides of the pyramidal projections) where no pyramidal projection is formed is less than or equal to 20%. In addition, the height of the pyramidal projection is preferably five times or more larger than the base width of the pyramidal projection.

In the present invention, the thickness of the protective layer provided to fill a space between the plurality of pyramidal projections may be about the same as the height of each pyramidal projection, or may be larger than the height of each pyramidal projection so as to cover the pyramidal projection. In this case, the protective layer can planarize surface irregularities of the anti-reflection film due to the pyramidal projections. Alternatively, the thickness of the protective layer may be smaller than the height of each pyramidal projection, and in this case, the base of each pyramidal projection is selectively covered whereas the apex of each pyramidal projection is exposed at the surface.

The pyramidal projections can, due to their shapes, further reduce reflection of incident light from external. However, when there is a foreign substance such as dirt or dust in air between the pyramidal projections, the foreign substance causes reflection of incident light from external and, accordingly, there is a possibility that a sufficient anti-reflection effect for incident light from external cannot be obtained. In the present invention, since the protective layer is formed between the pyramidal projections, entry of contaminants such as dust into spaces between the pyramidal projections can be prevented. Therefore, a decrease in anti-reflection function due to entry of dust or the like can be prevented, and filling a space between the pyramidal projections can increase the physical strength of the anti-reflection film. Accordingly, reliability can be improved.

The protective layer filling a space between the pyramidal projections is formed using a material having a lower refractive index than a material used for the pyramidal projections. Therefore, the protective layer has a smaller difference in refractive index with air than the material used for the pyramidal projections. Thus, light reflection at an interface between the protective layer and air can be suppressed.

According to the present invention, an anti-reflection film (substrate) having a plurality of contiguous pyramidal projections, and a display device having such an anti-reflection film can be provided. Accordingly, a high anti-reflection function can be provided.

The present invention can be applied to a display device that is a device having a display function. Display devices of the present invention include, for example, a light-emitting display device having a light-emitting element and a TFT connected together, in which the light-emitting element has, between electrodes, a layer containing an organic material, an inorganic material, or a mixture of an organic material and an inorganic material that exhibits light emission called electroluminescence (hereinafter also referred to as "EL"); a liquid crystal display device that uses a liquid crystal element having a liquid crystal material as a display element; and the like. In the present invention, the display device refers to a device having display elements (such as liquid crystal elements or light-emitting elements). Note that the display device may be the main body of a display panel in which a plurality of pixels each having a display element such as a liquid crystal element or an EL element and a peripheral driver circuit for driving these pixels are formed over a substrate. In addition, the display device may also be a display panel provided with a flexible printed circuit (FPC) or a printed wiring board (PWB) that is attached with one or more of an IC, a resistor, a capacitor, an inductor, and a transistor. Further, the display device may include an optical sheet such as a polarizing plate or a retardation plate. Furthermore, the display device may include a backlight (which may include a light-guiding plate, a prism sheet, a diffusion sheet, a reflective sheet, and/or a light source (such as an LED or a cold cathode tube)).

Note that the display element and the display device can have various structures and can include various elements. For example, a display medium whose contrast is changed by an electric action can be used, such as an EL element (an organic EL element, an inorganic EL element, or an EL element containing an organic material and an inorganic material), liquid crystal elements, and electronic ink. Display devices that use EL elements include an EL display; display devices that use liquid crystal elements include a liquid crystal display, a transmissive liquid crystal display, a semi-transmissive liquid crystal display, and a reflective liquid crystal display; and display devices that use electronic ink include electronic paper.

An anti-reflection film in accordance with one aspect of the present invention includes a plurality of pyramidal projections. The plurality of pyramidal projections has a hexagonal pyramidal shape. Each pyramidal projection is arranged so that a side of its base is in contact with a side of a base of an adjacent pyramidal projection. In addition, a protective layer having a lower refractive index than the plurality of pyramidal projections is provided so as to fill a recess that is produced by the arrangement of the plurality of pyramidal projections.

An anti-reflection film in accordance with one aspect of the present invention includes a plurality of pyramidal projections. The plurality of pyramidal projections has a hexagonal pyramidal shape. Apexes of the plurality of pyramidal projections are equally spaced from each other. Each pyramidal projection is arranged so that a side of its base is in contact with a side of a base of an adjacent pyramidal projection. In addition, a protective layer having a lower refractive index than the plurality of pyramidal projections is provided so as to fill a recess that is produced by the arrangement of the plurality of pyramidal projections.

An anti-reflection film in accordance with one aspect of the present invention includes a plurality of pyramidal projections. Apexes of the plurality of pyramidal projections are equally spaced from each other. Each pyramidal projection is arranged so that a side of its base is in contact with a side of a base of an adjacent pyramidal projection. In addition, a protective layer having a lower refractive index than the plurality of pyramidal projections is provided so as to fill a recess that is produced by the arrangement of the plurality of pyramidal projections.

A display device in accordance with one aspect of the present invention includes a display screen that has a plurality of pyramidal projections formed on its surface. The plurality of pyramidal projections has a hexagonal pyramidal shape. Each pyramidal projection is arranged so that a side of its base is in contact with a side of a base of an adjacent pyramidal projection. In addition, a protective layer having a lower refractive index than the plurality of pyramidal projections is provided so as to fill a recess that is produced by the arrangement of the plurality of pyramidal projections.

A display device in accordance with one aspect of the present invention includes a display screen that has a plurality of pyramidal projections formed on its surface. The plurality of pyramidal projections has a hexagonal pyramidal shape. Apexes of the plurality of pyramidal projections are equally spaced from each other. Each pyramidal projection is arranged so that a side of its base is in contact with a side of a base of an adjacent pyramidal projection. In addition, a protective layer having a lower refractive index than the plurality of pyramidal projections is provided so as to fill a recess that is produced by the arrangement of the plurality of pyramidal projections.

A display device in accordance with one aspect of the present invention includes a display screen that has a plurality of pyramidal projections formed on its surface. Apexes of the plurality of pyramidal projections are equally spaced from each other. Each pyramidal projection is arranged so that a side of its base is in contact with a side of a base of an adjacent pyramidal projection. In addition, a protective layer having a lower refractive index than the plurality of pyramidal projections is provided so as to fill a recess that is produced by the arrangement of the plurality of pyramidal projections.

A display device in accordance with one aspect of the present invention includes a pair of substrates, one of which is a light-transmissive substrate; a display element provided between the pair of substrates; and a plurality of pyramidal projections formed on an outer side of the light-transmissive substrate. The plurality of pyramidal projections has a hexagonal pyramidal shape. Each pyramidal projection is arranged so that a side of its base is in contact with a side of a base of an adjacent pyramidal projection. In addition, a protective layer having a lower refractive index than the plurality of pyramidal projections is provided so as to fill a recess that is produced by the arrangement of the plurality of pyramidal projections.

A display device in accordance with one aspect of the present invention includes a pair of substrates, one of which is a light-transmissive substrate; a display element provided between the pair of substrates; and a plurality of pyramidal projections formed on an outer side of the light-transmissive substrate. The plurality of pyramidal projections has a hexagonal pyramidal shape. Apexes of the plurality of pyramidal projections are equally spaced from each other. Each pyramidal projection is arranged so that a side of its base is in contact with a side of a base of an adjacent pyramidal projection. In addition, a protective layer having a lower refractive index than the plurality of pyramidal projections is provided so as to fill a recess that is produced by the arrangement of the plurality of pyramidal projections.

A display device in accordance with one aspect of the present invention includes a pair of substrates, one of which is a light-transmissive substrate; a display element provided between the pair of substrates; and a plurality of pyramidal projections formed on an outer side of the light-transmissive substrate. Apexes of the plurality of pyramidal projections are equally spaced from each other. Each pyramidal projection is arranged so that a side of its base is in contact with a side of a base of an adjacent pyramidal projection. In addition, a protective layer having a lower refractive index than the plurality of pyramidal projections is provided so as to fill a recess that is produced by the arrangement of the plurality of pyramidal projections.

The pyramidal projection can be formed using not a material with a uniform refractive index but a material whose refractive index varies from a portion closer to its side surface to a portion closer to the display screen side. For example, a portion of the plurality of pyramidal projections, closer to its side surface, is formed using a material with about an equal refractive index to air or the protective layer. Such a structure enables a reduction in reflection of light from external that is incident from air on a side surface of the pyramidal projection. Meanwhile, a portion of the plurality of pyramidal projections, closer to a substrate of the display screen side, is formed using a material with about an equal refractive index to the substrate. Such a structure enables a reduction in reflection, at an interface between the pyramidal projection and the substrate, of light that propagates through the pyramidal projection and is incident on the substrate.

When a glass substrate, which has a higher refractive index than air or the protective layer, is used for the substrate, each pyramidal projection may be formed to have a structure in which a portion closer to its apex is formed of a material with a lower refractive index, whereas a portion closer to its base is formed of a material with a higher refractive index, so that the refractive index of the pyramidal projection increases from the apex toward the base. When glass is used for the substrate, the pyramidal projections can be formed using a film containing fluoride, oxide, or nitride.

The anti-reflection film and the display device of the present invention each have a surface on which a plurality of pyramidal projections is densely arranged with no space therebetween. Since the side surfaces of each pyramidal projection do not form a plane that is parallel with a surface of a display screen, they reflect incident light from external, not to a viewer side but to an adjacent pyramidal projection. Otherwise, the reflected light propagates through a space between the adjacent pyramidal projections. Hexagonal pyramidal projections can be most densely arranged with no space therebetween. Moreover, a hexagonal pyramidal shape has the largest possible number of side surfaces of all similar pyramidal shapes. Therefore, it has an optimal shape to attain a high anti-reflection function that can effectively scatter light in many directions. A part of incident light from external propagates through a pyramidal projection whereas light reflected at a side surface of the pyramidal projection is incident on an adjacent pyramidal projection. In this manner, incident light from external that is reflected at a side surface of a pyramidal projection repeats incidence on adjacent pyramidal projections.

In other words, the number of times light from external is incident on the pyramidal projections of the anti-reflection film can be increased, whereby the amount of incident light from external that is transmitted through the anti-reflection film is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in anti-reflection function due to entry of dust or the like can be prevented, and filling a space between the pyramidal projections can increase the physical strength of the anti-reflection film and the display device. Accordingly, reliability can be improved.

The present invention provides an anti-reflection film having a plurality of contiguous pyramidal projections formed on its surface. Such an anti-reflection film can provide high visibility and has an anti-reflection function that can further reduce reflection of incident light from external. The present invention also provides a display device having such an anti-reflection film. Therefore, a display device with higher image quality and higher performance can be fabricated.

BEST MODE FOR CARRYING OUT THE INVENTION

Figure 1A:
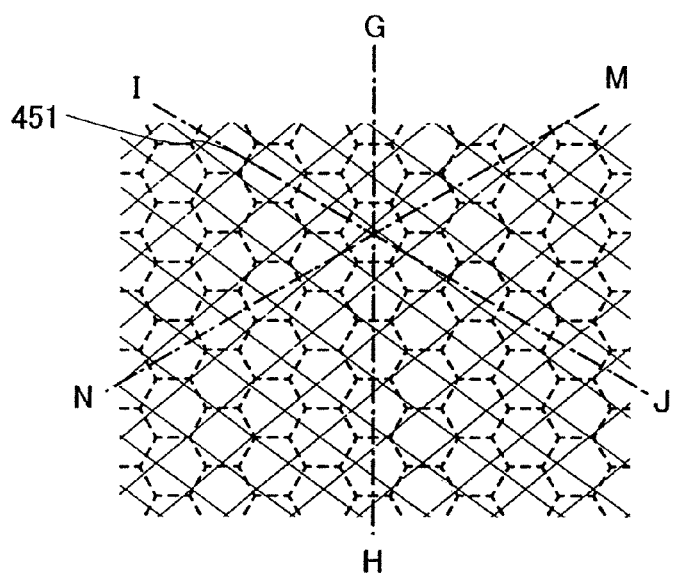
FIGS. 1A to 1D are conceptual diagrams of the present invention.

Hereinafter, embodiment modes of the present invention will be described with reference to the accompanying drawings. Note that the present invention can be implemented in various different ways and it will be easily understood by those skilled in the art that various changes and modifications can be made in the present invention without departing from the spirit and scope thereof. Therefore, the present invention should not be construed as being limited to the description in the following embodiment modes. In the accompanying drawings, like portions or portions having like functions are denoted by like reference numerals, and repetitive description thereof will be omitted.

Embodiment Mode 1

This embodiment mode will describe an exemplary anti-reflection film that can provide high visibility and has an anti-reflection function by which reflection of incident light from external can be further reduced.

Figure 1B:
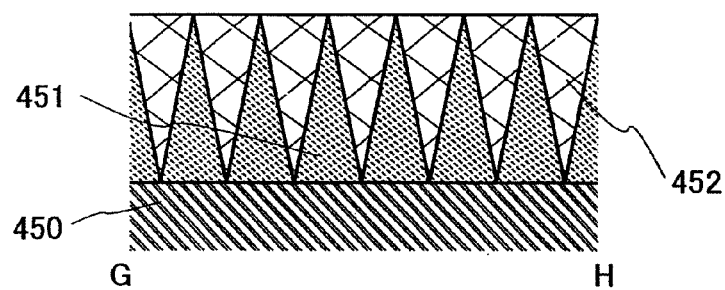
Figure 1C:
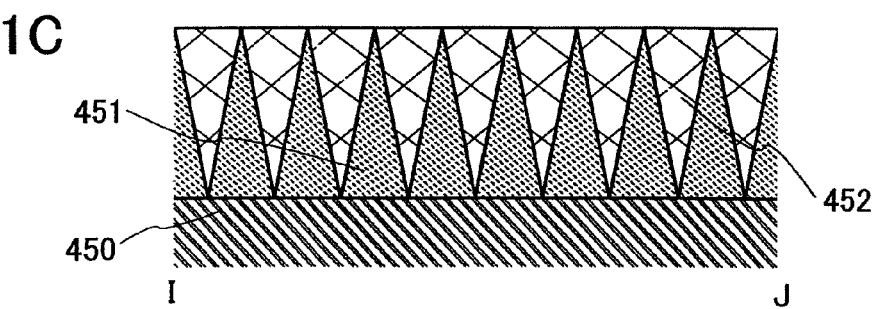
Figure 1D:
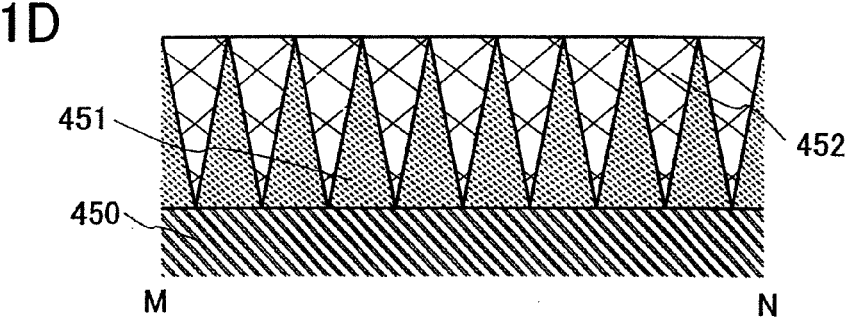

FIG. 1A is a top view of an anti-reflection film of this embodiment mode that uses the present invention, and FIGS. 1B to 1D are cross-sectional views thereof. In FIGS. 1A to 1D, a plurality of hexagonal pyramidal projections 451 and a protective layer 452 are provided over the surface of a display screen of a display device 450. FIG. 1A is a top view of a display device of this embodiment mode, FIG. 1B is a cross-sectional view along line G-H of FIG. 1A, FIG. 1C is a cross-sectional view along line I-J of FIG. 1A, and FIG. 1D is a cross-sectional view along line M-N of FIG. 1A. As illustrated in FIGS. 1A and 1B, the pyramidal projections 451 are densely arranged on the display screen so as to be contiguous with each other.

When an anti-reflection film has a plane surface (a plane that is parallel with the display screen) with respect to incident light from external, the incident light is reflected to a viewer side. Therefore, an anti-reflection film with a smaller plane region can have a higher anti-reflection function. Further, the surface of the anti-reflection film preferably has a plurality of angles in order to scatter incident light from external more effectively.

The hexagonal pyramidal projections in this embodiment mode can be most densely arranged with no space therebetween. Further, such a pyramidal projection can have the largest possible number of side surfaces of all similar pyramidal shapes. Therefore, it has an optimal shape to attain a high anti-reflection function that can effectively scatter incident light in many directions.

The plurality of pyramidal projections is arranged in a geometrically contiguous pattern. A side of the base of each pyramidal projection is provided to be in contact with a side of the base of an adjacent pyramidal projection. In this embodiment mode, therefore, the plurality of pyramidal projections has no space therebetween and covers the surface of the display screen as illustrated in FIG. 1A. Accordingly, a plane portion of the surface of the display screen is not exposed by the plurality of pyramidal projections as illustrated in FIGS. 1B to 1D, and light from external is incident on the sloping side surfaces of the plurality of pyramidal projections, whereby reflection of incident light from external at the plane portion can be reduced. Such a structure is preferable because each pyramidal projection has many side surfaces that differ in angle from the base and, therefore, incident light can be scattered in many directions.

Further, since each hexagonal pyramidal projection is in contact with a plurality of other hexagonal pyramidal projections at vertices of the base, and since the base of such a pyramidal projection is surrounded by a plurality of side surfaces forming an angle with the base, the pyramidal projection can easily reflect incident light in many directions. Therefore, such a hexagonal pyramidal projection having many vertices at its base has a higher anti-reflection function.

Apexes of the plurality of pyramidal projections 451 in this embodiment mode are equally spaced from the apexes of a plurality of adjacent pyramidal projections. Therefore, each of the plurality of pyramidal projections 451 has a cross section with the same shape as illustrated in FIGS. 1B to 1D.

Figure 3A:
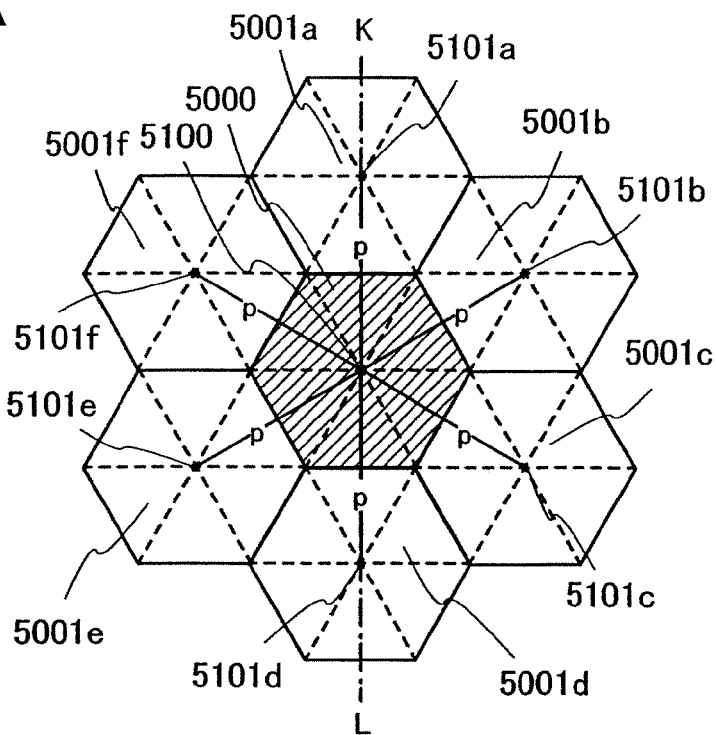
FIGS. 3A and 3B are conceptual diagrams of the present invention.
Figure 3B:
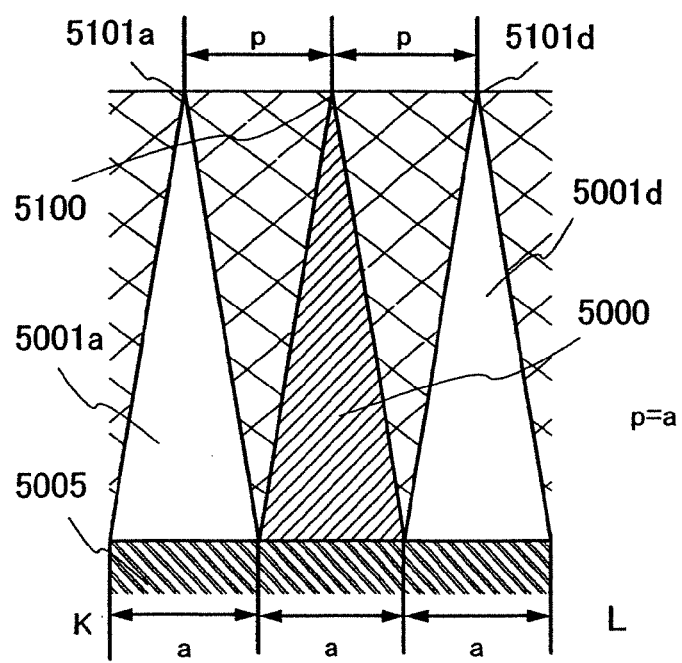

FIG. 3A is an exemplary top view of pyramidal projections in this embodiment mode that are arranged densely in a contiguous manner, and FIG. 3B is a cross-sectional view along line K-L of FIG. 3A. A hexagonal pyramidal projection 5000 is, on the surface of a display device 5005, in contact with surrounding pyramidal projections 5001a to 5001f at sides of its base (sides of a hexagon). The pyramidal projection 5000 and the surrounding pyramidal projections 5001a to 5001f have regular hexagonal bases as well as apexes 5100 and 5101a to 5101f, respectively, above the centers of the hexagons. Therefore, the apex 5100 of the pyramidal projection 5000 is equally spaced at an interval of p from the apexes 5101a to 5101f of the adjacent pyramidal projections 5001a to 5001f. At this time, the interval p between the apexes of the adjacent pyramidal projections is equal to the width a of each pyramidal projection, as illustrated in FIG. 3B.

Figure 28A:
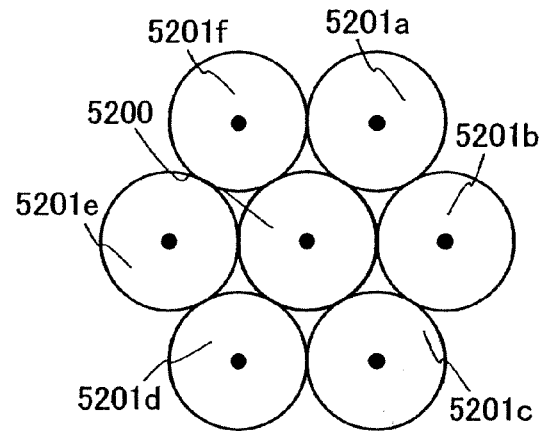
FIGS. 28A to 28C illustrate experimental models of comparative examples.
Figure 28B:
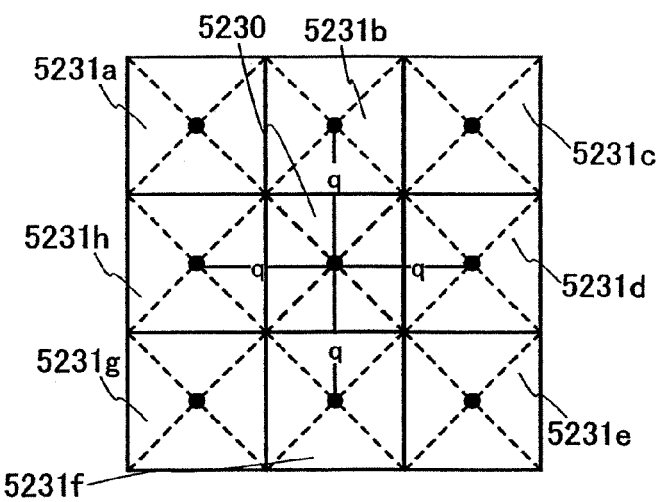
Figure 28C:
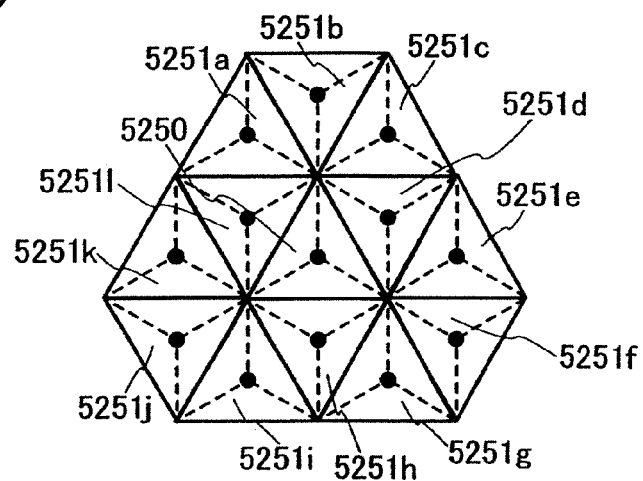

As comparative examples, FIGS. 28A to 28C illustrate cases where conical projections each with the same shape, square pyramidal projections each with the same shape, and triangular pyramidal projections each with the same shape are arranged contiguously. FIGS. 28A to 28C are top views, respectively, of conical projections, square pyramidal projections, and triangular pyramidal projections that are arranged densely. As illustrated in FIG. 28A, conical projections 5201a to 5201f are arranged around a conical projection 5200 at the center, forming the closest packed structure. However, since the base of each conical projection is circular, there is a space between the conical projection 5200 and each of the conical projections 5201a and 5201f even when the closest packed structure is formed. Therefore, a plane of a display screen is partly exposed. Since incident light from external is reflected at the plane to a viewer side, such an anti-reflection film having contiguous conical projections has a low anti-reflection function.

Referring to 28B, square pyramidal projections 5231a to 5231h are densely arranged so as to be in contact with a square base of a square pyramidal projection 5230 at the center. Similarly, referring to 28C, triangular pyramidal projections 5251a to 5251l are densely arranged so as to be in contact with a regular triangular base of a triangular pyramidal projection 5250 at the center. A square pyramidal projection and a triangular pyramidal projection have less numbers of side surfaces than a hexagonal pyramidal projection. Therefore, they cannot easily scatter light in many directions. Further, while hexagonal pyramidal projections can be arranged so that the apexes of adjacent pyramidal projections are spaced equally, it is impossible for regular square pyramidal projections or regular triangular pyramidal projections, shown as the comparative examples herein, to be arranged to have equally spaced apexes (the apexes are shown by dots in FIGS. 28A to 28C).

Figure 30:
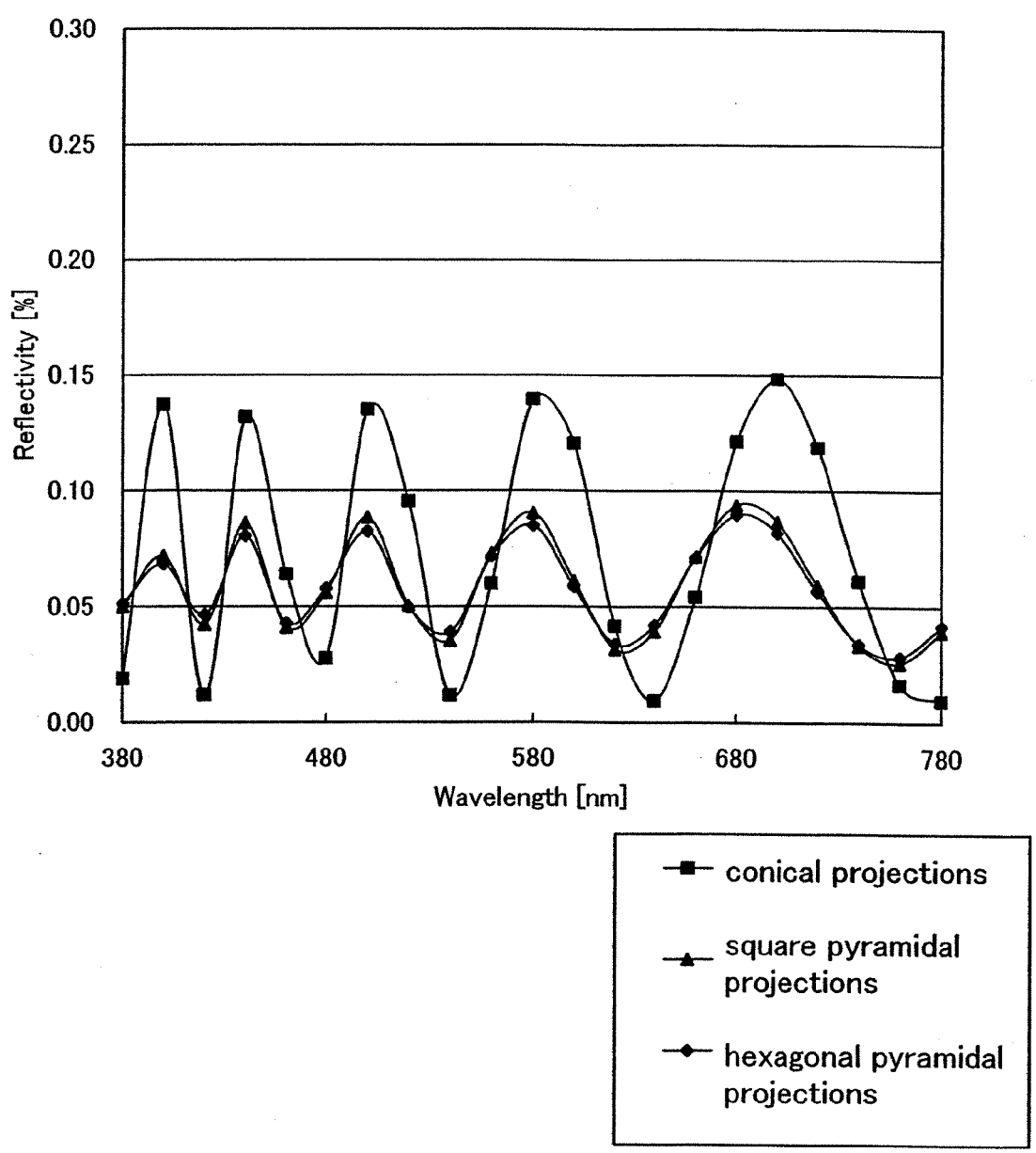
FIG. 30 illustrates experimental data of Embodiment Mode 1.

Optical calculations were conducted for the conical projections, square pyramidal projections, and the hexagonal pyramidal projections of this embodiment mode. Note that in each model of the conical projections, square pyramidal projections, and the hexagonal pyramidal projections of this embodiment mode, recessions produced by the provision of the projections are filled with a protective layer. For calculations in this embodiment mode, an optical simulation tool for optical devices, "Diffract MOD" (manufactured by RSoft Design Group, Inc.) was used. Three-dimensional optical calculation was conducted to determine the reflectivity of each projection. FIG. 30 illustrates the relationship between the wavelength of incident light and the reflectivity of each of the conical projections, square pyramidal projections, and hexagonal pyramidal projections. Calculation was conducted with the conditions that "Harmonics" that are the parameter of the above-mentioned simulation tool are set at 3 in both the X and Y directions. As for the conical projections and the hexagonal pyramidal projections, "Index Res. (index resolution)" that is the parameter of the above-mentioned simulation tool was set at $\sqrt{3} \times p/128$ in the X direction, p/128 in the Y direction, and b/80 in the Z direction, where p represents the interval between the apexes of adjacent projections, and b represents the height of each projection. As for the square pyramidal projections illustrated in FIG. 28B, "Index Res. (index resolution)" that is the parameter of the above-mentioned simulation tool was set at q/64 in the X and Y directions and b/80 in the Z direction, where q represents the interval between the apexes of adjacent projections.

In FIG. 30, square dots represent the relationship between the wavelength of incident light and the reflectivity of conical projections; triangular dots represent the relationship between the wavelength of incident light and the reflectivity of square pyramidal projections; and rhomboid dots represent the relationship between the wavelength of incident light and the reflectivity of hexagonal pyramidal projections. The optical calculation results can also confirm that the model in which the hexagonal pyramidal projections of this embodiment mode are densely arranged has, at wavelengths of 380 to 780 nm, small fluctuation in reflectivity that is dependent on wavelength, and has low reflectivity on an average, in comparison with the other example in which the conical projections or square pyramidal projections are densely arranged. Thus, the hexagonal pyramidal projections can be determined to have the lowest reflectivity. Note that the refractive indices of the conical projections, the square pyramidal projections, and the hexagonal pyramidal projections are each 1.492, the heights thereof are each 1500 nm, and the widths thereof are each 300 nm. In addition, the protective layer has a refractive index of 1.05 and is provided to cover the apexes of the projections so as to planarize them.

The fill rate per unit area of the display screen with the bases of the plurality of hexagonal pyramidal projections is preferably greater than or equal to 80%, or more preferably greater than or equal to 90%. Accordingly, the percentage of light from external that is incident on a plane portion can be reduced, whereby reflection of incident light to a viewer side can be prevented. The fill rate herein means the percentage of areas where the hexagonal pyramidal projections are formed relative to the entire display screen. When the fill rate is greater than or equal to 80%, the percentage of a plane portion (that is parallel with the display screen and is flat against the sloping sides of the hexagonal pyramidal projections) where no hexagonal pyramidal projection is formed is less than or equal to 20%.

Figure 32:
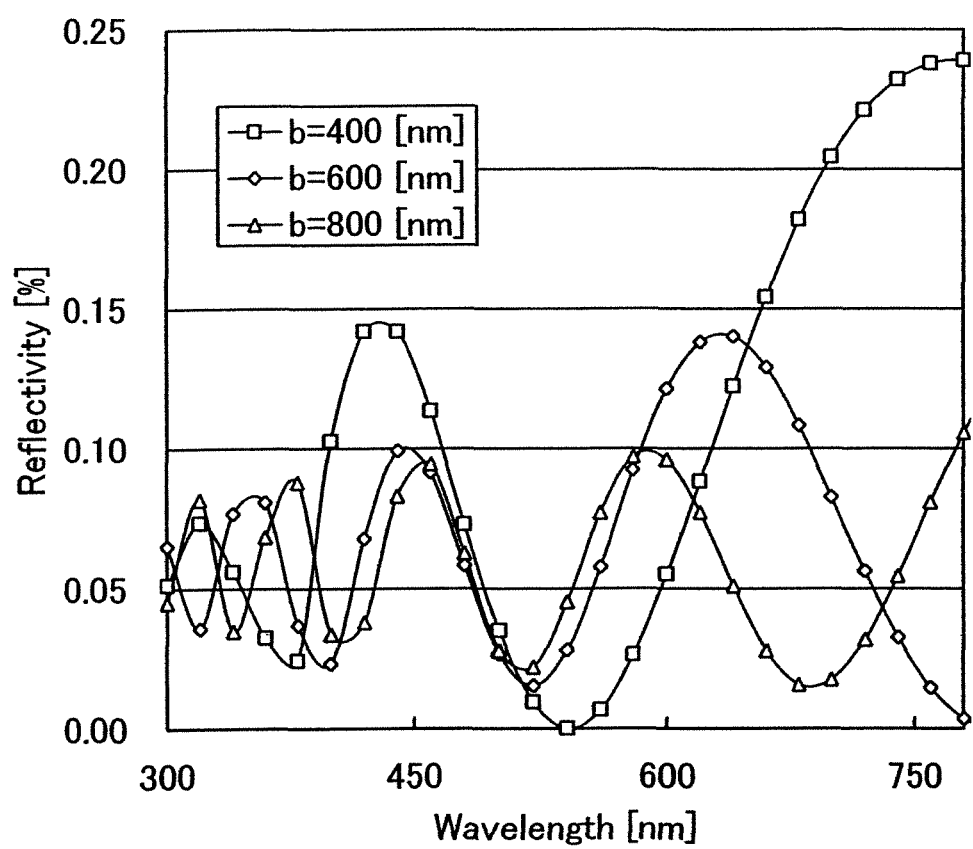
FIG. 32 illustrating experimental data of Embodiment Mode 1.

Similarly, using the model in which the hexagonal pyramidal projections are densely arranged, changes in reflectivity of the hexagonal pyramidal projections at each wavelength were calculated for various widths a and heights b. FIG. 32 illustrates changes in reflectivity of the hexagonal pyramidal projections at each wavelength when the width a thereof is 300 nm and the height b thereof is varied: 400 nm (square dots), 600 nm (rhomboid dots), and 800 nm (triangular dots). The reflectivity is lower in order of increasing the height b across the measurement wavelengths. When the height b is 800 nm, the dependence of reflectivity on wavelength is low, and the reflectivity is less than or equal to about 0.1% throughout the overall measurement wavelength range that is the visible wavelength range.

Figure 33:
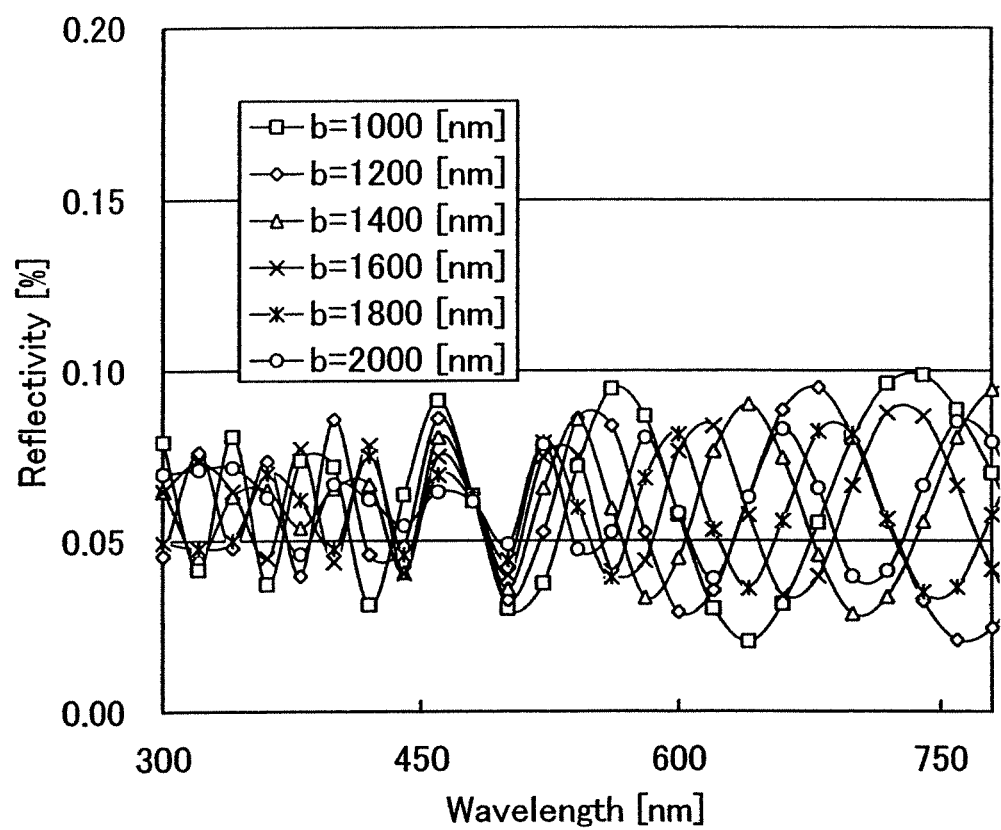
FIG. 33 illustrates experimental data of Embodiment Mode 1.

FIG. 33 illustrates optical calculation results of the reflectivity of the hexagonal pyramidal projections at each wavelength when the width a thereof is 300 nm and the height b thereof is varied: 1000 nm (square dots), 1200 nm (rhomboid dots), 1400 nm (triangular dots), 1600 nm (x marks), 1800 nm (asterisks), and 2000 nm (circular dots). As illustrated in FIG. 33, when the width a is 300 nm and the height b is 1000 nm or more, the reflectivity at measurement wavelengths of 300 to 780 nm is as low as 0.1% or less. When the height b is 1600 nm or more, fluctuation in reflectivity dependent on wavelength can be further suppressed across the overall measurement wavelength range, which means the average reflectivity can be suppressed.

Figure 34:
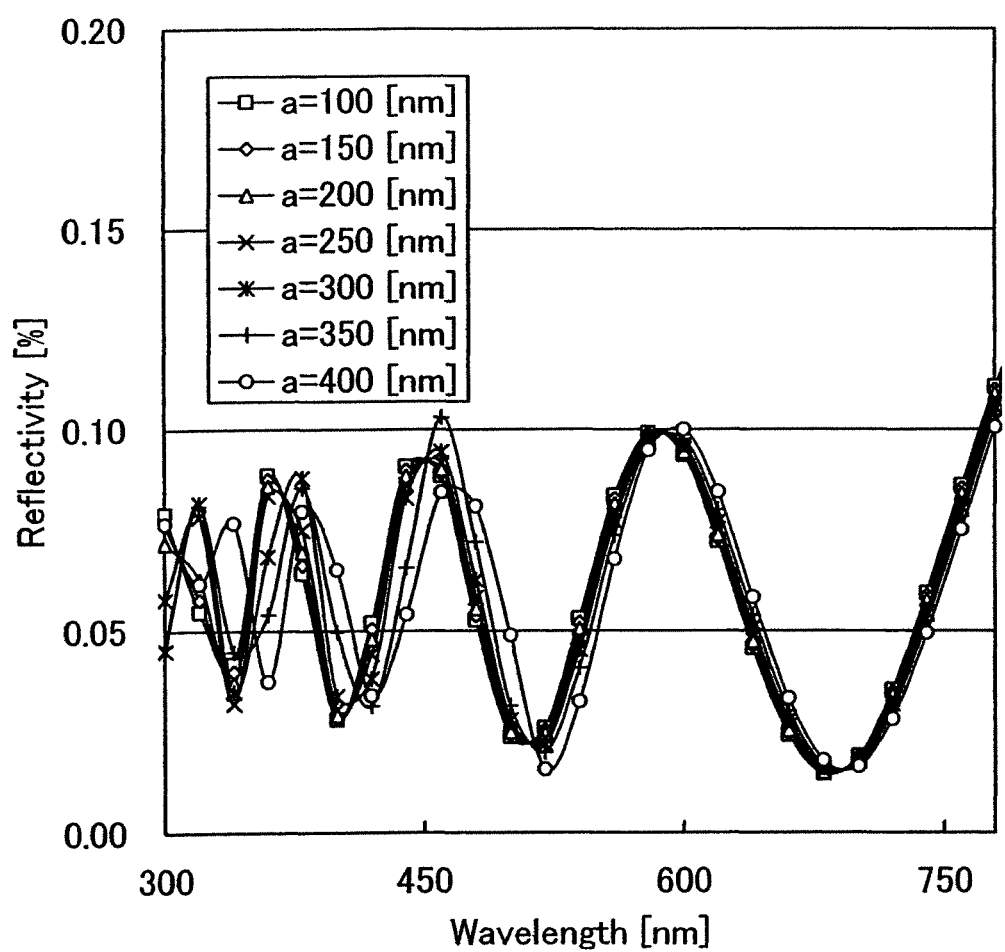
FIG. 34 illustrates experimental data of Embodiment Mode 1.

FIG. 34 illustrates changes in reflectivity of the hexagonal pyramidal projections at each wavelength when the height b thereof is 800 nm and the width a thereof is varied: 100 nm (square dots), 150 nm (rhomboid dots), 200 nm (triangular dots), 250 nm (x marks), 300 nm (asterisks), 350 nm (cross marks), and 400 nm (circular dots). FIG. 34 shows that a graph with a small fluctuation in reflectivity dependent on wavelength is obtained as the width a is smaller.

Figure 35:
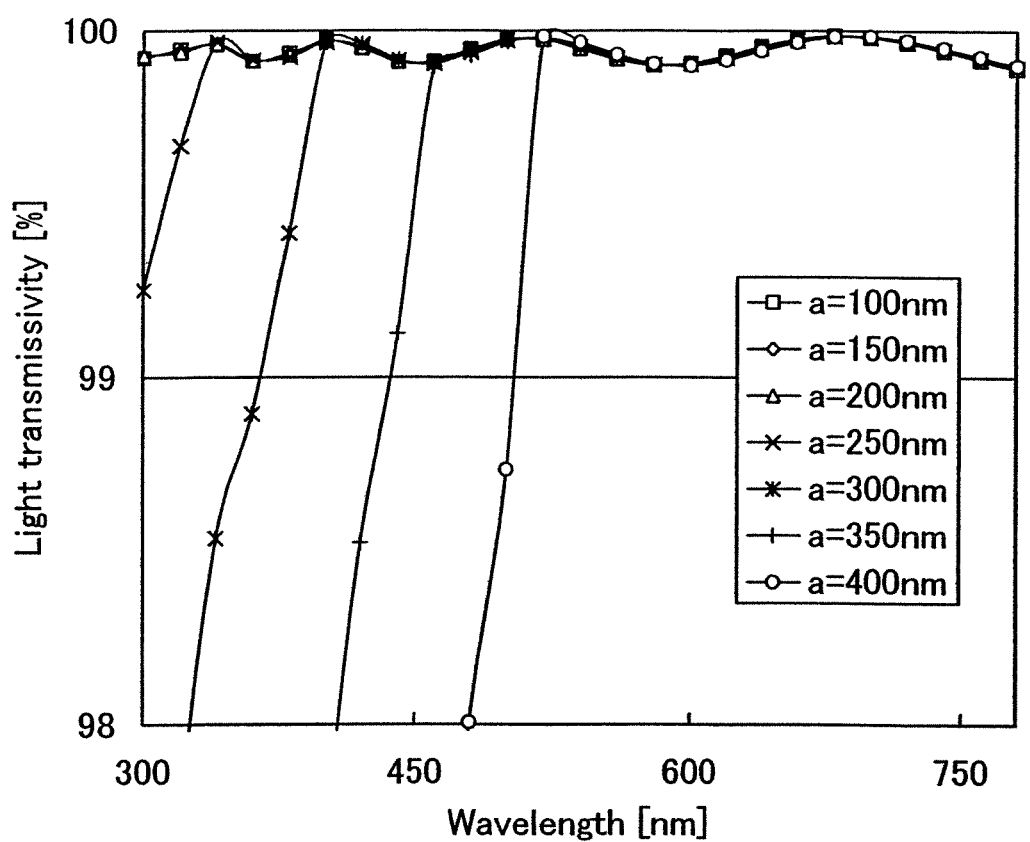
FIG. 35 shows experimental data of Embodiment Mode 1.
Figure 36A:
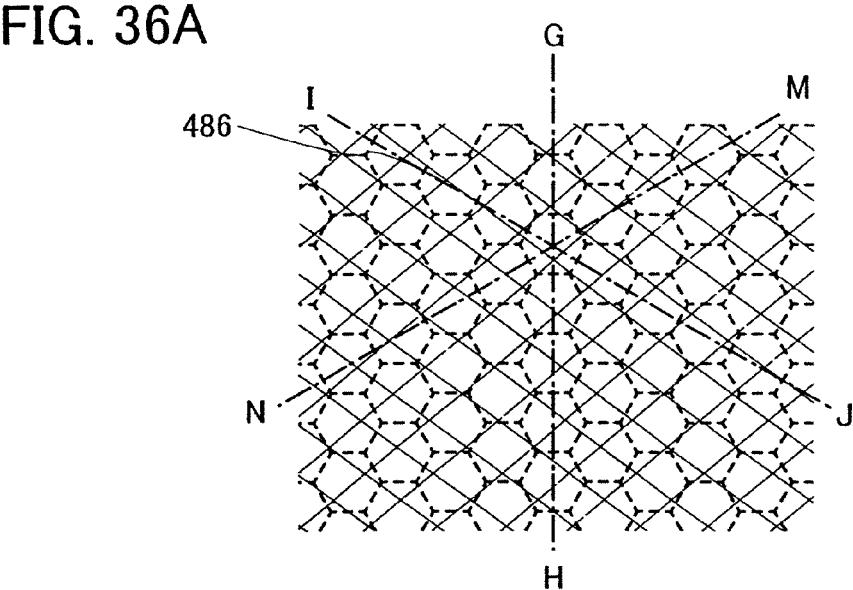
FIG. 36A is an exemplary top view of pyramidal projections and a protective layer that are applicable to the present invention.
Figure 36B:
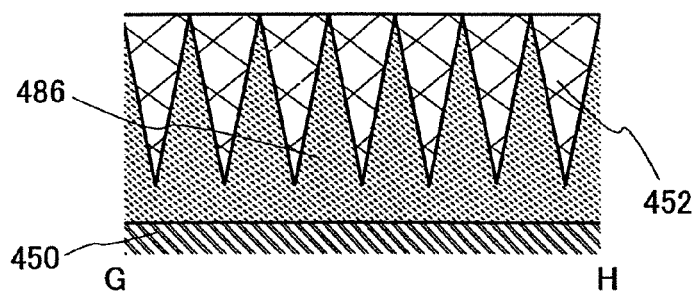
FIGS. 36B to 36D are cross-sectional views thereof.
Figure 36C:
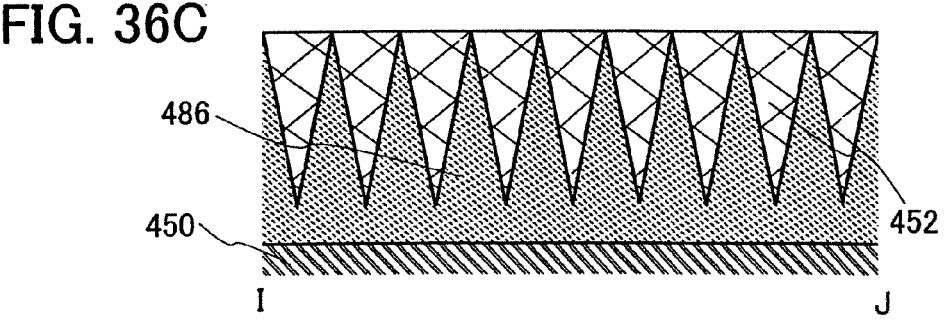
Figure 36D:
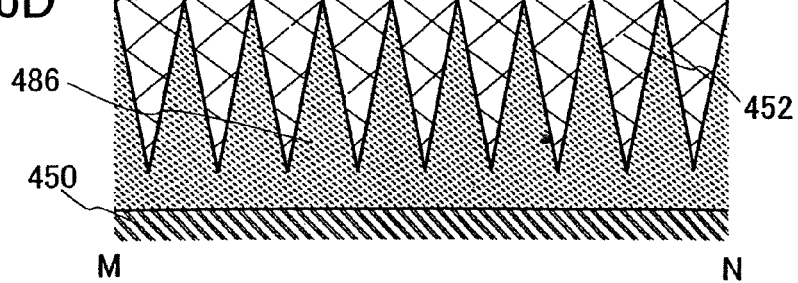

FIG. 35 illustrates optical calculation results of the light transmissivity of the hexagonal pyramidal projections (for light traveling in a direction from the base to the apex) at each wavelength, when the height b thereof is 800 nm and the width a thereof is varied: 100 nm (square dots), 150 nm (rhomboid dots), 200 nm (triangular dots), 250 nm (x marks), 300 nm (asterisks), 350 (cross marks), and 400 nm (circular dots). As illustrated in FIG. 35, with the condition of the height b of 800 nm, a pyramidal projection having a smaller width a can achieve a transmissivity of almost 100% with respect to light having a lower wavelength. When the width a is 300 nm or less, a transmissivity of almost 100% can be achieved with respect to light in the overall measurement wavelength range of 300 to 780 nm. Therefore, the calculation results can confirm that the hexagonal pyramidal projections can sufficiently transmit light in the visible wavelength range.

The above results show that an interval between the apexes of the plurality of pyramidal projections are preferably less than or equal to 350 nm (more preferably in the range of 100 to 300 nm) and the height of each pyramidal projection is preferably greater than or equal to 800 nm (more preferably 1000 nm or in the range of 1600 to 2000 nm).

Figure 29A:
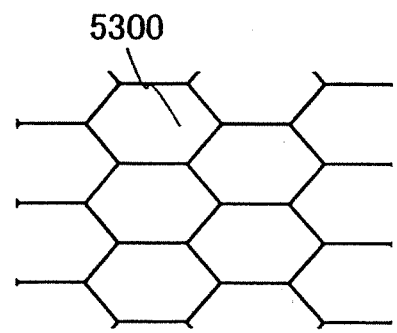
FIGS. 29A and 29B are top views of pyramidal projections applicable to the present invention.
Figure 29B:
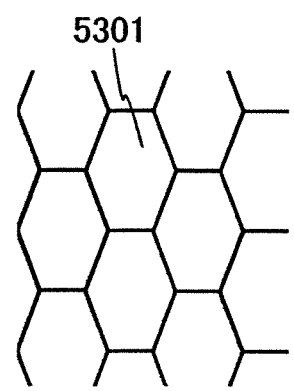

FIGS. 29A and 29B illustrate other exemplary bases of hexagonal pyramidal projections. Like hexagonal pyramidal projections 5300 and 5301 illustrated in FIGS. 29A and 29B, respectively, the lengths and interior angles of six sides do not have to be all equal. Such hexagonal pyramidal projections 5300 or 5301 can also be arranged densely with no space therebetween, whereby incident light from external can be scattered in many directions.

Figure 2A:
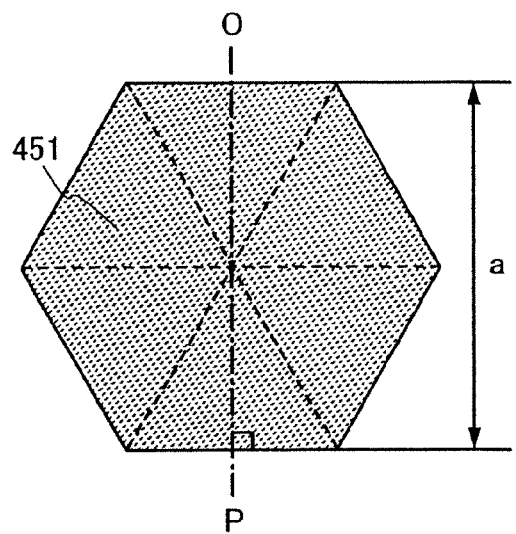
FIGS. 2A and 2B are conceptual diagrams of the present invention.
Figure 2B:
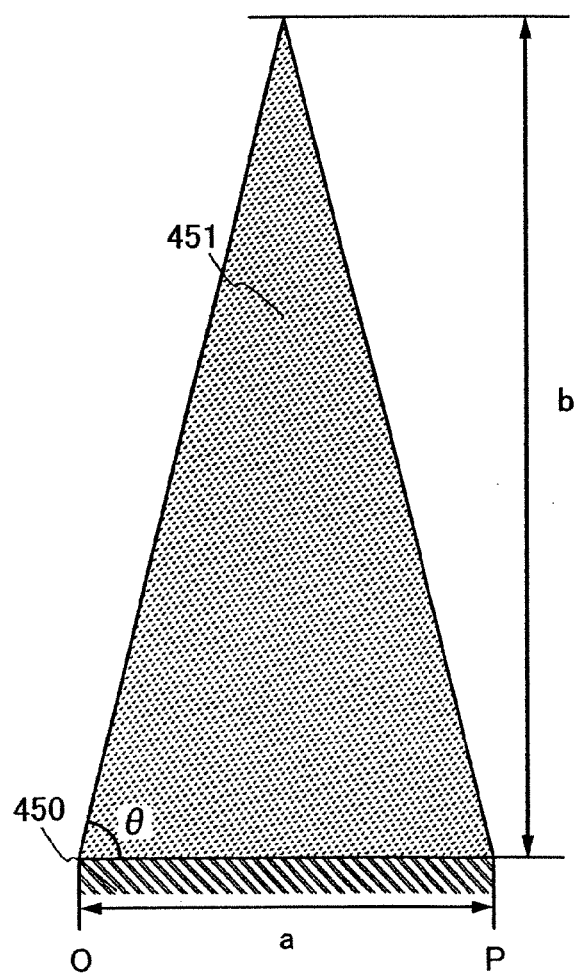

FIGS. 2A and 2B are enlarged views of a pyramidal projection of the anti-reflection film illustrated in FIGS. 1A to 1D. FIG. 2A is a top view of a pyramidal projection, and FIG. 2B is a cross-sectional view along line O-P of FIG. 2A. The line O-P is a line that passes through the center of the base of the pyramidal projection and is perpendicular to a side thereof. As illustrated in FIG. 2B, a side of the pyramidal projection makes an angle of θ with the base. In this specification, the length of a line that passes through the center of the base of a pyramidal projection and is perpendicular to a side thereof is referred to as the width a of the base of the pyramidal projection. In addition, the distance from the base to the apex of the pyramidal projection is referred to as the height b of the pyramidal projection.

The height b of the pyramidal projection is preferably five times or more larger than the width a of the base of the pyramidal projection.

Figure 27A:
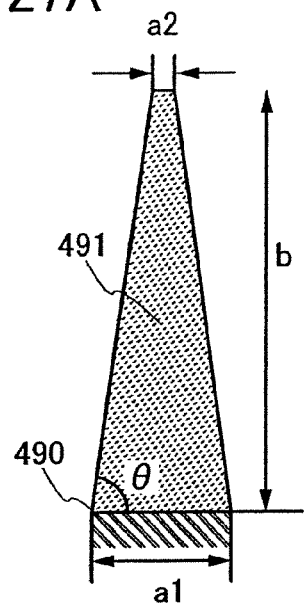
FIGS. 27A to 27C are cross-sectional views of pyramidal projections applicable to the present invention.
Figure 27B:
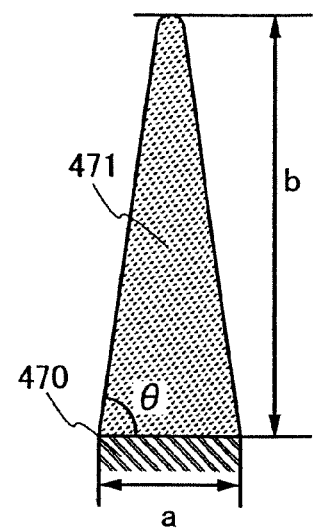
Figure 27C:
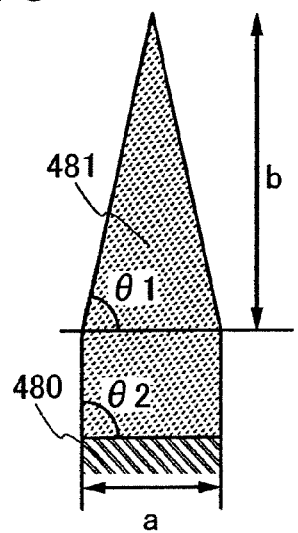

The pyramidal projection may have any of the following shapes: a pyramidal projection whose apex is cut off by a plane parallel to its base and whose cross-sectional view has a trapezoidal shape (a truncated pyramid), a pyramidal projection whose apical portion is roundish, and a stacked structure of a prism and a pyramid. FIGS. 27A to 27C illustrate exemplary shapes of such pyramidal projections. FIG. 27A illustrates a shape having an upper base (a width of $a_2$) and a lower base (a width of $a_1$) and having no pointed top unlike a normal pyramidal projection. Therefore, a cross section of a plane perpendicular to the lower base is trapezoidal. In a pyramidal projection 491 provided on a display device 490 illustrated in FIG. 27A, a distance between the lower base and the upper base is referred to as the height b in the present invention.

FIG. 27B illustrates an example in which a pyramidal projection 471 with a rounded top is provided on a display device 470. As illustrated in FIG. 27B, the pyramidal projection may have a rounded top with a curvature. In this case, the height b of the pyramidal projection corresponds to a distance between the base and the highest point of the top.

FIG. 27C illustrates an example in which a pyramidal projection 481 with a plurality of angles $\theta_1$ and $\theta_2$ is provided on a display device 480. As illustrated in FIG. 27C, the pyramidal projection may have a stacked structure of a prism and a pyramid. In this case, the angle $\theta_1$ of the side and the angle $\theta_2$ of the base differ from each other. The height b of the pyramidal projection 481 illustrated in FIG. 27C corresponds to the height of the pyramid portion having sloping sides.

Although FIGS. 1A to 1D illustrate the structure in which a plurality of pyramidal projections is densely arranged so that the bases of adjacent pyramidal projections are in contact with other, another structure may be employed in which pyramidal projections are provided in the upper part of the surface of a film (substrate). FIGS. 36A to 36D illustrate a variation of FIGS. 1A to 1D, in which a film 486 has a surface with a plurality of hexagonal pyramidal projections but the sides of the pyramidal projections are not in contact with the display screen. The anti-reflection film of the present invention may have any structure as long as it has pyramidal projections that are densely arranged in a contiguous manner. For example, any of the following structures may be used: pyramidal projections, as one continuous structure, are directly formed in the surface of a film (substrate); the surface of a film (substrate) is patterned to form pyramidal projections; and pyramidal shapes are selectively formed by a printing method such as nanoimprinting. Alternatively, pyramidal projections may be formed on a film (substrate) through a different step.

The plurality of pyramidal projections may be either one continuous film or a structure obtained by densely arranging a plurality of pyramidal projections on the substrate. Alternatively, the pyramidal projections may be formed in advance in the substrate. A glass substrate, a quartz substrate, or the like can be used for the substrate provided with the pyramidal projections. Alternatively, a flexible substrate may be used. The flexible substrate refers to a substrate that can be curved and examples thereof include a plastic substrate made of polycarbonate, polyarylate, polyethersulfone, or the like; a high-molecular material, elastomer that can be plasticized and molded like plastic at high temperature whereas it has an elastic property like rubber at room temperature; and the like. Further, a film (made of polypropylene, polyester, vinyl, polyvinyl fluoride, vinyl chloride, or the like), an inorganic film formed by evaporation, or the like can also be used. The plurality of pyramidal projections may be formed either by patterning a substrate or by depositing a film on a substrate. Alternatively, the pyramidal projections may be formed through a different step so that they can be later attached to a substrate with an adhesive or the like. Even when the anti-reflection film is to be provided on a display screen of another display device, the film may be attached thereto with an adhesive, glue, or the like. As described above, the anti-reflection film of the present invention can be formed by utilizing a plurality of pyramidal projections of various shapes.

Figure 31A:
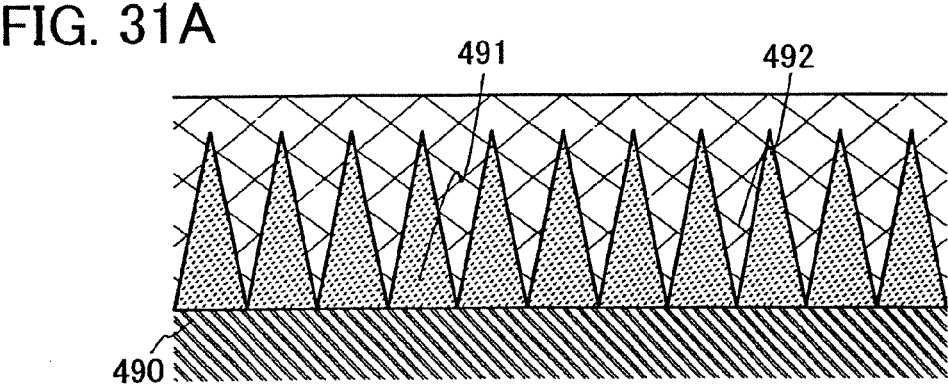
FIGS. 31A to 31D are cross-sectional views of pyramidal projections of the present invention.
Figure 31B:
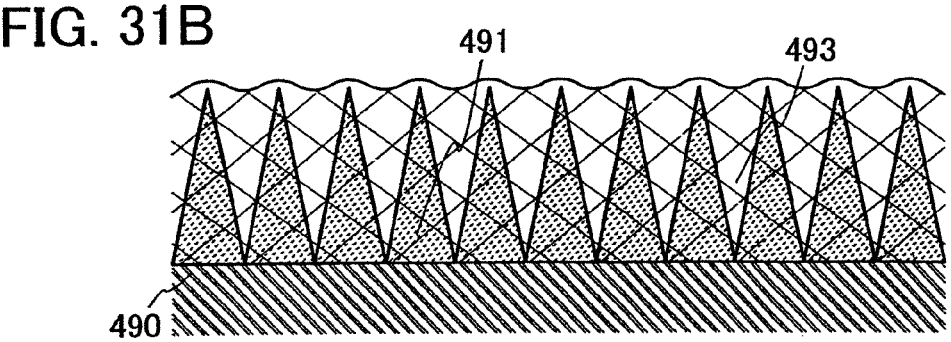

In the present invention, the shape of the protective layer is not specifically limited as long as the protective layer is provided between the pyramidal projections. FIGS. 31A to 31D illustrate exemplary shapes of the protective layer. The thickness of the protective layer provided to fill a space between the pyramidal projections may be about the same as the height of each pyramidal projection, or may be larger than the height of each pyramidal projection so that the protective layer can cover the pyramidal projection as illustrated in FIGS. 31A and 31B. In this case, surface irregularities due to the pyramidal projections are reduced and planarized by the protective layer. FIG. 31A illustrates an example in which surface irregularities due to the pyramidal projections 491 provided on the surface of the display device 490 are planarized by providing a protective layer 492 so as to completely cover the pyramidal projections 491 and a space therebetween.

FIG. 31B illustrates an example in which surface irregularities due to the pyramidal projections 491 provided on the surface of the display device 490 are almost planarized by providing a protective layer 493 so as to completely cover the pyramidal projections 491 and a space therebetween. In this example, the shape of the protective layer reflects the shapes of the pyramidal projections 491 to some extent.

Figure 31C:
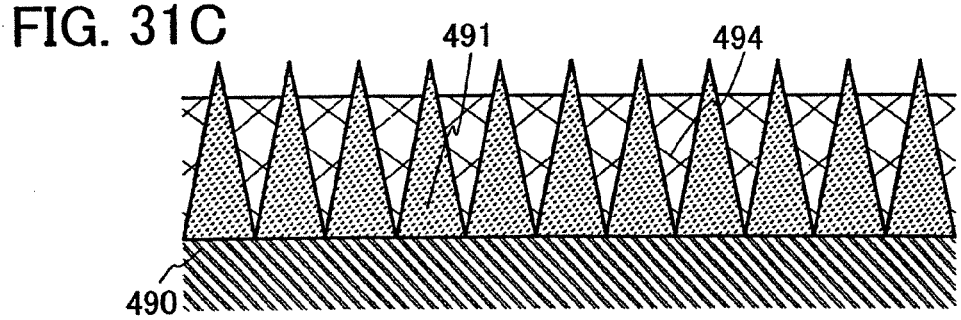

The thickness of the protective layer may be smaller than the height of each pyramidal projection. In that case, the base side of each pyramidal projection is selectively covered whereas the apex of each projection is exposed at the surface. FIG. 31C illustrates a structure in which a protective layer 494 selectively covers the pyramidal projections 491 provided on the surface of the display device 490 so as to fill a space between the pyramidal projections 491, and the apexes of the pyramidal projections 491 are exposed at the surface. With such a structure in which the pyramidal projections 491 are partly exposed at the surface, light from external is directly incident on the pyramidal projections 491 without passing through the protective layer. Accordingly, an anti-reflection function can be enhanced.

Figure 31D:
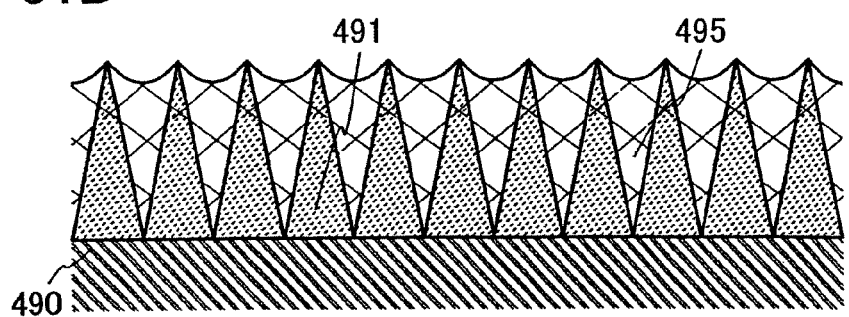

Depending on a formation method of the protective layer, as illustrated in FIG. 31D, a protective layer 495 formed between the pyramidal projections 491 on the display device 490 may have a partly reduced thickness like a recession between the pyramidal projections.

It is acceptable as long as the protective layer is formed using a material having a lower refractive index than at least the material used for the pyramidal projections having an anti-reflection function. Accordingly, the material used for the protective layer can be appropriately selected based on the material of a substrate forming a display screen of the display device and the material of the pyramidal projections formed on the substrate.

The pyramidal projections can, due to their shapes, further reduce reflection of incident light from external. However, when there is a foreign substance such as dirt or dust in air between the pyramidal projections, the foreign substance causes reflection of incident light from external and, accordingly, there is a possibility that a sufficient anti-reflection effect for incident light from external cannot be obtained. In the present invention, since the protective layer is formed between the pyramidal projections, entry of contaminants such as dust into spaces between the pyramidal projections can be prevented. Therefore, a decrease in anti-reflection function due to entry of dust or the like can be prevented, and filling a space between the pyramidal projections can increase the physical strength of the anti-reflection film. Accordingly, reliability can be improved.

The protective layer filling a space between the pyramidal projections is formed using a material having a lower refractive index than a material used for the pyramidal projections. Therefore, the protective layer has a smaller difference in refractive index with air than the material used for the pyramidal projections. Thus, light reflection at an interface between the protective layer and air can be suppressed.

The pyramidal projection can be formed using not a material with a uniform refractive index but a material whose refractive index varies from a portion closer to its side surface to a portion closer to the display screen side. For example, a portion of the plurality of pyramidal projections, closer to its side surface, is formed using a material with about an equal refractive index to air or the protective layer. Such a structure enables a reduction in reflection of light from external that is incident from air on a side surface of the pyramidal projection. Meanwhile, a portion of the plurality of pyramidal projections, closer to a substrate of the display screen side, is formed using a material with about an equal refractive index to the substrate. Such a structure enables a reduction in reflection, at an interface between the pyramidal projection and the substrate, of light that propagates through the pyramidal projection and is incident on the substrate. When a glass substrate, which has a higher refractive index than air or the protective layer, is used for the substrate, each pyramidal projection may be formed to have a structure in which a portion closer to its apex is formed of a material with a lower refractive index, whereas a portion closer to its base is formed of a material with a higher refractive index, so that the refractive index of the pyramidal projection increases from the apex toward the base.

A material used for forming the pyramidal projections may be appropriately determined in accordance with a material of the substrate forming a display screen surface, such as silicon, nitrogen, fluorine, oxide, nitride, or fluoride. Examples of oxide include silicon oxide ($SiO_2$), boric oxide ($B_2O_3$), sodium oxide ($NaO_2$), magnesium oxide (MgO), aluminum oxide (alumina) ($Al_2O_3$), potassium oxide ($K_2O$), calcium oxide (CaO), diarsenic trioxide (arsenious oxide) ($As_2O_3$), strontium oxide (SrO), antimony oxide ($Sb_2O_3$), barium oxide (BaO), indium tin oxide (ITO), zinc oxide (ZnO), indium zinc oxide (IZO) in which indium oxide is mixed with zinc oxide (ZnO), a conductive material in which indium oxide is mixed with silicon oxide ($SiO_2$), organic indium, organotin, indium oxide containing tungsten oxide, indium zinc oxide containing tungsten oxide, indium oxide containing titanium oxide, and indium tin oxide containing titanium oxide. Examples of nitride include aluminum nitride (AlN) and silicon nitride (SiN). Examples of fluoride include lithium fluoride (LiF), sodium fluoride (NaF), magnesium fluoride ($MgF_2$), calcium fluoride ($CaF_2$), and lanthanum fluoride ($LaF_3$). Further, the pyramidal projections may be formed using one or more materials selected from the above-mentioned silicon, nitrogen, fluorine, oxide, nitride, or fluoride. The mixing ratio thereof may be appropriately determined in accordance with the ratio of components (the composition ratio) of the substrate.

The pyramidal projections can be formed by the steps of depositing a thin film by a sputtering method, a vacuum evaporation method, a PVD (physical vapor deposition) method, or a CVD (chemical vapor deposition) method such as a low-pressure CVD (LPCVD) method or a plasma CVD method, and then etching the thin film into a desired shape. Alternatively, a droplet discharge method by which a pattern can be formed selectively, a printing method by which a pattern can be transferred or drawn (a method for forming a pattern such as screen printing or offset printing), a coating method such as a spin coating method, a dipping method, a dispenser method, a brush painting method, a spray method, a flow coating method, or the like can be employed. As a further alternative, an imprinting technique or a nanoimprinting technique with which a nanoscale three-dimensional structure can be formed by transfer can be employed. Imprinting and nanoimprinting are techniques with which a minute three-dimensional structure can be formed without using a photolithography process.

The protective layer can be formed using the same material as the pyramidal projections, for example. However, as a material having a lower refractive index, aerogel including silica, alumina, and carbon, or the like can be used. A fabrication method thereof is preferably a wet process. For example, a droplet discharge method by which a pattern can be formed selectively, a printing method by which a pattern can be transferred or drawn (a method for forming a pattern such as screen printing or offset printing), a coating method such as a spin coating method, a dipping method, a dispenser method, a brush painting method, a spray method, a flow coating method, or the like can be employed.

Figure 25:
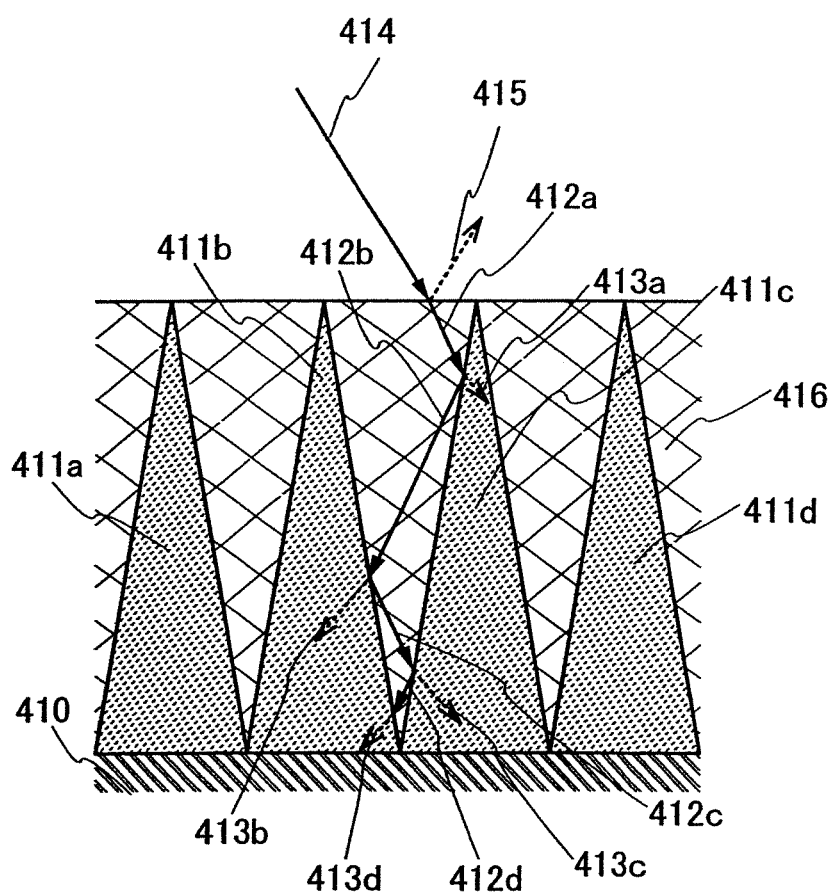
FIG. 25 is a conceptual diagram of the present invention.

An anti-reflection function of an anti-reflection film having a plurality of pyramidal projections in accordance with the present invention will be described with reference to FIG. 25. In FIG. 25, contiguous hexagonal pyramidal projections 411a to 411d are densely arranged on a display screen of a display device 410, and a protective layer 416 is formed thereover. An incident light ray 414 from external is partly reflected as a reflected light ray 415 at an interface between air and the protective layer 416, but a transmitted light ray 412a is incident on the pyramidal projection 411c. A part of the transmitted light ray 412a is transmitted through the pyramidal projection 411c as a transmitted light ray 413a whereas the other part the transmitted light ray 412a is reflected at a side surface of the pyramidal projection 411c as a reflected light ray 412b. The reflected light ray 412b is then incident on the adjacent pyramidal projection 411b. A part of the reflected light ray 412b is transmitted through the pyramidal projection 411b as a transmitted light ray 413b whereas the other part of the reflected light ray 412b is reflected at a side surface of the pyramidal projection 411b as a reflected light ray 412c. The reflected light ray 412c is again incident on the adjacent pyramidal projection 411c. A part of the reflected light ray 412c is transmitted through the pyramidal projection 411c as a transmitted light ray 413c whereas the other part of the reflected light ray 412c is reflected at the side surface of the pyramidal projection 411c as a reflected light ray 412d. The reflected light ray 412d is again incident on the adjacent pyramidal projection 411b, and a part of the reflected light ray 412d is transmitted through pyramidal projection 411b as a transmitted light ray 413d.

As described above, the anti-reflection film of this embodiment mode has a plurality of pyramidal projections formed on its surface. Since the side surfaces of each pyramidal projection do not form a plane that is parallel with the surface, they reflect incident light from external, not to a viewer side but to an adjacent pyramidal projection. Otherwise, the reflected light propagates through a space between the adjacent pyramidal projections. A part of incident light from external propagates through a pyramidal projection whereas light reflected at a side surface of the pyramidal projection is incident on an adjacent pyramidal projection. In this manner, incident light from external that is reflected at a side surface of a pyramidal projection repeats incidence on adjacent pyramidal projections.

In other words, the number of times light from external is incident on the pyramidal projections of the anti-reflection film can be increased, whereby the amount of incident light from external that is transmitted through the anti-reflection film is increased. Thus, the amount of incident light from external that is reflected to a viewer side can be reduced, which eliminates the cause of a reduction in visibility such as reflection.

Furthermore, since the protective layer is formed between the pyramidal projections in this embodiment mode, entry of contaminants such as dust into spaces between the pyramidal projections can be prevented. Therefore, a decrease in anti-reflection function due to entry of dust or the like can be prevented, and filling a space between the pyramidal projections can increase the physical strength of the anti-reflection film (substrate) and the display device. Accordingly, reliability can be improved.

This embodiment mode provides an anti-reflection film having a plurality of contiguous pyramidal projections formed on its surface and a protective layer provided between the pyramidal projections. Such an anti-reflection film can provide high visibility and has an anti-reflection function that can further reduce reflection of incident light from external. The present invention also provides a display device having such an anti-reflection film. Therefore, a display device with higher image quality and higher performance can be fabricated.

Embodiment Mode 2

This embodiment mode will describe an exemplary display device that has high visibility and has an anti-reflection function by which reflection of incident light from external can be further reduced. Specifically, this embodiment mode illustrates a passive matrix display device.

Figure 5A:
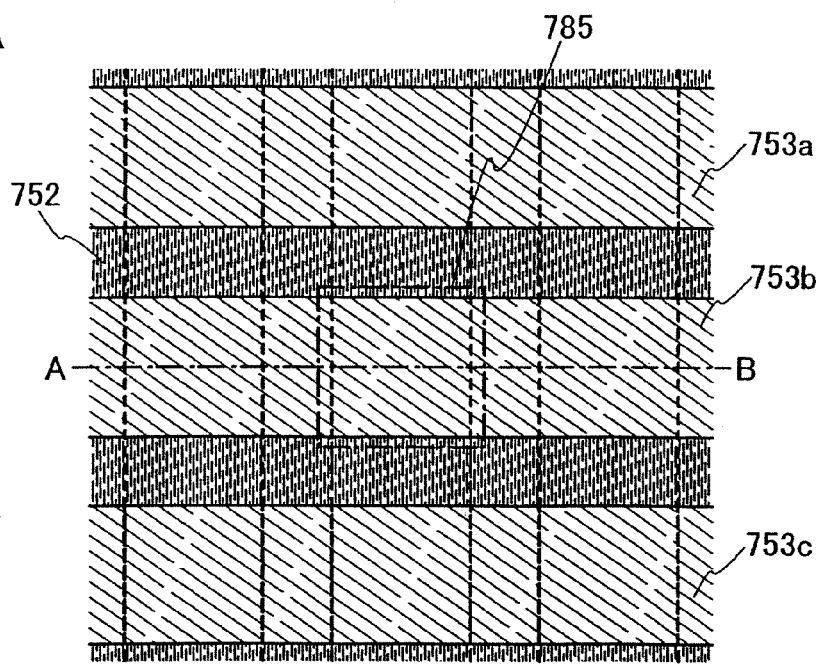
FIG. 5A is a top view of a display device of the present invention.
Figure 5B:
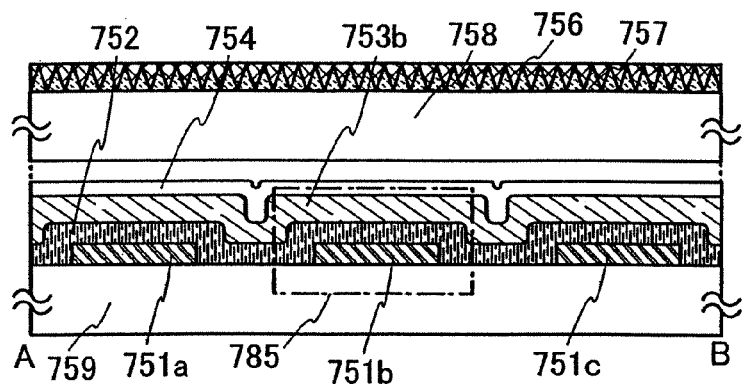
FIGS. 5B and 5C are cross-sectional views thereof.

The display device includes first electrode layers 751a to 751c that extend in a first direction, an electroluminescent layer 752 provided to cover the first electrode layers 751a to 751c, and second electrode layers 753a to 753c that extend in a second direction perpendicular to the first direction (see FIGS. 5A and 5B). The electroluminescent layer 752 is provided between the first electrode layers 751a to 751c and the second electrode layers 753a to 753c. In addition, an insulating layer 754 functioning as a protective film is provided to cover the second electrode layers 753a to 753c (see FIGS. 5A and 5B). Reference numeral 785 denotes a display element. Note that when there is concern about the influence of a transverse electric field between adjacent light-emitting elements, the electroluminescent layer 752 provided in each light-emitting element may be separated.

Figure 5C:
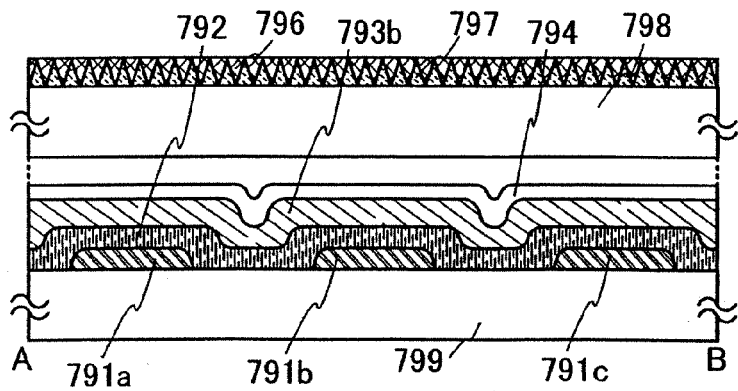

FIG. 5C illustrates a variation of FIG. 5B, in which first electrode layers 791a to 791c, an electroluminescent layer 792, a second electrode layer 793b, and an insulating layer 794 that is a protective layer are provided over a substrate 799. The first electrode layers may have a tapered shape and have a continuously variable radius of curvature, like the first electrode layers 791a to 791c in FIG. 5C. Patterns of the first electrode layers 791a to 791c can be formed by a droplet discharge method or the like. When the first electrode layer has such a curved surface with a curvature, the coverage of the first electrode layer with an insulating layer or a conductive layer that is to be stacked thereover can be good.

Figure 6A:
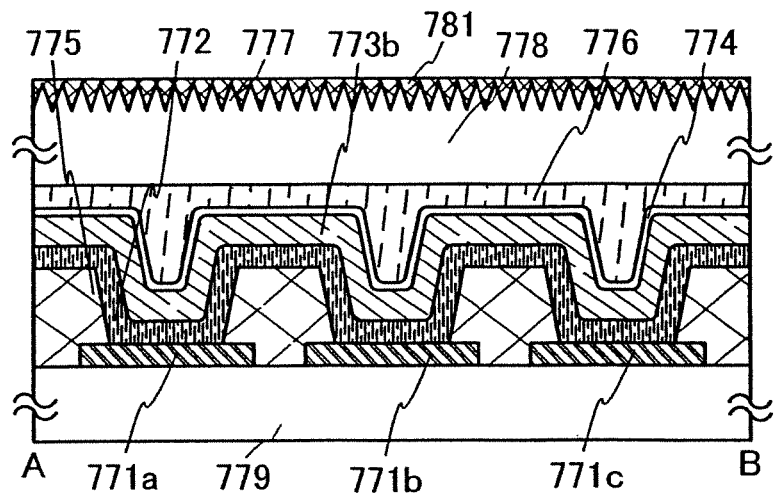
FIGS. 6A and 6B are cross-sectional views of a display device of the present invention.
Figure 6B:
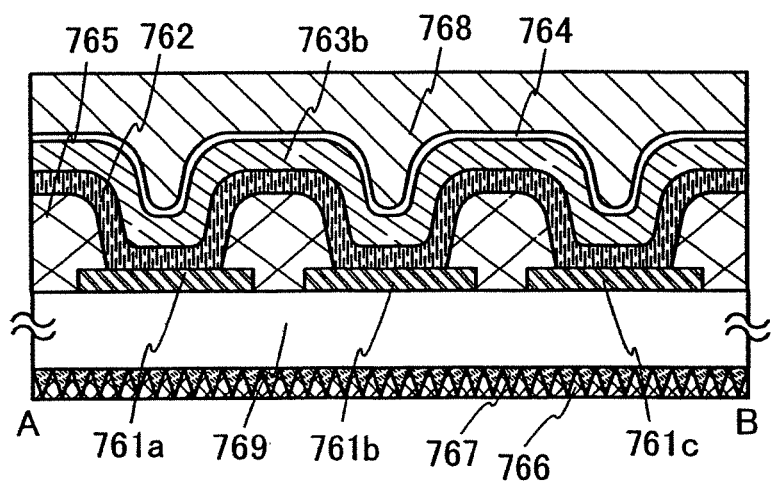

In addition, a partition (insulating layer) may be formed to cover end portions of the first electrode layer. The partition (insulating layer) functions like a wall that separates adjacent light-emitting elements. FIGS. 6A and 6B each illustrate a structure in which end portions of the first electrode layer are covered with a partition (insulating layer).

In a light-emitting element exemplarily illustrated in FIG. 6A, partitions (insulating layers) 775 with a tapered shape are formed to cover end portions of first electrode layers 771a to 771c. The partitions (insulating layers) 775 are formed over the first electrode layers 771*a* to 771*c* that are provided to be in contact with a substrate 779. An electroluminescent layer 772, a second electrode layer 773*b*, an insulating layer 774, an insulating layer 776, and a substrate 778 are provided thereover.

In a light-emitting element exemplarily illustrated in FIG. 6B, partitions (insulating layers) 765 have a continuously variable radius of curvature. First electrode layers 761*a* to 761*c* are formed, and an electroluminescent layer 762, a second electrode layer 763*b*, an insulating layer 764, and a protective layer 768 are sequentially formed thereover.

Figure 4:
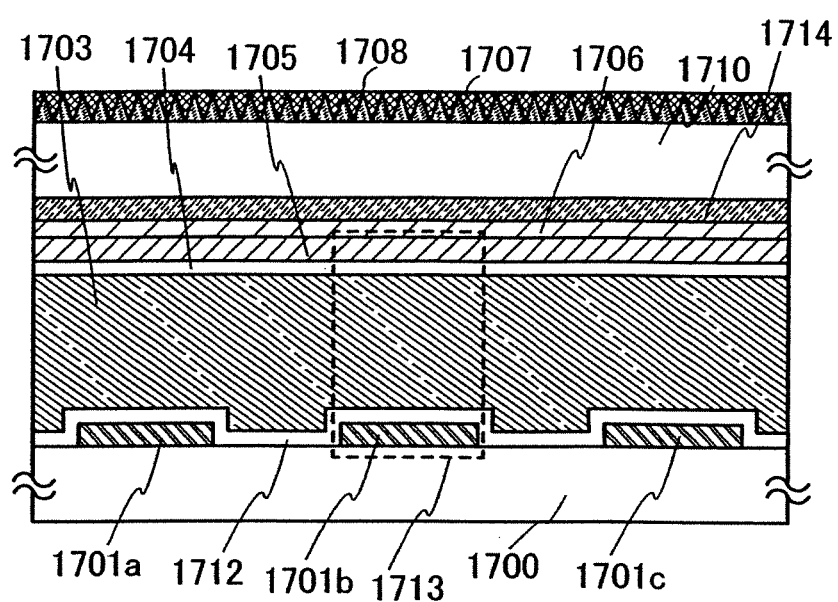
FIG. 4 is a cross-sectional view of a display device of the present invention.

FIG. 4 illustrates a passive matrix liquid crystal display device in accordance with this embodiment mode of the present invention. In FIG. 4, a substrate 1700 provided with first pixel electrode layers 1701*a* to 1701*c* and an insulating layer 1712 functioning as an orientation film is opposite a substrate 1710 provided with an insulating layer 1704 functioning as an orientation film, an opposite electrode layer 1705, a colored layer 1706 functioning as a color filter, and a polarizing plate 1714, with a liquid crystal layer 1703 interposed therebetween. Reference numeral 1713 denotes a display element.

The display device in this embodiment mode has a feature that it has a plurality of hexagonal pyramidal projections that are most densely arranged on the surface of a display screen, in order to attain an anti-reflection function to prevent reflection of incident light from external. In this embodiment mode, surfaces of the substrates 758, 798, 778, 769, and 1710, on a viewer side of the display screen, are provided with hexagonal pyramidal projections 757, 797, 777, 767, and 1707, respectively. Protective layers 756, 796, 781, 766, and 1708 are provided to fill a space between the pyramidal projections 757, 797, 777, 767, and 1707, respectively.

The display device of this embodiment mode may have any structure as long as it has pyramidal projections that are densely arranged in a contiguous manner. For example, any of the following structures may be used: pyramidal projections, as one continuous structure, are directly formed in the surface of a substrate (film); the surface of a substrate (film) is patterned to form pyramidal projections; and pyramidal shapes are selectively formed by a printing method such as nanoimprinting. Alternatively, pyramidal projections may be formed on a substrate (film) through a different step.

The plurality of pyramidal projections may be either one continuous film or a structure obtained by densely arranging a plurality of pyramidal projections on the substrate. Alternatively, the pyramidal projections may be formed in advance in the substrate. FIG. 6A illustrates an example in which the plurality of pyramidal projections 777 is provided as one continuous structure in the surface of the substrate 778.

When a display screen has a plane surface (a plane that is parallel with the display screen) with respect to incident light from external, the incident light is reflected to a viewer side. Therefore, a display device with a smaller plane region can have a higher anti-reflection function. Further, the surface of the display screen preferably has a plurality of angles in order to scatter incident light from external more effectively.

The hexagonal pyramidal projections in this embodiment mode can be most densely arranged with no space therebetween. Further, such a pyramidal projection can have the largest possible number of side surfaces of all similar pyramidal shapes. Therefore, it has an optimal shape to attain a high anti-reflection function that can effectively scatter incident light in many directions.

The plurality of pyramidal projections is arranged in a contiguous pattern. A side of the base of each pyramidal projection is provided to be in contact with a side of the base of an adjacent pyramidal projection. The plurality of pyramidal projections has no space therebetween and covers the surface of the display screen. Accordingly, a plane portion of the surface of the display screen is not exposed by the plurality of pyramidal projections as illustrated in FIGS. 4 through 6B, and light from external is incident on the sloping side surfaces of the plurality of pyramidal projections, whereby reflection of incident light from external at the plane portion can be reduced. Such a structure is preferable because each pyramidal projection has many side surfaces that differ in angle from the base and, therefore, incident light can be scattered in many directions.

Further, since each hexagonal pyramidal projection is in contact with a plurality of other hexagonal pyramidal projections at vertices of the base, and since the base of such a pyramidal projection is surrounded by a plurality of side surfaces forming an angle with the base, the pyramidal projection can easily reflect incident light in many directions. Therefore, such a hexagonal pyramidal projection having many vertices at its base has a higher anti-reflection function.

The fill rate per unit area of the display screen with the bases of the plurality of pyramidal projections is preferably greater than or equal to 80%, or more preferably greater than or equal to 90%. Accordingly, the percentage of light from external that is incident on the plane portion can be reduced, and reflection of incident light to a viewer side can be prevented, which is advantageous.

The plurality of hexagonal pyramidal projections 757, 797, 777, 767, and 1707 in this embodiment mode is equally spaced from the apexes of a plurality of adjacent pyramidal projections. Therefore, a cross section of each pyramidal projection is an isosceles triangle in the drawing. This cross section corresponds to a cross section along line O-P of FIG. 2A in Embodiment Mode 1. In this specification, when a cross section of a pyramidal projection is illustrated in drawings, it has a shape like the pyramidal projection 451 in FIG. 2A that is cut along line O-P. Specifically, it is a cross section along a perpendicular line that is drawn from the center of the base (an intersection of diagonal lines) perpendicularly to a side of the base.

The pyramidal projection can be formed using not a material with a uniform refractive index but a material whose refractive index varies from a portion closer to its side surface to a portion closer to the display screen side. For example, a portion of the plurality of pyramidal projections, closer to its side surface, is formed using a material with about an equal refractive index to air or the protective layer. Such a structure enables a reduction in reflection of light from external that is incident from air on a side surface of the pyramidal projection. Meanwhile, a portion of the plurality of pyramidal projections, closer to a substrate of the display screen side, is formed using a material with about an equal refractive index to the substrate. Such a structure enables a reduction in reflection, at an interface between the pyramidal projection and the substrate, of light that propagates through the pyramidal projection and is incident on the substrate. When a glass substrate, which has a higher refractive index than air or the protective layer, is used for the substrate, each pyramidal projection may be formed to have a structure in which a portion closer to its apex is formed of a material with a lower refractive index, whereas a portion closer to its base is formed of a material with a higher refractive index, so that the refractive index of the pyramidal projection increases from the apex toward the base.

A material used for forming the pyramidal projections may be appropriately determined in accordance with a material of the substrate forming a display screen surface, such as silicon, nitrogen, fluorine, oxide, nitride, or fluoride. Examples of oxide include silicon oxide ($SiO_2$), boric oxide ($B_2O_3$), sodium oxide ($NaO_2$), magnesium oxide (MgO), aluminum oxide (alumina) ($Al_2O_3$), potassium oxide ($K_2O$), calcium oxide (CaO), diarsenic trioxide (arsenious oxide) ($As_2O_3$), strontium oxide (SrO), antimony oxide ($Sb_2O_3$), barium oxide (BaO), indium tin oxide (ITO), zinc oxide (ZnO), indium zinc oxide (IZO) in which indium oxide is mixed with zinc oxide (ZnO), a conductive material in which indium oxide is mixed with silicon oxide ($SiO_2$), organic indium, organotin, indium oxide containing tungsten oxide, indium zinc oxide containing tungsten oxide, indium oxide containing titanium oxide, and indium tin oxide containing titanium oxide. Examples of nitride include aluminum nitride (AlN) and silicon nitride (SiN). Examples of fluoride include lithium fluoride (LiF), sodium fluoride (NaF), magnesium fluoride ($MgF_2$), calcium fluoride ($CaF_2$), and lanthanum fluoride ($LaF_3$). Further, the pyramidal projections may be formed using one or more materials selected from the abovementioned silicon, nitrogen, fluorine, oxide, nitride, or fluoride. The mixing ratio thereof may be appropriately determined in accordance with the ratio of components (the composition ratio) of the substrate.

The pyramidal projections can be formed by the steps of depositing a thin film by a sputtering method, a vacuum evaporation method, a PVD (physical vapor deposition) method, or a CVD (chemical vapor deposition) method such as a low-pressure CVD (LPCVD) method or a plasma CVD method, and then etching the thin film into a desired shape. Alternatively, a droplet discharge method by which a pattern can be formed selectively, a printing method by which a pattern can be transferred or drawn (a method for forming a pattern such as screen printing or offset printing), a coating method such as a spin coating method, a dipping method, a dispenser method, a brush painting method, a spray method, a flow coating method, or the like can be employed. As a further alternative, an imprinting technique or a nanoimprinting technique with which a nanoscale three-dimensional structure can be formed by transfer can be employed. Imprinting and nanoimprinting are techniques with which a minute three-dimensional structure can be formed without using a photolithography process.

The display device in this embodiment mode has a plurality of pyramidal projections formed on its surface. Since the side surfaces of each pyramidal projection do not form a plane that is parallel with a surface of a display screen, they reflect incident light from external, not to a viewer side but to an adjacent pyramidal projection. Otherwise, the reflected light propagates through a space between the adjacent pyramidal projections. A part of incident light from external propagates through a pyramidal projection whereas light reflected at a side surface of the pyramidal projection is incident on an adjacent pyramidal projection. In this manner, incident light from external that is reflected at a side surface of a pyramidal projection repeats incidence on adjacent pyramidal projections.

In other words, the number of times light from external is incident on the pyramidal projections of the display device can be increased, whereby the amount of incident light from external that is transmitted through the pyramidal projections is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in anti-reflection function due to entry of dust or the like can be prevented, and filling a space between the pyramidal projections can increase the physical strength of the display device. Accordingly, reliability can be improved.

A glass substrate, a quartz substrate, or the like can be used for the substrates 758, 759, 769, 778, 779, 798, 799, 1700, and 1710. Alternatively, a flexible substrate may be used. The flexible substrate refers to a substrate that can be curved and examples thereof include a plastic substrate made of polycarbonate, polyarylate, polyethersulfone, or the like. Further, a film (made of polypropylene, polyester, vinyl, polyvinyl fluoride, vinyl chloride, or the like), a base film (made of polyester, polyamide, an inorganic film formed by evaporation), or the like can also be used.

The partition (insulating layer) 765 and the partition (insulating layer) 775 may be formed using an inorganic insulating material such as silicon oxide, silicon nitride, silicon oxynitride, aluminum oxide, aluminum nitride, or aluminum oxynitride; an acrylic acid, a methacrylic acid, or derivatives thereof; a heat-resistant high-molecular compound such as polyimide, aromatic polyamide, or polybenzimidazole; or a siloxane resin. Alternatively, a resin material such as a vinyl resin like polyvinyl alcohol or polyvinylbutyral, an epoxy resin, a phenol resin, a novolac resin, an acrylic resin, a melamine resin, or a urethane resin may be used. Further, an organic material such as benzocyclobutene, parylene, fluorinated arylene ether, or polyimide, a composition material containing a water-soluble homopolymer and a water-soluble copolymer, or the like may be used. The partition (insulating layer) 765 and the partition (insulating layer) 775 can be formed by a vapor-phase growth method such as a plasma CVD method or a thermal CVD method, or a sputtering method. Alternatively, they can be formed by a droplet discharge method or a printing method (such as screen printing or offset printing by which a pattern is formed). A film obtained by a coating method, an SOG film, or the like can also be used.

After forming a conductive layer, an insulating layer, or the like by discharging a composition by a droplet discharge method, the surface thereof may be planarized by applying pressure to improve planarity. As a method for applying pressure, a roller may be moved on the surface so that irregularities of the surface can be reduced, or the surface may be pressed with a flat plate. Also, a heating step may be performed while applying pressure. Alternatively, irregularities of the surface may be removed with an air knife after softening or melting the surface with a solvent or the like. Further, a CMP method may also be used to polish the surface. Such step may be employed in planarizing the surface when irregularities are generated after conducting a droplet discharge method.

This embodiment mode provides a display device having a plurality of hexagonal pyramidal projections formed contiguously on its surface and a protective layer provided between the pyramidal projections. Such a display device has high visibility and has an anti-reflection function that can further reduce reflection of incident light from external. Therefore, a display device with higher image quality and higher performance can be fabricated.

This embodiment mode can be freely combined with Embodiment Mode 1.

Embodiment Mode 3

This embodiment mode will describe an exemplary display device that has high visibility and has an anti-reflection function by which reflection of incident light from external can be further reduced. This embodiment mode illustrates a display device having a different structure from that in Embodiment Mode 2. Specifically, this embodiment mode illustrates an active matrix display device.

Figure 26A:
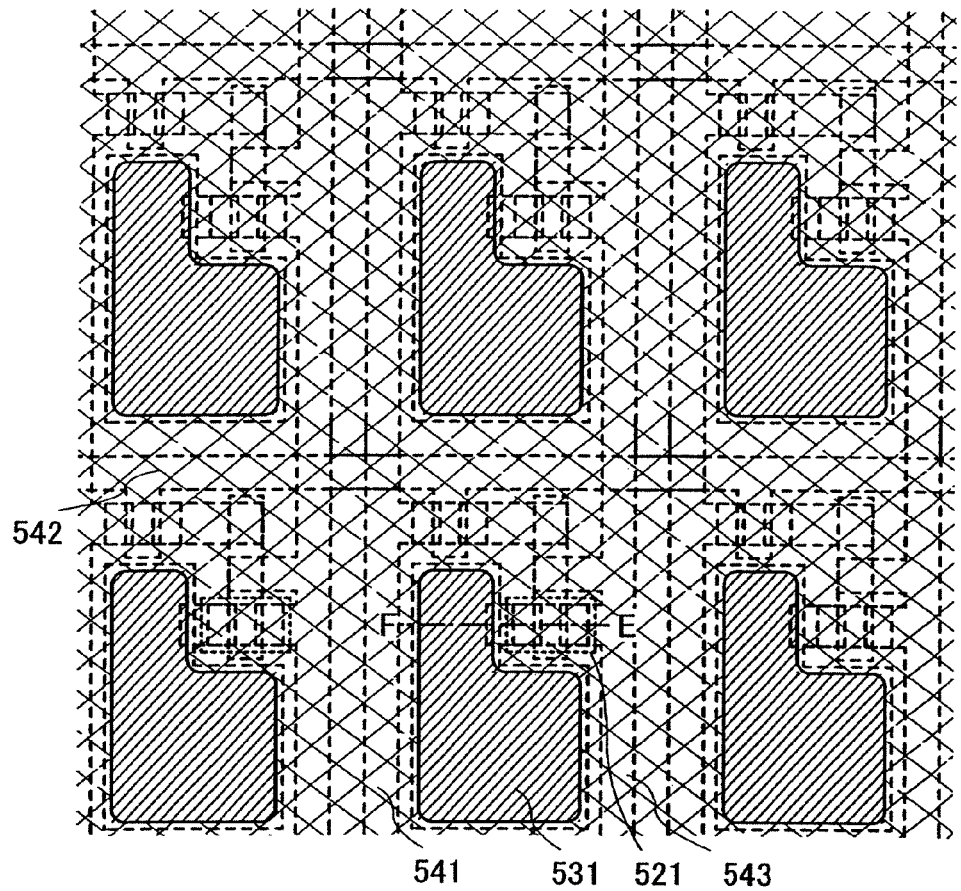
FIGS. 26A and 26B are a top view and a cross-sectional view, respectively, of a display device of the present invention.
Figure 26B:
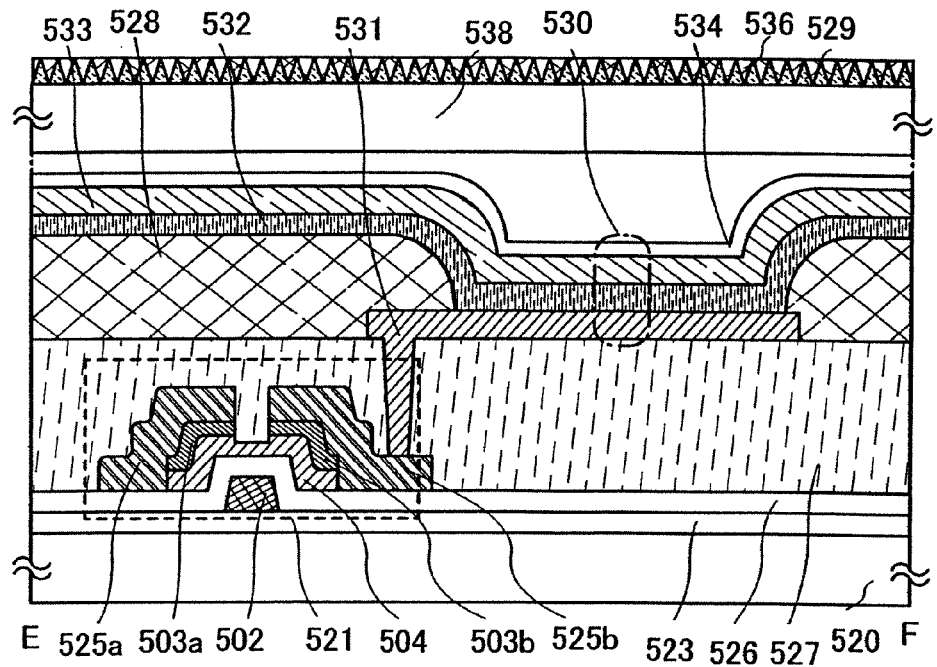

FIG. 26A is a top view of the display device, and FIG. 26B is a cross-sectional view along line E-F of FIG. 26A. Although an electroluminescent layer 532, a second electrode layer 533, and an insulating layer 534 are omitted and not illustrated in FIG. 26A, they are actually provided as illustrated in FIG. 26B.

First wirings that extend in a first direction and second wirings that extend in a second direction perpendicular to the first direction are provided over a substrate 520 having an insulating layer 523 formed as a base film. One of the first wirings is connected to a source electrode or a drain electrode of a transistor 521, and one of the second wirings is connected to a gate electrode of the transistor 521. A first electrode layer 531 is connected to a wiring layer 525b that is the source electrode or the drain electrode of the transistor 521, which is not connected to the first wiring, and a light-emitting element 530 is formed to have a stacked structure of the first electrode layer 531, the electroluminescent layer 532, and the second electrode layer 533. A partition (insulating layer) 528 is provided between adjacent light-emitting elements, and the electroluminescent layer 532 and the second electrode layer 533 are stacked over the first electrode layer and the partition (insulating layer) 528. An insulating layer 534 functioning as a protective layer and a substrate 538 functioning as a sealing substrate are provided over the second electrode layer 533. As the transistor 521, an inverted staggered thin film transistor is used (see FIGS. 26A and 26B). Light emitted from the light-emitting element 530 is extracted from the substrate 538 side. Thus, the surface of the substrate 538 on a viewer side is provided with a plurality of hexagonal pyramidal projections 529 of this embodiment mode as well as a protective layer 536 that fills a space between the pyramidal projections 529.

FIGS. 26A and 26B in this embodiment mode illustrate an example in which the transistor 521 is a channel-etched inverted staggered transistor. In FIGS. 26A and 26B, the transistor 521 includes a gate electrode layer 502, a gate insulating layer 526, a semiconductor layer 504, semiconductor layers 503a and 503b having one conductivity type, and wiring layers 525a and 525b, one of which serves as a source electrode layer and the other as a drain electrode layer.

The semiconductor layer can be formed using any of the following materials: an amorphous semiconductor (hereinafter also referred to as an "AS") formed by a vapor-phase growth method using a semiconductor material gas typified by silane or germane or by a sputtering method; a polycrystalline semiconductor that is formed by crystallizing the amorphous semiconductor by utilizing light energy or thermal energy; a semiamorphous (also referred to as microcrystalline or microcrystal) semiconductor (hereinafter also referred to as a "SAS"); and the like.

The SAS is a semiconductor having an intermediate structure between an amorphous structure and a crystalline structure (including single crystals and polycrystals) and having a third state that is stable in terms of free energy, and includes a crystalline region having short-range order and lattice distortion. The SAS is formed by glow discharge decomposition (plasma CVD) of a gas containing silicon. $SiH_4$ may be used as the gas containing silicon. Alternatively, $Si_2H_6$, $SiH_2Cl_2$, $SiHCl_3$, $SiCl_4$, $SiF_4$, or the like may also be used. Further, $F_2$ or $GeF_4$ may be mixed thereto. Such a gas containing silicon may be diluted with $H_2$ or with $H_2$ and one or more rare gas elements of He, Ar, Kr, and Ne. When a rare gas element such as helium, argon, krypton, or neon is further mixed into the gas, the lattice distortion of SAS is further promoted, and a favorable SAS with increased stability can be obtained. The semiconductor layer may also be formed by stacking an SAS layer (formed using a fluorine-source gas) and an SAS layer (formed using a hydrogen-source gas).

Typical examples of an amorphous semiconductor include hydrogenated amorphous silicon, and typical examples of a crystalline semiconductor include polysilicon and the like. Examples of polysilicon (polycrystalline silicon) include so-called high-temperature polysilicon that contains polysilicon formed at a process temperature greater than or equal to 800° C. as the main component, so-called low-temperature polysilicon that contains polysilicon formed at a process temperature less than or equal to 600° C. as the main component, and polysilicon obtained by adding an element that promotes crystallization or the like to amorphous silicon and crystallizing the amorphous silicon (by thermal treatment or by laser irradiation), and the like. Needless to say, as described above, a semiamorphous semiconductor, or a semiconductor that includes a crystalline phase in a part of a semiconductor layer may be used.

When a crystalline semiconductor layer is used for the semiconductor layer, the crystalline semiconductor layer may be formed by a known method such as a laser crystallization method, a thermal crystallization method, a thermal crystallization method using an element that promotes crystallization such as nickel, or the like. A microcrystalline semiconductor, which is a SAS, can be crystallized by laser irradiation, whereby the crystallinity thereof can be enhanced. When the element that promotes crystallization is not added, before an amorphous silicon layer is irradiated with a laser beam, hydrogen contained in the amorphous silicon film is discharged until the concentration of hydrogen becomes $1 \times 10^{20}$ atoms/cm$^3$ or less by heating the amorphous silicon layer at a temperature of 500° C. for one hour in a nitrogen atmosphere. This is because the amorphous silicon layer containing much hydrogen is damaged when irradiated with a laser beam. The thermal treatment for crystallization can be performed using a heating furnace, laser irradiation, irradiation with light emitted from a lamp (also referred to as lamp annealing), or the like. Examples of a heating method include an RTA method such as a GRTA (gas rapid thermal annealing) method or an LRTA (lamp rapid thermal annealing) method. GRTA is a method of thermal treatment using a high-temperature gas, and LRTA is a method of thermal treatment using light from a lamp.

The crystallization may be performed by adding an element that promotes crystallization (also referred to as a catalyst element or a metal element) to an amorphous semiconductor layer and applying thermal treatment (at 550 to 750° C. for 3 minutes to 24 hours) thereto in a crystallization step in which an amorphous semiconductor layer is crystallized to form a crystalline semiconductor layer. Examples of the element that promotes crystallization include one or more elements of iron (Fe), nickel (Ni), cobalt (Co), ruthenium (Ru), rhodium (Rh), palladium (Pd), osmium (Os), iridium (Ir), platinum (Pt), copper (Cu), and gold (Au).

Any method can be used to add a metal element into the amorphous semiconductor layer as long as the method is capable of making the metal element exist on the surface of or inside of the amorphous semiconductor layer. For example, a sputtering method, a CVD method, a plasma treatment method (including a plasma CVD method), an adsorption method, or a method of applying a metal salt solution can be employed. Among them, the method using a solution is simple and easy, and advantageous in that it can easily control the concentration of the metal element. It is preferable to form an oxide film on the surface of the amorphous semiconductor layer by UV irradiation in an oxygen atmosphere, a thermal oxidation method, treatment with ozone water or hydrogen peroxide including a hydroxyl radical, or the like so that the wettability of the surface of the amorphous semiconductor layer is improved and an aqueous solution is easily spread over the entire surface of the amorphous semiconductor layer.

In order to remove the element that promotes crystallization from the crystalline semiconductor layer or reduce the element, a semiconductor layer containing an impurity element is formed in contact with the crystalline semiconductor layer. Such a semiconductor layer containing an impurity element functions as a gettering sink. The impurity element may be an impurity element imparting n-type conductivity, an impurity element imparting p-type conductivity, a rare gas element, or the like. For example, one or more elements of phosphorus (P), nitrogen (N), arsenic (As), antimony (Sb), bismuth (Bi), boron (B), helium (He), neon (Ne), argon (Ar), krypton (Kr), and xenon (Xe) can be used. A semiconductor layer containing a rare gas element is formed on the crystalline semiconductor layer containing the element that promotes crystallization, and thermal treatment (at 550 to 750° C. for 3 minutes to 24 hours) is performed. The element that promotes crystallization in the crystalline semiconductor layer moves into the semiconductor layer containing a rare gas element; thus, the element that promotes crystallization in the crystalline semiconductor layer is removed or reduced. After that, the semiconductor layer containing a rare gas element, which serves as a gettering sink, is removed.

Laser irradiation can be performed by relatively moving a laser beam and the semiconductor layer. For laser irradiation, a marker may be formed in order to overlap beams with high accuracy or control the start position or the end position of laser irradiation. Such a marker may be formed on the substrate at the same time as the formation of the amorphous semiconductor layer.

In the case of using laser irradiation, a continuous-wave laser beam (a CW laser beam) or a pulsed laser beam can be used. Laser beams that can be used here are beams emitted from one or more kinds of the following lasers: a gas laser such as an Ar laser, a Kr laser, or an excimer laser; a laser using, as a medium, single-crystalline YAG, YVO$_4$, forsterite (Mg$_2$SiO$_4$), YAlO$_3$, or GdVO$_4$, or polycrystalline (ceramic) YAG, Y$_2$O$_3$, YVO$_4$, YAlO$_3$, or GdVO$_4$, to which one or more of Nd, Yb, Cr, Ti, Ho, Er, Tm, and Ta is added as a dopant; a glass laser; a ruby laser; an alexandrite laser; a Ti:sapphire laser; a copper vapor laser; and a gold vapor laser. Crystals having a large grain diameter can be obtained by irradiation with the fundamental wave of the above laser beam or the second harmonic to the fourth harmonic of the fundamental wave thereof. For example, the second harmonic (532 nm) or the third harmonic (355 nm) of a Nd:YVO$_4$ laser (the fundamental wave: 1064 nm) can be used. This laser can be either a CW laser beam or a pulsed laser beam. In the case where a CW laser beam is emitted, the power density of the laser needs to be about 0.01 to 100 MW/cm$^2$ (preferably, 0.1 to 10 MW/cm$^2$). A scanning rate is set to about 10 to 2000 cm/sec for irradiation.

Note that the laser using, as a medium, single-crystalline YAG, YVO$_4$, forsterite (Mg$_2$SiO$_4$), YAlO$_3$, or GdVO$_4$, or polycrystalline (ceramic) YAG, Y$_2$O$_3$, YVO$_4$, YAlO$_3$, or GdVO$_4$, to which one or more of Nd, Yb, Cr, Ti, Ho, Er, Tm, and Ta is added as a dopant; an Ar ion laser; or a Ti:sapphire laser can perform CW operation. Alternatively, it can also perform pulsed operation at a repetition rate of 10 MHz or more by combining Q-switching operation, mode locking, or the like. When a laser beam is pulsed at a repetition rate of 10 MHz or more, it is possible for a semiconductor layer to be irradiated with the next pulse after it is melted by the previous laser beam and before it becomes solidified. Therefore, unlike the case of using a pulsed laser with a low repetition rate, a solid-liquid interface of the semiconductor layer can be moved continuously. Thus, crystal grains that have grown continuously in the scanning direction can be obtained.

When ceramic (polycrystal) is used as a medium, the medium can be formed into a desired shape in a short time at low cost. In the case of using single crystals, a columnar medium having a diameter of several millimeters and a length of several tens of millimeters is generally used. However, in the case of using ceramic, a medium larger than that can be formed.

The concentration of the dopant such as Nd or Yb in the medium, which directly contributes to light emission, cannot be changed to a large degree either in single crystals or polycrystals. Therefore, there is a limitation to improving the output of the laser by increasing the concentration of the dopant. However, in the case of using ceramic, a laser output can be drastically increased because the size of the medium can be significantly increased than the case of using single crystals.

Further, in the case of using ceramic, a medium with a parallelepiped shape or a rectangular parallelepiped shape can be formed easily. When such a medium is used and oscillated light is made travel inside the medium in a zigzag manner, a long oscillation path can be obtained. Therefore, large amplification can be achieved and high output can be obtained. In addition, since a laser beam emitted from the medium with such a shape has a quadrangular cross section, it can easily be shaped into a linear beam unlike the case of using a circular beam, which is advantageous. When the laser beam emitted in this manner is shaped with optics, a linear beam with a short side of one millimeter or less and a long side of several millimeters to several meters can be easily obtained. In addition, when the medium is irradiated with excitation light uniformly, a linear beam with uniform energy distribution in the long-side direction can be obtained. Moreover, the semiconductor layer is preferably irradiated with the laser beam at an incident angle θ (0°<θ<90°) in order to prevent laser interference.

When the semiconductor layer is irradiated with the thusly obtained linear beam having uniform intensity, the entire surface of the semiconductor layer can be annealed more uniformly. In the case where uniform annealing is required from one end to the other end of the linear laser beam, it is necessary to exercise ingenuity, for example, by using slits or the like so as to shield light at a portion where energy is attenuated.

When the thusly obtained linear beam having uniform intensity is used for annealing the semiconductor layer and a display device is fabricated using such a semiconductor layer, the display device can have favorable and uniform characteristics.

The laser irradiation may be performed in an inert gas atmosphere such as in a rare gas or a nitrogen gas. Accordingly, surface roughness of the semiconductor layer due to laser irradiation can be suppressed, and variations of threshold voltage of transistors caused by variations of the interface state density can be suppressed.

The amorphous semiconductor layer may be crystallized by a combination of thermal treatment and laser irradiation, or several times of thermal treatment or laser irradiation alone.

The gate electrode layer can be formed by a sputtering method, an evaporation method, a CVD method, or the like.

The gate electrode layer may be formed using an element such as tantalum (Ta), tungsten (W), titanium (Ti), molybdenum (Mo), aluminum (Al), copper (Cu), chromium (Cr), or neodymium (Nd) or an alloy or compound material containing the element as its main component. Alternatively, the gate electrode layer may be formed using a semiconductor film typified by a polycrystalline silicon film doped with an impurity element such as phosphorus, or an AgPdCu alloy. The gate electrode layer may be either a single layer or stacked layers.

Although the gate electrode layer is formed in a tapered shape in this embodiment mode, the present invention is not limited thereto. The gate electrode layer may have a stacked structure in which only one layer has a tapered shape and the other layer has perpendicular sides by means of anisotropic etching. The gate electrode layers stacked may have either different taper angles or the same taper angle. When the gate electrode layer has a tapered shape, the coverage of the gate electrode layer with a film that is to be stacked thereover can be increased, and defects can be reduced. Accordingly, reliability is improved.

The source electrode layer or the drain electrode layer can be formed by depositing a conductive film by a PVD method, a CVD method, an evaporation method, or the like and then etching the conductive film into a desired shape. Alternatively, a conductive layer can be selectively formed at a desired position by a droplet discharge method, a printing method, a dispenser method, an electroplating method, or the like. As a further alternative, a reflow method or a damascene method may be used. The source electrode layer or the drain electrode layer can be formed using a conductive material such as metal, for example, Ag, Au, Cu, Ni, Pt, Pd, Ir, Rh, W, Al, Ta, Mo, Cd, Zn, Fe, Ti, Zr, Ba, Si, or Ge, or an alloy or nitride thereof. Alternatively, a stacked structure thereof may be used.

The insulating layers 523, 526, 527, and 534 may be formed using an inorganic insulating material such as silicon oxide, silicon nitride, silicon oxynitride, aluminum oxide, aluminum nitride, or aluminum oxynitride; an acrylic acid, a methacrylic acid, or derivatives thereof; a heat resistant high-molecular compound such as polyimide, aromatic polyamide, or polybenzimidazole; or a siloxane resin. Alternatively, a resin material such as a vinyl resin like polyvinyl alcohol or polyvinylbutyral, an epoxy resin, a phenol resin, a novolac resin, an acrylic resin, a melamine resin, or a urethane resin may be used. Further, an organic material such as benzocyclobutene, parylene, fluorinated arylene ether, or polyimide, a composition material containing a water-soluble homopolymer and a water-soluble copolymer, or the like may be used. The insulating layers 523, 526, 527, and 534 can be formed by a vapor-phase growth method such as a plasma CVD method or a thermal CVD method, or a sputtering method. Alternatively, they can be formed by a droplet discharge method or a printing method (such as screen printing or offset printing by which a pattern is formed). A film obtained by a coating method, an SOG film, or the like can also be used.

The structure of the thin film transistor is not limited to that shown in this embodiment mode, and the thin film transistor may have a single-gate structure in which a single channel formation region is formed, a double-gate structure in which two channel formation regions are formed, or a triple-gate structure in which three channel formation regions are formed. In addition, a thin film transistor in a peripheral driver circuit region may also have a single-gate structure, a double-gate structure, or a triple-gate structure.

Note that without limitation to the fabrication method of thin film transistors described in this embodiment mode, the present invention can be applied to a top-gate structure (such as a staggered structure or a coplanar structure), a bottom-gate structure (such as an inverted coplanar structure), a dual-gate structure having two gate electrode layers provided above and below a channel region each with a gate insulating film interposed therebetween, or another structure.

Figure 7A:
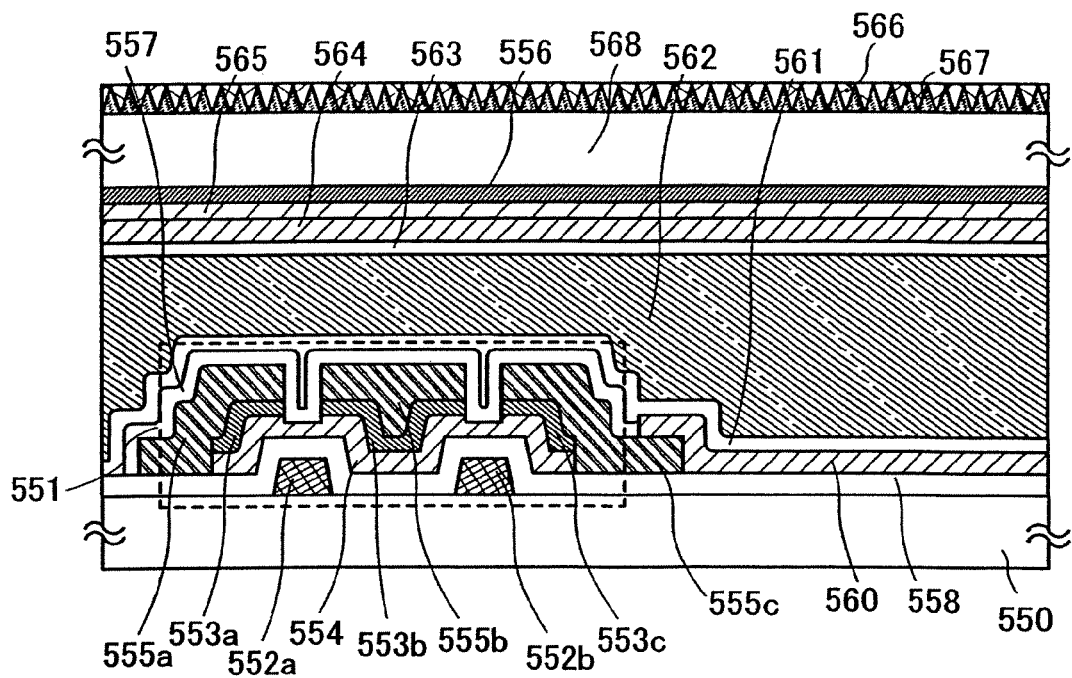
FIGS. 7A and 7B are cross-sectional views of a display device of the present invention.
Figure 7B:
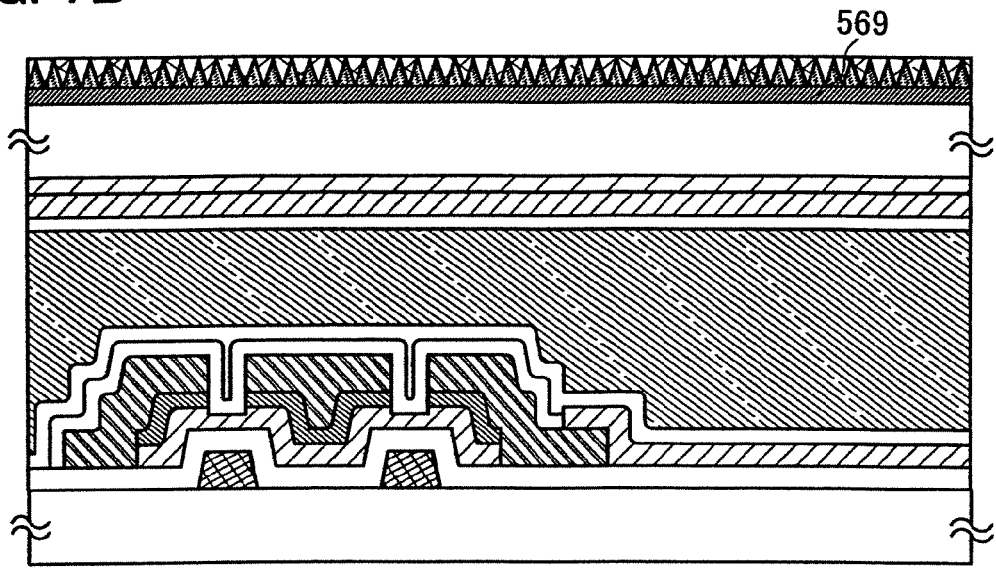

FIGS. 7A and 7B each illustrate an active matrix liquid crystal display device to which the present invention is applied. In FIGS. 7A and 7B, a substrate 550 provided with a multi-gate transistor 551, a pixel electrode layer 560, and an insulating layer 561 functioning as an orientation film is opposite a substrate 568, which is an opposite substrate, provided with an insulating layer 563 functioning as an orientation film, a conductive layer 564 functioning as an opposite electrode layer, a colored layer 565 functioning as a color filter, and a polarizer (also referred to as a polarizing plate) 556, with a liquid crystal layer 562 interposed therebetween. The surface of the substrate 568 on a viewer side is provided with a plurality of hexagonal pyramidal projections 567 of this embodiment mode as well as a protective layer 566 that fills a space between the pyramidal projections 567.

FIGS. 7A and 7B each illustrate an example in which transistor 551 is a channel-etched inverted staggered transistor having a multi-gate structure. In FIGS. 7A and 7B, the transistor 551 includes gate electrode layers 552a and 552b, a gate insulating layer 558, a semiconductor layer 554, semiconductor layers 553a to 553c having one conductivity type, and wiring layers 555a to 555c each serving as a source electrode layer or a drain electrode layer. An insulating layer 557 is provided over the transistor 551.

The display device in FIG. 7A illustrates an example in which the plurality of pyramidal projections 567 is provided on the outer side of the substrate 568, and the polarizer 556, the colored layer 565, and the conductive layer 564 are sequentially provided on the inner side. However, the polarizer 569 may be provided on the outer side (a viewer side) of the substrate 568 as illustrated in FIG. 7B, and in that case, the plurality of pyramidal projections 567 may be provided on the surface of the polarizer 569. The stacked structure of the polarizer and the colored layer is also not limited to that shown in FIG. 7A and may be appropriately determined depending on materials of the polarizer and the colored layer or conditions of a fabrication process.

Figure 13:
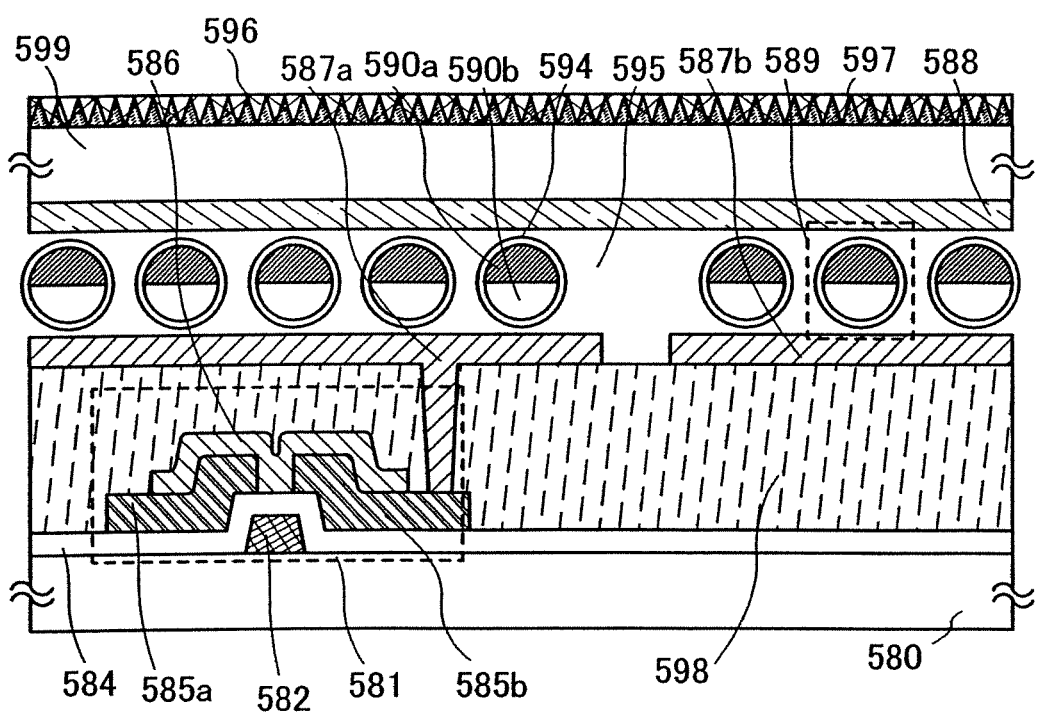
FIG. 13 is a cross-sectional view of a display device of the present invention.

FIG. 13 illustrates an active matrix electronic paper to which the present invention is applied. Although FIG. 13 illustrates an active matrix type, the present invention can also be applied to a passive matrix type.

Although FIGS. 7A and 7B each illustrate a liquid crystal display element as an exemplary display element, a display device using a twisting ball display system may also be used. A twisting ball display system employs a method in which display is performed by arranging spherical particles each of which is colored separately in black and white between the first electrode layer and the second electrode layer, and generating a potential difference between the first electrode layer and the second electrode layer so as to control the directions of the spherical particles.

A transistor 581 is an inverted coplanar thin film transistor formed over a substrate 580, which includes a gate electrode layer 582, a gate insulating layer 584, wiring layers 585a and 585b, and a semiconductor layer 586. The wiring layer 585b is electrically connected to the first electrode layer 587a through an opening formed in an insulating layer 598. Between the first electrode layers 587a and 587b and the second electrode layer 588, spherical particles 589, each of which includes a black region 590*a* and a white region 590*b*, and a cavity 594 filled with liquid around the black region 590*a* and the white region 590*b*, are provided. A space around the spherical particle 589 is filled with a filler 595 such as a resin (see FIG. 13). The surface of a substrate 599 on a viewer side is provided with a plurality of hexagonal pyramidal projections 597 of this embodiment mode as well as a protective layer 596 that fills a space between the pyramidal projections 597.

Instead of twisting balls, an electrophoretic element can be used. A microcapsule having a diameter of approximately 10 to 20 μm is used in which a transparent liquid, positively charged white microparticles, and negatively charged black microparticles are encapsulated. When an electric field is applied by the first electrode layer and the second electrode layer to the microcapsule provided between the first electrode layer and the second electrode layer, the white microparticles and the black microparticles migrate in opposite directions to each other, so that white or black can be displayed. A display element using this principle is an electrophoretic display element, and is generally called electronic paper. The electrophoretic display element has higher reflectivity than a liquid crystal display element, and thus, an auxiliary light is unnecessary, low-power-consumption drive is possible, and a display portion can be recognized in a dusky place. Further, even when power is not supplied to the display portion, an image that has been displayed once can be retained. Thus, it is possible for an image that has been displayed once to be retained, even if the semiconductor device having a display function is put away from a source of electric waves.

The transistor may have any structure, as long as it can serve as a switching element. The semiconductor layer may be formed using various semiconductors such as an amorphous semiconductor, a crystalline semiconductor, a polycrystalline semiconductor, and a microcrystalline semiconductor. It is also possible to use an organic transistor that is formed using an organic compound.

The display device of this embodiment mode may have any structure as long as it has pyramidal projections that are densely arranged in a contiguous manner. For example, any of the following structures may be used: pyramidal projections, as one continuous structure, are directly formed in the surface of a substrate (film); the surface of a substrate (film) is patterned to form pyramidal projections; and pyramidal shapes are selectively formed by a printing method such as nanoimprinting. Alternatively, pyramidal projections may be formed on a substrate (film) through a different step.

The plurality of pyramidal projections may be either one continuous film or a structure obtained by densely arranging a plurality of pyramidal projections on the substrate.

The display device in this embodiment mode has a feature that it has a plurality of hexagonal pyramidal projections formed on the surface of a display screen, in order to attain an anti-reflection function to prevent reflection of incident light from external. When a display screen has a plane surface (a plane that is parallel with the display screen) with respect to incident light from external, the incident light is reflected to a viewer side. Therefore, a display device with a smaller plane region can have a higher anti-reflection function. Further, the surface of the display screen preferably has a plurality of angles in order to scatter incident light from external more effectively.

The hexagonal pyramidal projections in this embodiment mode can be most densely arranged with no space therebetween. Further, such a pyramidal projection can have the largest possible number of side surfaces of all similar pyramidal shapes. Therefore, it has an optimal shape to attain a high anti-reflection function that can effectively scatter incident light in many directions.

The plurality of pyramidal projections is arranged in a contiguous pattern. A side of the base of each pyramidal projection is provided to be in contact with a side of the base of an adjacent pyramidal projection. The plurality of pyramidal projections has no space therebetween and covers the surface of the display screen. Accordingly, a plane portion of the surface of the display screen is not exposed by the plurality of pyramidal projections as illustrated in FIGS. 7A, 7B, 13, 26A, and 26B, and light from external is incident on the sloping side surfaces of the plurality of pyramidal projections, whereby reflection of incident light from external at the plane portion can be reduced. Such a structure is preferable because each pyramidal projection has many side surfaces that differ in angle from the base and, therefore, incident light can be scattered in many directions.

Further, since each hexagonal pyramidal projection is in contact with a plurality of other hexagonal pyramidal projections at vertices of the base, and since the base of such a pyramidal projection is surrounded by a plurality of side surfaces forming an angle with the base, the pyramidal projection can easily reflect incident light in many directions. Therefore, such a hexagonal pyramidal projection having many vertices at its base has a higher anti-reflection function.

In this embodiment mode, an interval between the apexes of the plurality of pyramidal projections is preferably less than or equal to 350 nm and the height of each pyramidal projection is preferably greater than or equal to 800 nm. In addition, the fill rate per unit area of the display screen with the bases of the plurality of pyramidal projections is preferably greater than or equal to 80%, or more preferably greater than or equal to 90%. Accordingly, the percentage of light from external that is incident on the plane portion can be reduced, and reflection of incident light to a viewer side can be prevented, which is advantageous.

The pyramidal projection can be formed using not a material with a uniform refractive index but a material whose refractive index varies from a portion closer to its side surface to a portion closer to the display screen side. For example, a portion of the plurality of pyramidal projections, closer to its side surface, is formed using a material with about an equal refractive index to air or the protective layer. Such a structure enables a reduction in reflection of light from external that is incident from air on a side surface of the pyramidal projection. Meanwhile, a portion of the plurality of pyramidal projections, closer to a substrate of the display screen side, is formed using a material with about an equal refractive index to the substrate. Such a structure enables a reduction in reflection, at an interface between the pyramidal projection and the substrate, of light that propagates through the pyramidal projection and is incident on the substrate. When a glass substrate, which has a higher refractive index than air or the protective layer, is used for the substrate, each pyramidal projection may be formed to have a structure in which a portion closer to its apex is formed of a material with a lower refractive index, whereas a portion closer to its base is formed of a material with a higher refractive index, so that the refractive index of the pyramidal projection increases from the apex toward the base.

A material used for forming the pyramidal projections may be appropriately determined in accordance with a material of the substrate forming a display screen surface, such as silicon, nitrogen, fluorine, oxide, nitride, or fluoride. Examples of oxide include silicon oxide ($SiO_2$), boric oxide ($B_2O_3$), sodium oxide ($NaO_2$), magnesium oxide (MgO), aluminum oxide (alumina) ($Al_2O_3$), potassium oxide ($K_2O$), calcium oxide (CaO), diarsenic trioxide (arsenious oxide) ($As_2O_3$), strontium oxide (SrO), antimony oxide ($Sb_2O_3$), barium oxide (BaO), indium tin oxide (ITO), zinc oxide (ZnO), indium zinc oxide (IZO) in which indium oxide is mixed with zinc oxide (ZnO), a conductive material in which indium oxide is mixed with silicon oxide ($SiO_2$), organic indium, organotin, indium oxide containing tungsten oxide, indium zinc oxide containing tungsten oxide, indium oxide containing titanium oxide, and indium tin oxide containing titanium oxide. Examples of nitride include aluminum nitride (AlN) and silicon nitride (SiN). Examples of fluoride include lithium fluoride (LiF), sodium fluoride (NaF), magnesium fluoride ($MgF_2$), calcium fluoride ($CaF_2$), and lanthanum fluoride ($LaF_3$). Further, the pyramidal projections may be formed using one or more materials selected from the above-mentioned silicon, nitrogen, fluorine, oxide, nitride, or fluoride. The mixing ratio thereof may be appropriately determined in accordance with the ratio of components (the composition ratio) of the substrate.

The pyramidal projections can be formed by the steps of depositing a thin film by a sputtering method, a vacuum evaporation method, a PVD (physical vapor deposition) method, or a CVD (chemical vapor deposition) method such as a low-pressure CVD (LPCVD) method or a plasma CVD method, and then etching the thin film into a desired shape. Alternatively, a droplet discharge method by which a pattern can be formed selectively, a printing method by which a pattern can be transferred or drawn (a method for forming a pattern such as screen printing or offset printing), a coating method such as a spin coating method, a dipping method, a dispenser method, a brush painting method, a spray method, a flow coating method, or the like can be employed. As a further alternative, an imprinting technique or a nanoimprinting technique with which a nanoscale three-dimensional structure can be formed by transfer can be employed. Imprinting and nanoimprinting are techniques with which a minute three-dimensional structure can be formed without using a photolithography process.

It is acceptable as long as the protective layer is formed with a material having a lower refractive index than at least the material used for the pyramidal projections. Accordingly, the material used for the protective layer can be appropriately determined based on materials of a substrate forming a display screen of the display device and pyramidal projections formed on the substrate.

The protective layer can be formed using the same material as the pyramidal projections, for example. However, as a material having a lower refractive index, aerogel including silica, alumina, and carbon, or the like can be used. A fabrication method thereof is preferably a wet process. For example, a droplet discharge method by which a pattern can be formed selectively, a printing method by which a pattern can be transferred or drawn (a method for forming a pattern such as screen printing or offset printing), a coating method such as a spin coating method, a dipping method, a dispenser method, a brush painting method, a spray method, a flow coating method, or the like can be employed.

The display device in this embodiment mode has a plurality of pyramidal projections formed on its surface. Since the side surfaces of each pyramidal projection do not form a plane that is parallel with a surface of a display screen, they reflect incident light from external, not to a viewer side but to an adjacent pyramidal projection. Otherwise, the reflected light propagates through a space between the adjacent pyramidal projections. A part of incident light from external propagates through a pyramidal projection whereas light reflected at a side surface of the pyramidal projection is incident on an adjacent pyramidal projection. In this manner, incident light from external that is reflected at a side surface of a pyramidal projection repeats incidence on adjacent pyramidal projections.

In other words, the number of times light from external is incident on the pyramidal projections of the display device can be increased, whereby the amount of incident light from external that is transmitted through the pyramidal projections is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in anti-reflection function due to entry of dust or the like can be prevented, and filling a space between the pyramidal projections can increase the physical strength of the display device. Accordingly, reliability can be improved.

This embodiment mode provides a display device having a plurality of hexagonal pyramidal projections formed contiguously on its surface and a protective layer provided between the pyramidal projections. Such a display device has high visibility and has an anti-reflection function that can further reduce reflection of incident light from external. Therefore, a display device with higher image quality and higher performance can be fabricated.

This embodiment mode can be freely combined with Embodiment Mode 1.

Embodiment Mode 4

This embodiment mode will describe an exemplary display device that has high visibility and has an anti-reflection function by which reflection of incident light from external can be further reduced. Specifically, this embodiment mode illustrates a liquid crystal display device that uses liquid crystal elements as display elements.

Figure 8A:
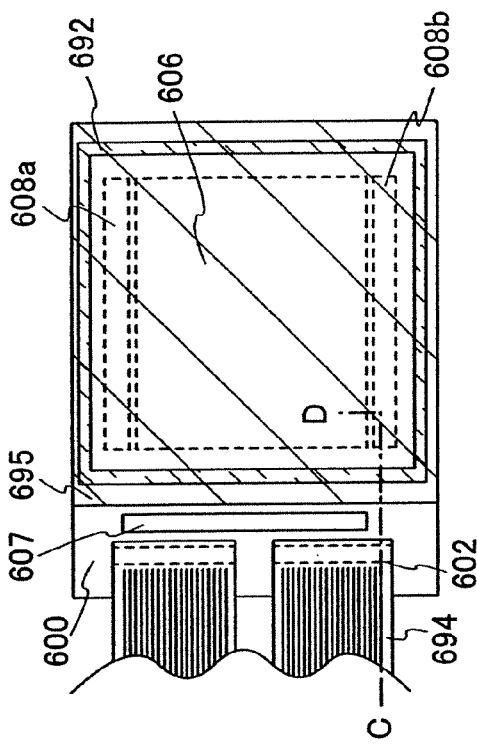
FIGS. 8A and 8B are a top view and a cross-sectional view, respectively, of a display device of the present invention.
Figure 8B:
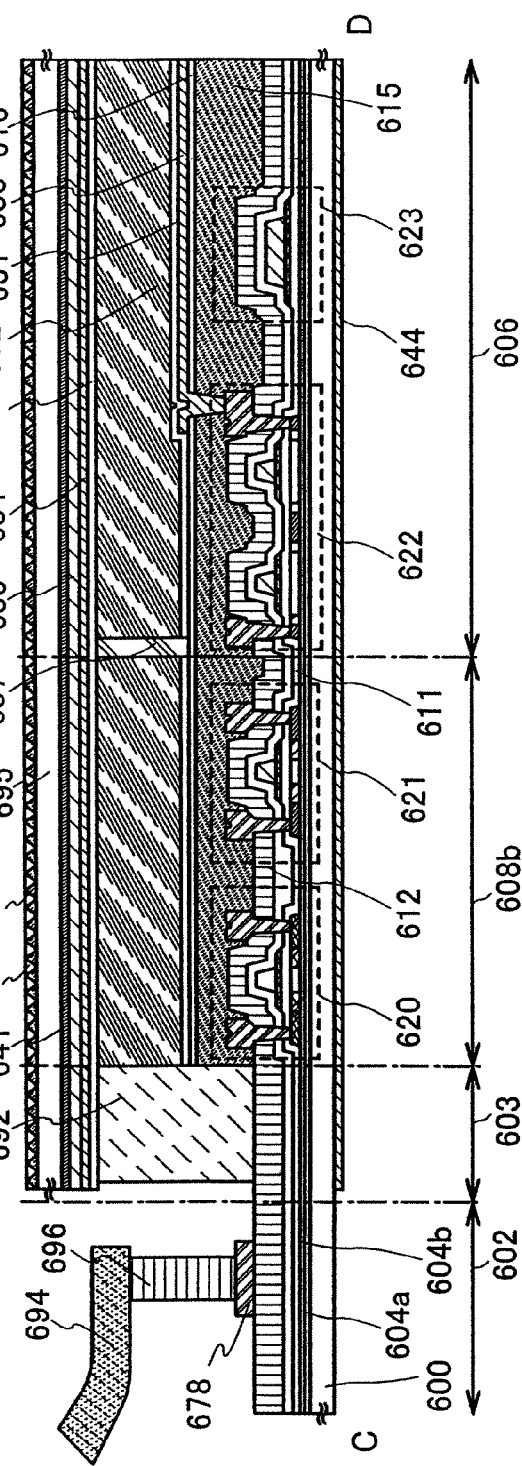

FIG. 8A is a top view of a liquid crystal display device having a plurality of hexagonal pyramidal projections, and FIG. 8B is a cross-sectional view along line C-D of FIG. 8A. In the top view of FIG. 8A, the plurality of pyramidal projections is omitted.

As illustrated in FIGS. 8A and 8B, a pixel region 606, a driver circuit region 608a that is a scan line driver circuit region, and a driver circuit region 608b that is a scan line driver circuit region are sealed with a sealant 692, between a substrate 600 and an opposite substrate 695. A driver circuit region 607 that is a signal line driver circuit region formed using a driver IC is provided over the substrate 600. In the pixel region 606, a transistor 622 and a capacitor 623 are provided. In the driver circuit region 608b, a driver circuit including a transistor 620 and a transistor 621 is provided. Note that reference numerals 602 and 603 denote an external terminal connection region and a wiring region, respectively. An insulating substrate similar to that shown in the above embodiment mode can be used for the substrate 600. Although there is concern that a substrate made of a synthetic resin generally has a lower allowable temperature limit than other substrates, such a substrate can be employed if the substrate is transferred after a fabrication process using a high heat-resistance substrate.

In the pixel region 606, the transistor 622 functioning as a switching element is provided over the substrate 600 with a base film 604a and a base film 604b interposed therebetween. In this embodiment mode, the transistor 622 is a multi-gate thin film transistor (TFT) and includes a semiconductor layer having impurity regions that function as source and drain regions, a gate insulating layer, a gate electrode layer having a stacked structure of two layers, and source and drain electrode layers. The source or drain electrode layer is in contact with and electrically connects the impurity region of the semiconductor layer and a pixel electrode layer 630. A thin film transistor can be fabricated by using various methods. For example, a crystalline semiconductor film is used for an active layer. A gate electrode is provided over the crystalline semiconductor film with a gate insulating film interposed therebetween. An impurity element can be added to the active layer by using the gate electrode. When an impurity element is added by using the gate electrode in this manner, there is no need to form a mask for addition of an impurity element. The gate electrode can have either a single-layer structure or a stacked structure. The impurity concentration of the impurity region is controlled so that the impurity region can be formed to have both a high-concentration impurity region and a low-concentration impurity region. A thin film transistor having a low-concentration impurity region in this manner is referred to as an LDD (lightly doped drain) structure. The low-concentration impurity region can be formed to overlap with the gate electrode, and such a thin film transistor is referred to as a GOLD (gate overlapped LDD) structure. Phosphorus (P) is used for the impurity region so that the thin film transistor is formed to be an n-channel transistor. In the case of forming a p-channel transistor, boron (B) or the like may be used for the impurity region. After that, an insulating film 611 and an insulating film 612 are formed to cover the gate electrode and the like. A hydrogen element mixed in the insulating film 611 (and the insulating film 612) can terminate dangling bonds of the crystalline semiconductor film.

In order to further improve planarity, an insulating film 615 and an insulating film 616 may be formed as interlayer insulating films. The insulating film 615 and the insulating film 616 can be formed using an organic material, an inorganic material, or a stacked structure thereof. For example, the insulating film 615 and the insulating film 616 can be formed with a material selected from inorganic insulating substances, such as silicon oxide, silicon nitride, silicon oxynitride, silicon nitride oxide, aluminum nitride, aluminum oxynitride containing more oxygen than nitrogen, aluminum nitride oxide containing more nitrogen than oxygen, aluminum oxide, diamond-like carbon (DLC), polysilazane, a nitrogen-containing carbon (CN), PSG (phosphosilicate glass), BPSG (borophosphosilicate glass), and alumina. Alternatively, an organic insulating material may be used. An organic insulating material may be either photosensitive or non-photosensitive, and polyimide, acrylic, polyamide, polyimide amide, resist, benzocyclobutene, a siloxane resin, or the like can be used. Note that the siloxane resin corresponds to a resin having Si—O—Si bonds. Siloxane is composed of a skeleton formed by the bond of silicon (Si) and oxygen (O). As a substituent, an organic group containing at least hydrogen (for example, an alkyl group or aromatic hydrocarbon) is used. Alternatively, a fluoro group may be used as the substituent. As a further alternative, both a fluoro group and an organic group containing at least hydrogen may be used as the substituent.

When a crystalline semiconductor film is used, the pixel region and the driver circuit region can be formed over the same substrate. In that case, transistors in the pixel region and transistors in the driver circuit region 608*b* are formed at the same time. The transistors used for the driver circuit region 608*b* constitute a CMOS circuit. Although the thin film transistors included in the CMOS circuit have a GOLD structure, they may have an LDD structure like the transistor 622.

The structure of the thin film transistor is not limited to that shown in this embodiment mode, and the thin film transistor may have a single-gate structure in which a single channel formation region is formed, a double-gate structure in which two channel formation regions are formed, or a triple-gate structure in which three channel formation regions are formed. In addition, a thin film transistor in a peripheral driver circuit region may also have a single-gate structure, a double-gate structure, or a triple-gate structure.

Note that without limitation to the fabrication method of thin film transistors described in this embodiment mode, the present invention can be applied to a top-gate structure (such as a staggered structure), a bottom-gate structure (such as an inverted staggered structure), a dual-gate structure having two gate electrode layers provided above and below a channel region each with a gate insulating film interposed therebetween, or another structure.

Next, an insulating layer 631 called an orientation film is formed by a printing method or a droplet discharge method to cover the pixel electrode layer 630 and the insulating film 616. Note that the insulating layer 631 can be selectively formed by using a screen printing method or an offset printing method. After that, rubbing treatment is performed. The rubbing treatment is not necessarily performed when the mode of liquid crystals is a VA mode, for example. An insulating layer 633 functioning as an orientation film is similar to the insulating layer 631. Then, the sealant 692 is formed by a droplet discharge method in a peripheral region of the pixel region.

After that, the opposite substrate 695 provided with the insulating layer 633 functioning as an orientation film, a conductive layer 634 functioning as an opposite electrode, a colored layer 635 functioning as a color filter, a polarizer 641 (also referred to as a polarizing plate), and hexagonal pyramidal projections 642 is attached to the substrate 600 that is a TFT substrate with a spacer 637 interposed therebetween, and a liquid crystal layer 632 is provided in a gap therebetween. Since the liquid crystal display device of this embodiment mode is of transmissive type, a polarizer (a polarizing plate) 644 is also provided on a side of the substrate 600 opposite to the side having elements. The polarizer can be provided on the substrate using an adhesive layer. The sealant may be mixed with a filler, and further, the opposite substrate 695 may be provided with a light-shielding film (a black matrix), or the like. Note that the color filter or the like may be formed with materials exhibiting red (R), green (G), and blue (B) when the liquid crystal display device is formed to be a full-color display device. In the case of forming a monochrome display device, the colored layer may be omitted or formed with a material exhibiting at least one color.

The display device in FIGS. 8A and 8B illustrates an example in which the pyramidal projections 642 are provided on the outer side of the opposite substrate 695 whereas the polarizer 641, the colored layer 635, and the conductive layer 634 are sequentially provided on the inner side. However, the polarizer may be provided on the outer side (a viewer side) of the substrate 695, and in that case, the pyramidal projections may be provided on the surface of the polarizer (the polarizing plate). The stacked structure of the polarizer and the colored layer is also not limited to that shown in FIGS. 8A and 8B and may be appropriately determined depending on materials of the polarizer and the colored layer or conditions of a fabrication process.

Note that the color filter is not provided when, for example, RGB light-emitting diodes (LEDs) and the like are arranged as a backlight and a successive additive color mixing method (a field sequential method) is employed in which color display is performed by time division. The black matrix is preferably provided so as to overlap with the transistor or the CMOS circuit for the sake of reducing reflection of incident light from external by wirings of the transistor or the CMOS circuit. Note that the black matrix may also be provided so as to overlap with the capacitor. This is because reflection of light by a metal film forming the capacitor can be prevented.

The liquid crystal layer can be formed by a dispenser method (dropping method), or an injecting method by which liquid crystals are injected using a capillary phenomenon after attaching the substrate 600 having elements to the opposite substrate 695. A dropping method is preferably employed when a large-sized substrate is employed to which an injecting method is difficult to be applied.

Although the spacer may be provided by dispersing particles with a size of several micrometers, the spacer in this embodiment mode is formed by a method in which a resin film is formed over the entire surface of the substrate and then etched. A material of the spacer is applied by a spinner and then subjected to light exposure and development to form a predetermined pattern. Moreover, the material is heated at 150 to 200° C. in a clean oven or the like so as to be hardened. The thusly formed spacer can have various shapes depending on the conditions of the light exposure and development. It is preferable that the spacer have a columnar shape with a flat top so that the mechanical strength of the liquid crystal display device can be secured when the opposite substrate is attached. The shape of the spacer can be conical, pyramidal, or the like, but the present invention is not limited to these.

Next, a terminal electrode layer 678 electrically connected to the pixel region is provided with an FPC 694 that is a connection wiring board, through an anisotropic conductive layer 696. The FPC 694 functions to transmit signals or potential from external. Through the above steps, a liquid crystal display device having a display function can be fabricated.

Wirings and the gate electrode layer of the transistor, the pixel electrode layer 630, and the conductive layer 634 that is an opposite electrode layer can be formed using a material selected from indium tin oxide (ITO), indium zinc oxide (IZO) in which indium oxide is mixed with zinc oxide (ZnO), a conductive material in which indium oxide is mixed with silicon oxide ($SiO_2$), organic indium, organotin, indium oxide containing tungsten oxide, indium zinc oxide containing tungsten oxide, indium oxide containing titanium oxide, or indium tin oxide containing titanium oxide; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy or metal nitride of such metals.

The polarizing plate and the liquid crystal layer may be stacked with a retardation plate interposed therebetween.

The display device in this embodiment mode has a feature that it has a plurality of hexagonal pyramidal projections formed on the surface of a display screen, in order to attain an anti-reflection function to prevent reflection of incident light from external. In this embodiment mode, the hexagonal pyramidal projections 642 are provided on the surface of the opposite substrate 695 that is a viewer side of the display screen, and a protective layer 643 is formed to fill a space between the pyramidal projections 642. When a display screen has a plane surface (a plane that is parallel with the display screen) with respect to incident light from external, the incident light is reflected to a viewer side. Therefore, a display device with a smaller plane region can have a higher anti-reflection function. Further, the surface of the display screen preferably has a plurality of angles in order to scatter incident light from external more effectively.

The hexagonal pyramidal projections in this embodiment mode can be most densely arranged with no space therebetween. Further, such a pyramidal projection can have the largest possible number of side surfaces of all similar pyramidal shapes. Therefore, it has an optimal shape to attain a high anti-reflection function that can effectively scatter incident light in many directions.

The plurality of pyramidal projections is arranged in a contiguous pattern. A side of the base of each pyramidal projection is provided to be in contact with a side of the base of an adjacent pyramidal projection. The plurality of pyramidal projections has no space therebetween and covers the surface of the display screen. Accordingly, a plane portion of the surface of the display screen is not exposed by the plurality of pyramidal projections as illustrated in FIGS. 8A and 8B, and light from external is incident on the sloping side surfaces of the plurality of pyramidal projections, whereby reflection of incident light from external at the plane portion can be reduced. Such a structure is preferable because each pyramidal projection has many side surfaces that differ in angle from the base and, therefore, incident light can be scattered in many directions.

Further, since each hexagonal pyramidal projection is in contact with a plurality of other hexagonal pyramidal projections at vertices of the base, and since the base of such a pyramidal projection is surrounded by a plurality of side surfaces forming an angle with the base, the pyramidal projection can easily reflect incident light in many directions. Therefore, such a hexagonal pyramidal projection having many vertices at its base has a higher anti-reflection function.

In this embodiment mode, an interval between the apexes of the plurality of pyramidal projections is preferably less than or equal to 350 nm and the height of each pyramidal projection is preferably greater than or equal to 800 nm. In addition, the fill rate per unit area of the display screen with the bases of the plurality of pyramidal projections is preferably greater than or equal to 80%, or more preferably greater than or equal to 90%. Accordingly, the percentage of light from external that is incident on the plane portion can be reduced, and reflection of incident light to a viewer side can be prevented, which is advantageous.

Since the plurality of pyramidal projections 642 in this embodiment mode is equally spaced from the apexes of a plurality of adjacent pyramidal projections, a cross section of each pyramidal projection is an isosceles triangle in the drawing.

The display device of this embodiment mode may have any structure as long as it has pyramidal projections that are densely arranged in a contiguous manner. For example, any of the following structures may be used: pyramidal projections, as one continuous structure, are directly formed in the surface of a substrate (film); the surface of a substrate (film) is patterned to form pyramidal projections; and pyramidal shapes are selectively formed by a printing method such as nanoimprinting. Alternatively, pyramidal projections may be formed on a substrate (film) through a different step.

The plurality of pyramidal projections may be either one continuous film or a structure obtained by densely arranging a plurality of pyramidal projections on the substrate.

The pyramidal projection can be formed using not a material with a uniform refractive index but a material whose refractive index varies from a portion closer to its side surface to a portion closer to the display screen side. For example, a portion of the plurality of pyramidal projections, closer to its side surface, is formed using a material with about an equal refractive index to air or the protective layer. Such a structure enables a reduction in reflection of light from external that is incident from air on a side surface of the pyramidal projection. Meanwhile, a portion of the plurality of pyramidal projections, closer to a substrate of the display screen side, is formed using a material with about an equal refractive index to the substrate. Such a structure enables a reduction in reflection, at an interface between the pyramidal projection and the substrate, of light that propagates through the pyramidal projection and is incident on the substrate. When a glass substrate, which has a higher refractive index than air or the protective layer, is used for the substrate, each pyramidal projection may be formed to have a structure in which a portion closer to its apex is formed of a material with a lower refractive index, whereas a portion closer to its base is formed of a material with a higher refractive index, so that the refractive index of the pyramidal projection increases from the apex toward the base.

The display device in this embodiment mode has a plurality of pyramidal projections formed on its surface. Since the side surfaces of each pyramidal projection do not form a plane that is parallel with a surface of a display screen, they reflect incident light from external, not to a viewer side but to an adjacent pyramidal projection. Otherwise, the reflected light propagates through a space between the adjacent pyramidal projections. A part of incident light from external propagates through a pyramidal projection whereas light reflected at a side surface of the pyramidal projection is incident on an adjacent pyramidal projection. In this manner, incident light from external that is reflected at a side surface of a pyramidal projection repeats incidence on adjacent pyramidal projections.

In other words, the number of times light from external is incident on the pyramidal projections of the display device can be increased, whereby the amount of incident light from external that is transmitted through the pyramidal projections is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in anti-reflection function due to entry of dust or the like can be prevented, and filling a space between the pyramidal projections can increase the physical strength of the display device. Accordingly, reliability can be improved.

This embodiment mode provides a display device having a plurality of hexagonal pyramidal projections formed contiguously on its surface and a protective layer provided between the pyramidal projections. Such a display device has high visibility and has an anti-reflection function that can further reduce reflection of incident light from external. Therefore, a display device with higher image quality and higher performance can be fabricated.

This embodiment mode can be freely combined with Embodiment Mode 1.

Embodiment Mode 5

This embodiment mode will describe an exemplary display device that has high visibility and has an anti-reflection function by which reflection of incident light from external can be further reduced. Specifically, this embodiment mode illustrates a light-emitting display device that uses light-emitting elements as display elements. A method of fabricating the display device in this embodiment mode will be described in detail with reference to FIGS. 9A and 9B and FIG. 12.

As a base film, a base film 101a is formed using a silicon nitride oxide film with a thickness of 10 to 200 nm (preferably 50 to 150 nm) over a substrate 100 having an insulating surface, and a base film 101b is formed thereover using a silicon oxynitride film with a thickness of 50 to 200 nm (preferably 100 to 150 nm). In this embodiment mode, the base films 101a and 101b are formed by a plasma CVD method.

Alternatively, an acrylic acid, a methacrylic acid, or derivatives thereof; a heat-resistant high-molecular compound such as polyimide, aromatic polyamide, or polybenzimidazole; or a siloxane resin may be used. Alternatively, a resin material such as a vinyl resin like polyvinyl alcohol or polyvinylbutyral, an epoxy resin, a phenol resin, a novolac resin, an acrylic resin, a melamine resin, or a urethane resin may be used. Further, an organic material such as benzocyclobutene, parylene, fluorinated arylene ether, or polyimide, a composition material containing a water-soluble homopolymer and a water-soluble copolymer, or the like may be used. Moreover, an oxazole resin can be used, and for example, a photo-curing polybenzoxazole or the like can be used.

The base films can be formed by a sputtering method, a PVD (physical vapor deposition) method, a CVD (chemical vapor deposition) method such as a low-pressure CVD (LPCVD) method or a plasma CVD method, or the like. Further, a droplet discharge method, a printing method (a method for forming a pattern such as screen printing or offset printing), a coating method such as a spin coating method, a dipping method, a dispenser method, or the like can also be used.

A glass substrate or a quartz substrate can be used for the substrate 100. In addition, a plastic substrate having sufficient heat resistance to withstand a processing temperature of this embodiment mode may be used, or a flexible film-form substrate may be used. Examples of the plastic substrate include a substrate made of PET (polyethylene terephthalate), PEN (polyethylenenaphthalate), or PES (polyethersulfone). Examples of the flexible substrate include a substrate made of a synthetic resin such as acrylic. Since the display device fabricated in this embodiment mode has a structure in which light emitted from a light-emitting element is extracted through the substrate 100, the substrate 100 should have a light-transmitting property.

The base film can be formed using silicon oxide, silicon nitride, silicon oxynitride, silicon nitride oxide, or the like and may have either a single-layer structure or a stacked structure of two or more layers.

Next, a semiconductor film is formed over the base film. The semiconductor film may be formed to a thickness of 25 to 200 nm (preferably, 30 to 150 nm) by a sputtering method, an LPCVD method, a plasma CVD method, or the like. In this embodiment mode, it is preferable to use a crystalline semiconductor film that is obtained by crystallizing an amorphous semiconductor film with a laser beam.

The semiconductor film obtained in this manner may be doped with a slight amount of an impurity element (boron or phosphorus) to control the threshold voltage of a thin film transistor. This doping with an impurity element may be performed to an amorphous semiconductor film before a crystallization step. When the doping with an impurity element is performed to the amorphous semiconductor film, activation of the impurity element can be combined with subsequent thermal treatment for crystallization. In addition, defects and the like caused by doping can be improved.

Next, the crystalline semiconductor film is etched into a desired shape to form a semiconductor layer.

The etching may be performed by either plasma etching (dry etching) or wet etching; however, plasma etching is suitable for treating a large-sized substrate. For an etching gas, a fluorine-source gas such as $CF_4$ or $NF_3$ or a chlorine-source gas such as $Cl_2$ or $BCl_3$ is used. Further, an inert gas such as He or Ar may be added thereto as appropriate. Alternatively, when the etching is performed using atmospheric pressure discharge, local electric discharge machining is possible. In that case, a mask layer does not need to be formed over the entire surface of the substrate.

In the present invention, a conductive layer forming a wiring layer or an electrode layer, a mask layer used for forming a predetermined pattern, or the like may be formed by a method capable of selectively forming a pattern, such as a droplet discharge method. With a droplet discharge (ejection) method (also referred to as an ink-jet method depending on its method), a predetermined pattern (of a conductive layer or an insulating layer) can be formed by selectively discharging (ejecting) droplets of a composition mixed for a specific purpose. At this time, treatment for controlling wettability or adhesiveness may be performed to a subject region. Alternatively, a method by which a pattern can be transferred or drawn, such as a printing method (a method for forming a pattern such as screen printing or offset printing), a dispenser method, a brush painting method, a spray method, a flow coating method, or the like may also be used.

A mask used in this embodiment mode is formed with a resin material such as an epoxy resin, an acrylic resin, a phenol resin, a novolac resin, a melamine resin, or a urethane resin. Alternatively, an organic material such as benzocyclobutene, parylene, fluorinated arylene ether, or polyimide having a light-transmitting property; a compound material made by polymerization of siloxane-based polymers or the like; a composition material containing a water-soluble homopolymer and a water-soluble copolymer; or the like may be used. As a further alternative, commercial resist materials including a photosensitizer may be used. For example, a positive resist, a negative resist, or the like may be used. In the case of using a droplet discharge method and using any of the above-described materials, the surface tension and viscosity of the materials are appropriately controlled by adjusting the concentration of a solvent or adding a surfactant or the like.

A gate insulating layer 107 is formed to cover the semiconductor layer. The gate insulating layer is formed by depositing an insulating film containing silicon to a thickness of 10 to 150 nm by a plasma CVD method, a sputtering method, or the like. The gate insulating layer 107 may be formed using known materials such as an oxide material or nitride material of silicon typified by silicon nitride, silicon oxide, silicon oxynitride, or silicon nitride oxide, and it may have either a single-layer structure or a stacked structure. In addition, the gate insulating layer 107 may be formed to have a three-layer structure of a silicon nitride film, a silicon oxide film, and a silicon nitride film. Alternatively, a single layer of a silicon oxynitride film or a stacked layer of two layers may be used.

Next, a gate electrode layer is formed over the gate insulating layer 107. The gate electrode layer can be formed by a sputtering method, an evaporation method, a CVD method, or the like. The gate electrode layer may be formed using an element selected from tantalum (Ta), tungsten (W), titanium (Ti), molybdenum (Mo), aluminum (Al), copper (Cu), chromium (Cr), or neodymium (Nd), or an alloy material or a compound material containing the above element as its main component. Alternatively, the gate electrode layer may be formed using a semiconductor film typified by a polycrystalline silicon film doped with an impurity element such as phosphorus, or an AgPdCu alloy. The gate electrode layer may be either a single layer or stacked layers.

Although the gate electrode layer is formed in a tapered shape in this embodiment mode, the present invention is not limited thereto. The gate electrode layer may have a stacked structure in which only one layer has a tapered shape and the other layer has perpendicular sides by means of anisotropic etching. The gate electrode layers stacked may have either different taper angles or the same taper angle. When the gate electrode layer has a tapered shape, the coverage of the gate electrode layer with a film that is to be stacked thereover can be increased, and defects can be reduced. Accordingly, reliability is improved.

By the etching step for formation of the gate electrode layer, the gate insulating layer 107 may be etched to some degree and the thickness thereof may be reduced (so-called film reduction).

An impurity element is added to the semiconductor layer to form an impurity region. The impurity concentration of the impurity region is controlled so that the impurity region can be formed to have both a high-concentration impurity region and a low-concentration impurity region. A thin film transistor having a low-concentration impurity region is referred to as an LDD (lightly doped drain) structure. The low-concentration impurity region can be formed to overlap with the gate electrode, and such a thin film transistor is referred to as a GOLD (gate overlapped LDD) structure. Phosphorus (P) is used for the impurity region so that the thin film transistor is formed to be an n-channel transistor. In the case of forming a p-channel transistor, boron (B) or the like may be used.

Figure 9A:
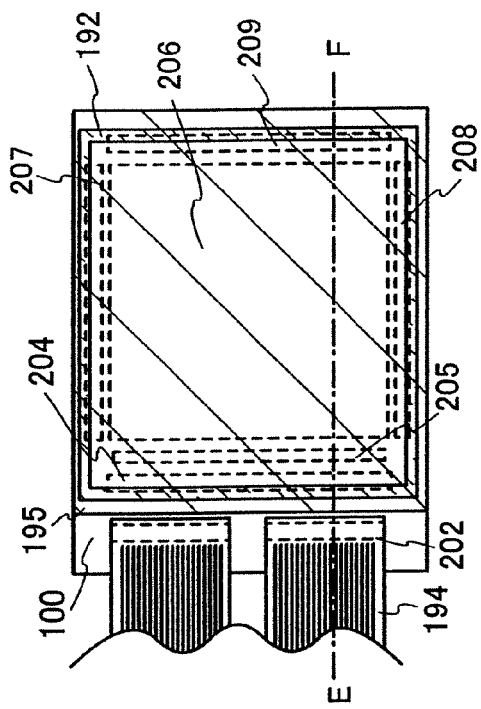
FIGS. 9A and 9B are a top view and a cross-sectional view, respectively, of a display device of the present invention.
Figure 9B:
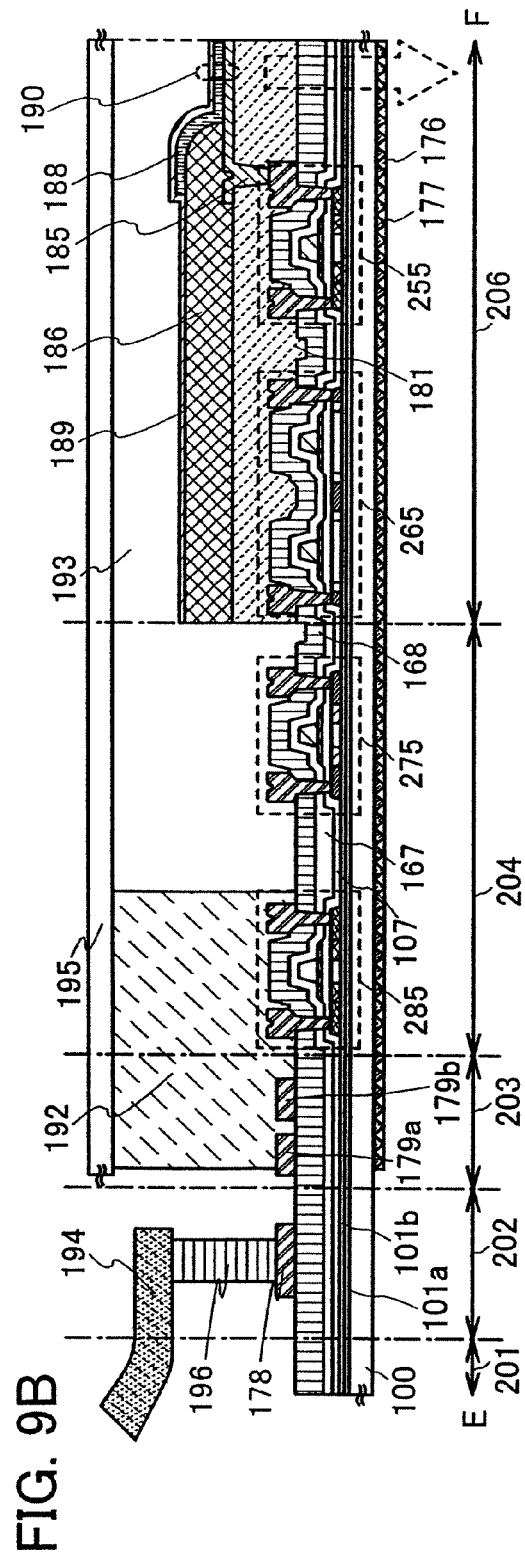

In this embodiment mode, a region where the impurity region overlaps with the gate electrode layer with the gate insulating layer interposed therebetween is referred to as a "Lov region", and a region where the impurity region does not overlap with the gate electrode layer with the gate insulating layer interposed therebetween is referred to as a "Loff region". In FIG. 9B, although the impurity regions are illustrated by hatching on a white background, this does not mean that the white background portion is not doped with an impurity element, but is shown so that it will be intuitively understood that the concentration distribution of the impurity element in the region reflects mask or doping conditions. Note that the same can be said for the other drawings in this specification.

Thermal treatment, intense light irradiation, or laser irradiation may be performed to activate the impurity element. Accordingly, at the same time as the activation, plasma damage to the gate insulating layer or the interface between the gate insulating layer and the semiconductor layer can be recovered.

Then, a first interlayer insulating layer is formed to cover the gate electrode layer and the gate insulating layer. In this embodiment mode, the first interlayer insulating layer has a stacked structure of an insulating film 167 and an insulating film 168. The insulating film 167 and the insulting film 168 can be each formed by depositing a silicon nitride film, a silicon nitride oxide film, a silicon oxynitride film, a silicon oxide film, or the like by a sputtering method or a plasma CVD method. Alternatively, a single layer or a stacked structure of more than two layers, which include other insulating films containing silicon, may also be used.

Further, thermal treatment is performed in a nitrogen atmosphere at 300 to 550° C. for 1 to 12 hours to hydrogenate the semiconductor layer. Preferably, it is performed at 400 to 500° C. This step is a step of terminating dangling bonds of the semiconductor layer with hydrogen contained in the insulating film 167 that is the interlayer insulating layer. In this embodiment mode, thermal treatment is performed at 410° C.

The insulating film 167 and the insulating film 168 can be formed using a material selected from inorganic insulating substances, such as aluminum nitride (AlN), aluminum oxynitride (AlON) containing more oxygen than nitrogen, aluminum nitride oxide (AlNO) containing more nitrogen than oxygen, aluminum oxide, diamond-like carbon (DLC), nitrogen-containing carbon (CN), and polysilazane. Alternatively, a material containing siloxane may be used. An organic insulating material may also be used. Examples of the organic material include polyimide, acrylic, polyamide, polyimide amide, resist, and benzocyclobutene. Moreover, an oxazole resin can be used, and for example, a photo-curing polybenzoxazole or the like can be used.

Next, contact holes (openings) that partly expose the semiconductor layer are formed in the insulating film 167, the insulating film 168, and the gate insulating layer 107, using a resist mask. Then, a conductive film is formed to cover the openings, and the conductive film is etched to form a source electrode layer and a drain electrode layer that are electrically connected to part of a source region and a drain region, respectively. The source electrode layer and drain electrode layer can be formed by depositing a conductive film by a PVD method, a CVD method, an evaporation method, or the like and then etching the conductive film into a desired shape. A conductive layer can be selectively formed at a predetermined position by a droplet discharge method, a printing method, a dispenser method, an electroplating method, or the like. Furthermore, a reflow method or a damascene method may be used. The source electrode layer and the drain electrode layer are formed using metals such as Ag, Au, Cu, Ni, Pt, Pd, Ir, Rh, W, Al, Ta, Mo, Cd, Zn, Fe, Ti, Zr, or Ba; Si or Ge; or an alloy or metal nitride of such metals. In addition, a stacked structure of such materials may also be used.

Through the above steps, an active matrix substrate can be fabricated, which includes a peripheral driver circuit region 204 having a thin film transistor 285 that is a p-channel thin film transistor having a p-type impurity region in a Lov region and a thin film transistor 275 that is an n-channel thin film transistor having an n-type impurity region in a Lov region, and also includes a pixel region 206 having a thin film transistor 265 that is a multi-channel n-channel thin film transistor having an n-type impurity region in a Loff region and a thin film transistor 255 that is a p-channel thin film transistor having a p-type impurity region in a Lov region.

The structure of the thin film transistor is not limited to that shown in this embodiment mode, and the thin film transistor may have a single-gate structure in which a single channel formation region is formed, a double-gate structure in which two channel formation regions are formed, or a triple-gate structure in which three channel formation regions are formed. In addition, a thin film transistor in a peripheral driver circuit region may also have a single-gate structure, a double-gate structure, or a triple-gate structure.

Next, an insulating film 181 is formed as a second interlayer insulating layer. In FIGS. 9A and 9B, reference numeral 201 denotes a cut-off region to be cut off by scribing; 202, an external terminal connection region that is an attachment portion of an FPC; 203, a wiring region that is a lead wiring region of a peripheral portion; 204, a peripheral driver circuit region; and 206, a pixel region. A wiring 179*a* and a wiring 179*b* are provided in the wiring region 203, and a terminal electrode layer 178 for connection to an external terminal is provided in the external terminal connection region 202.

The insulating film 181 can be formed with a material selected from inorganic insulating substances, such as silicon oxide, silicon nitride, silicon oxynitride, silicon nitride oxide, aluminum nitride (AlN), aluminum oxide containing nitrogen (also referred to as aluminum oxynitride) (AlON), aluminum nitride containing oxygen (also referred to as aluminum nitride oxide) (AlNO), aluminum oxide, diamond-like carbon (DLC), nitrogen-containing carbon (CN), PSG (phosphosilicate glass), BPSG (borophosphosilicate glass), and alumina. Alternatively, a siloxane resin may be used. Furthermore, an organic insulating material may be used. An organic insulating material may be either photosensitive or non-photosensitive, and polyimide, acrylic, polyamide, polyimide amide, resist, benzocyclobutene, polysilazane, or a low-dielectric constant material can be used. Moreover, an oxazole resin can be used, and for example, a photo-curing polybenzoxazole or the like can be used. Since the interlayer insulating layer provided for planarization needs to have high heat resistance, high insulating property, and high planarizing property, the insulating film 181 is preferably formed by a coating method typified by a spin coating method.

Alternatively, the insulating film 181 can be formed by dipping, spray coating, a doctor knife, a roll coater, a curtain coater, a knife coater, CVD, evaporation, or the like. The insulating film 181 may also be formed by a droplet discharge method. In the case of using a droplet discharge method, a liquid material can be saved. As a further alternative, a method by which a pattern can be transferred or drawn like a droplet discharge method, such as a printing method (a method for forming a pattern such as screen printing or offset printing), a dispenser method, a brush painting method, a spray method, a flow coating method, or the like may also be used.

A minute opening, that is, a contact hole is formed in the insulating film 181 in the pixel region 206.

Next, a first electrode layer 185 (also referred to as a pixel electrode layer) is formed to be in contact with the source electrode layer or the drain electrode layer. The first electrode layer 185 functions as an anode or a cathode, and may be formed to a total thickness of 100 to 800 nm, using an element selected from Ti, Ni, W, Cr, Pt, Zn, Sn, In, or Mo; an alloy or compound material containing the above element as its main component, for example, titanium nitride, TiSi$_x$N$_y$, WSi$_x$, tungsten nitride, WSi$_x$N$_y$, or NbN; or a stacked film thereof.

In this embodiment mode, a light-emitting element is used as a display element and light emitted from the light-emitting element is extracted through the first electrode layer 185. Therefore, the first electrode layer 185 has a light-transmitting property. The first electrode layer 185 is formed by depositing a transparent conductive film and etching the transparent conductive film into a desired shape.

In the present invention, the first electrode layer 185 that is a light-transmissive electrode layer may be formed using a transparent conductive film made of a light-transmissive conductive material, such as indium oxide containing tungsten oxide, indium zinc oxide containing tungsten oxide, indium oxide containing titanium oxide, or indium tin oxide containing titanium oxide. Needless to say, indium tin oxide (ITO), indium zinc oxide (IZO), indium tin oxide to which silicon oxide is added (ITSO), or the like may also be used.

Further, even when a material having no light-transmitting property such as a metal film is used, light can be transmitted through the first electrode layer 185 if the first electrode layer 185 is formed to be thin (preferably, a thickness of approximately 5 to 30 nm) so as to be able to transmit light. A metal thin film that can be used for the first electrode layer 185 is a conductive film made of titanium, tungsten, nickel, gold, platinum, silver, aluminum, magnesium, calcium, lithium, or an alloy thereof.

The first electrode layer 185 can be formed by an evaporation method, a sputtering method, a CVD method, a printing method, a dispenser method, a droplet discharge method, or the like. In this embodiment mode, the first electrode layer 185 is formed by depositing indium zinc oxide containing tungsten oxide by a sputtering method. The first electrode layer 185 preferably has a total thickness of 100 to 800 nm.

The first electrode layer 185 may be polished by a CMP method or by cleaning with a polyvinyl alcohol-based porous body so that the surface of the first electrode layer 185 is planarized. Further, after the CMP method is applied, the surface of the first electrode layer 185 may be subjected to ultraviolet irradiation, oxygen plasma treatment, or the like.

After the first electrode layer 185 is formed, thermal treatment may be applied. By this thermal treatment, moisture included in the first electrode layer 185 is released. Therefore, degasification or the like is not caused in the first electrode layer 185. Thus, even when a light-emitting material that is easily deteriorated by moisture is formed over the first electrode layer, the light-emitting material does not deteriorate. Accordingly, a highly reliable display device can be fabricated.

Next, an insulating layer 186 (also called a partition or the like) is formed to cover an end portion of the first electrode layer 185, and the source electrode layer or the drain electrode layer.

The insulating layer 186 can be formed using silicon oxide, silicon nitride, silicon oxynitride, silicon nitride oxide, or the like and may have either a single-layer structure or a stacked structure of two or more layers. Alternatively, the insulating layer 186 may also be formed using a material selected from inorganic insulating substances, such as aluminum nitride, aluminum oxynitride containing more oxygen than nitrogen, aluminum nitride oxide containing more nitrogen than oxygen, aluminum oxide, diamond-like carbon (DLC), nitrogen-containing carbon, or polysilazane. Alternatively, a material containing siloxane may be used. Furthermore, an organic insulating material may be used. An organic insulating material may be either photosensitive or non-photosensitive, and polyimide, acrylic, polyamide, polyimide amide, resist, or benzocyclobutene can be used. Moreover, an oxazole resin can be used, and for example, a photo-curing polybenzoxazole or the like can be used.

The insulating layer 186 can be formed by a sputtering method, a PVD (physical vapor deposition) method, a CVD (chemical vapor deposition) method such as a low-pressure CVD (LPCVD) method or a plasma CVD method, a droplet discharge method by which a pattern can be formed selectively, a printing method by which a pattern can be transferred or drawn (a method for forming a pattern such as screen printing or offset printing), a dispenser method, a coating method such as a spin coating method, a dipping method, or the like.

The etching for forming a desired pattern may be performed by either plasma etching (dry etching) or wet etching; however, plasma etching is suitable for treating a large-sized substrate. For an etching gas, a fluorine-source gas such as $CF_4$ or $NF_3$ or a chlorine-source gas such as $Cl_2$ or $BCl_3$ is used. Further, an inert gas such as He or Ar may be added thereto as appropriate. Alternatively, when the etching is performed using atmospheric pressure discharge, local electric discharge machining is possible. In that case, a mask layer does not need to be formed over the entire surface of the substrate.

In FIG. 9A, a wiring layer formed with the same material and in the same step as the second electrode layer is electrically connected to a wiring layer that is formed with the same material and in the same step as the gate electrode layer.

An electroluminescent layer 188 is formed over the first electrode layer 185. Note that, although FIG. 9B illustrates only one pixel, electroluminescent layers that exhibit R (red), G (green), and B (blue), respectively are selectively formed in this embodiment mode.

Next, a second electrode layer 189 made of a conductive film is provided over the electroluminescent layer 188. For the second electrode layer 189, Al, Ag, Li, Ca, an alloy or compound thereof such as MgAg, MgIn, AlLi, or $CaF_2$, or calcium nitride may be used. Thus, a light-emitting element 190 including the first electrode layer 185, the electroluminescent layer 188, and the second electrode layer 189 is formed (see FIG. 9B).

In the display device of this embodiment mode illustrated in FIGS. 9A and 9B, light emitted from the light-emitting element 190 is transmitted through the first electrode layer 185 and extracted in a direction indicated by the arrow in FIG. 9B.

In this embodiment mode, an insulating layer may be provided as a passivation film (protective film) over the second electrode layer 189. Providing a passivation film to cover the second electrode layer 189 in this manner is effective. The passivation film can be formed in either a single layer or stacked layers, using an insulating film such as silicon nitride, silicon oxide, silicon oxynitride, silicon nitride oxide, aluminum nitride, aluminum oxynitride containing more oxygen than nitrogen, aluminum nitride oxide containing more nitrogen than oxygen, aluminum oxide, diamond-like carbon (DLC), or nitrogen-containing carbon. Alternatively, the passivation film may be formed using a siloxane resin.

In this case, a film that can fully cover the underlying layer is preferably used for the passivation film. For example, a carbon film, in particular, a DLC film is effective. The DLC film can be formed at temperatures ranging from a room temperature to 100° C.; therefore, the DLC film can be easily deposited over the electroluminescent layer 188 having low heat resistance. The DLC film can be formed by a plasma CVD method (typically, an RF plasma CVD method, a microwave CVD method, an electron cyclotron resonance (ECR) CVD method, a hot-filament CVD method, or the like), a combustion flame method, a sputtering method, an ion beam evaporation method, a laser evaporation method, or the like. A hydrogen gas and a hydrocarbon-source gas (for example, $CH_4$, $C_2H_2$, $C_6H_6$, or the like) are used as a reaction gas for forming the DLC film. The reaction gas is ionized by glow discharge, and the ions are accelerated to collide with a negatively self-biased cathode; accordingly, a DLC film is formed. A CN film may be formed using a $C_2H_4$ gas and an $N_2$ gas as a reaction gas. The DLC film has a high blocking effect on oxygen and can suppress oxidation of the electroluminescent layer 188. Accordingly, the electroluminescent layer 188 can be prevented from oxidizing during a subsequent sealing step.

A sealing substrate 195 is attached to the substrate 100 over which the light-emitting element 190 is formed, using a sealant 192 to seal the light-emitting element (see FIGS. 9A and 9B). For the sealant 192, it is typically preferable to use a visible light curing resin, an ultraviolet curing resin, or a heat-curing resin. For example, a bisphenol-A liquid resin, a bisphenol-A solid resin, a bromine-containing epoxy resin, a bisphenol-F resin, a bisphenol-AD resin, a phenol resin, a cresol resin, a novolac resin, a cycloaliphatic epoxy resin, an Epi-Bis type (epichlorohydrin-bisphenol) epoxy resin, a glycidyl ester resin, a glycidyl amine resin, a heterocyclic epoxy resin, or a modified epoxy resin can be used. Note that a region surrounded by the sealant may be filled with a filler

193, or nitrogen may be enclosed by sealing the region in a nitrogen atmosphere. Since the display device of this embodiment mode is of a bottom-emission type, the filler 193 does not need to have a light-transmitting property. However, in the case of forming a structure in which light is extracted through the filler 193, the filler 193 should have a light-transmitting property. Typically, a visible light curing, ultraviolet curing, or heat-curing epoxy resin may be used. Through the above steps, a display device having a light-emitting element of this embodiment mode and having a display function is completed. Alternatively, the filler in a liquid state may be dropped to fill the display device. When a substance having a hygroscopic property such as a drying agent is used for the filler, a higher water-absorbing effect can be obtained, whereby element deterioration can be prevented.

In order to prevent deterioration of elements due to moisture, a drying agent is provided in the EL display panel. In this embodiment mode, the drying agent is provided in a recess portion that is formed in the sealing substrate so as to surround the pixel region, so that reduction in thickness of the panel is not hindered. Further, since the drying agent is also provided in a region corresponding to the gate wiring layer so that a large area can absorb water, a high water-absorbing effect can be achieved. In addition, since the drying agent is formed over the gate wiring layer which does not contribute to light emission, a reduction in light extraction efficiency can be prevented.

This embodiment mode describes the case where the light-emitting element is sealed with a glass substrate. Sealing treatment is the treatment for protecting the light-emitting element from moisture, and any of the following methods can be used: a method in which a light-emitting element is mechanically sealed with a cover material; a method in which a light-emitting element is sealed with a heat-curing resin or an ultraviolet curing resin; and a method in which a light-emitting element is sealed with a thin film of metal oxide, metal nitride, or the like that has high barrier property. For the cover material, glass, ceramics, plastic, or metal can be used. However, when light is to be emitted to the cover material side, the cover material should have a light-transmitting property. The cover material is attached to the substrate over which the above-mentioned light-emitting element is formed, using a sealant such as a heat-curing resin or an ultraviolet curing resin, and a hermetically sealed space is formed by curing the resin through thermal treatment or ultraviolet irradiation treatment. It is also effective to provide a moisture-absorbing material typified by barium oxide in the hermetically sealed space. The moisture-absorbing material may be provided on the sealant or over a partition or a peripheral portion so as not to block light emitted from the light-emitting element. Further, a space between the cover material and the substrate having the light-emitting element may also be filled with a heat-curing resin or an ultraviolet curing resin. In that case, it is effective to add a moisture-absorbing material typified by barium oxide to the heat-curing resin or the ultraviolet curing resin.

Figure 12:
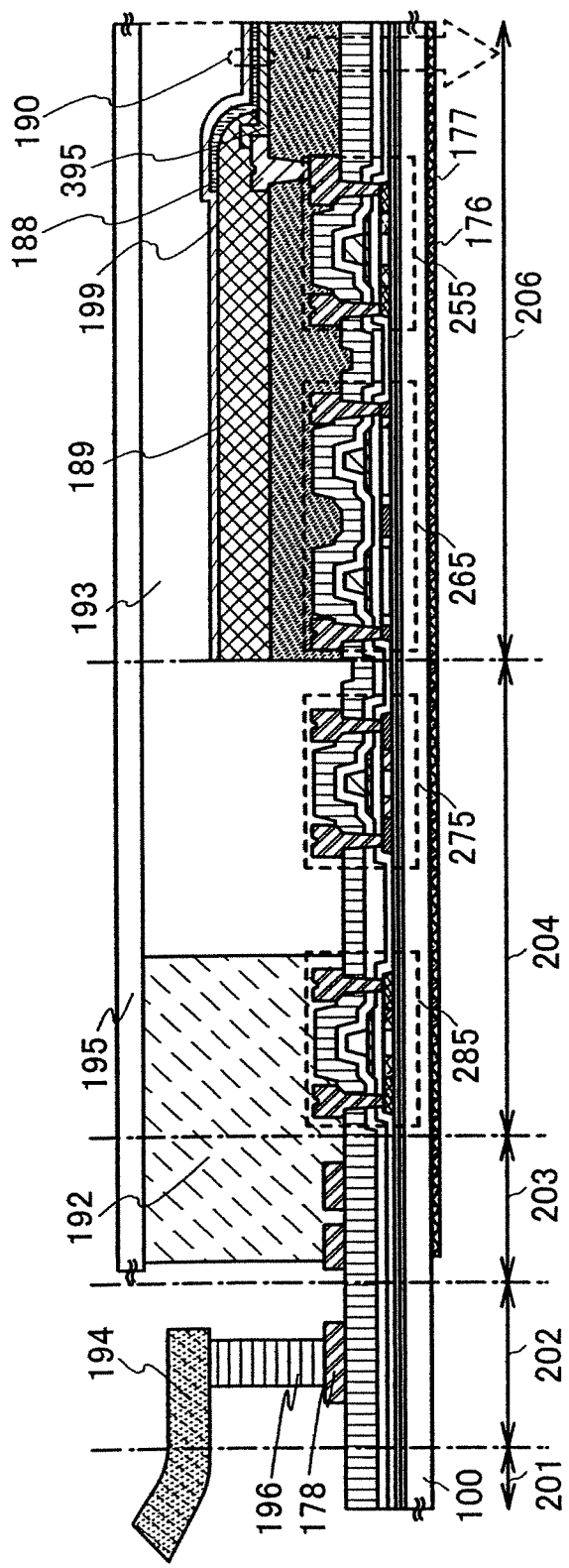
FIG. 12 is a cross-sectional view of a display device of the present invention.

FIG. 12 illustrates an example of the display device in FIGS. 9A and 9B fabricated in this embodiment mode, in which the source electrode or the drain electrode layer is connected to the first electrode layer not directly but electrically through a wiring layer. In the display device illustrated in FIG. 12, the source electrode layer or the drain electrode layer of the thin film transistor for driving the light-emitting element is electrically connected to a first electrode layer 395 through a wiring layer 199. Moreover, although the first electrode layer 395 is partly stacked over the wiring layer 199 in FIG. 12, it is also possible to form the first electrode layer 395 first and then form the wiring layer 199 on the first electrode layer 395.

In this embodiment mode, an FPC 194 is connected to the terminal electrode layer 178 with an anisotropic conductive layer 196 in the external terminal connection region 202, whereby an electrical connection with an external circuit is accomplished. Moreover, as illustrated in FIG. 9A that is a top view of the display device, the display device fabricated in this embodiment mode includes a peripheral driver circuit region 207 and a peripheral driver circuit region 208 having scan line driver circuits, in addition to the peripheral driver circuit region 204 and a peripheral driver circuit region 209 having signal line driver circuits.

Although the circuits described above are used in this embodiment mode, the present invention is not limited thereto and IC chips may be mounted as peripheral driver circuits by a COG method or a TAB method. Moreover, the numbers of the scan line driver circuits and the signal line driver circuits may be either singular or plural.

Furthermore, a driving method for image display of the display device in this embodiment mode is not specifically limited. For example, a dot sequential driving method, a line sequential driving method, a frame sequential driving method, or the like can be used. Typically, a line sequential driving method is used, and a time ratio gray scale driving method or an area ratio gray scale driving method may combined as appropriate. In addition, video signals input to the source lines of the display device may be either analog signals or digital signals, and driver circuits and the like may be appropriately designed in conformity with the video signals.

Since each of the display devices illustrated in FIGS. 9A and 9B and FIG. 12 has a bottom-emission structure, light is emitted through the substrate 100. That is, a viewer side is the substrate 100 side. Thus, a light-transmissive substrate is used for the substrate 100, and pyramidal projections 177 are provided on the outer side of the substrate 100 that is the viewer side. Further, a protective layer 176 is formed to fill a space between the pyramidal projections 177.

The display device of this embodiment mode may have any structure as long as it has pyramidal projections that are densely arranged in a contiguous manner. For example, any of the following structures may be used: pyramidal projections, as one continuous structure, are directly formed in the surface of a substrate (film); the surface of a substrate (film) is patterned to form pyramidal projections; and pyramidal shapes are selectively formed by a printing method such as nanoimprinting. Alternatively, pyramidal projections may be formed on a substrate (film) through a different step.

The plurality of pyramidal projections may be either one continuous film or a structure obtained by densely arranging a plurality of pyramidal projections on the substrate.

The display device in this embodiment mode has a feature that it has a plurality of hexagonal pyramidal projections formed on the surface of a display screen, in order to attain an anti-reflection function to prevent reflection of incident light from external. When a display screen has a plane surface (a plane that is parallel with the display screen) with respect to incident light from external, the incident light is reflected to a viewer side. Therefore, a display device with a smaller plane region can have a higher anti-reflection function. Further, the surface of the display screen preferably has a plurality of angles in order to scatter incident light from external more effectively.

The hexagonal pyramidal projections in this embodiment mode can be most densely arranged with no space therebetween. Further, such a pyramidal projection can have the largest possible number of side surfaces of all similar pyramidal shapes. Therefore, it has an optimal shape to attain a high anti-reflection function that can effectively scatter incident light in many directions.

The plurality of pyramidal projections is arranged in a contiguous pattern. A side of the base of each pyramidal projection is provided to be in contact with a side of the base of an adjacent pyramidal projection. The plurality of pyramidal projections has no space therebetween and covers the surface of the display screen. Accordingly, a plane portion of the surface of the display screen is not exposed by the plurality of pyramidal projections as illustrated in FIGS. 9A, 9B, and 12, and light from external is incident on the sloping side surfaces of the plurality of pyramidal projections, whereby reflection of incident light from external at the plane portion can be reduced. Such a structure is preferable because each pyramidal projection has many side surfaces that differ in angle from the base and, therefore, incident light can be scattered in many directions.

Further, since each hexagonal pyramidal projection is in contact with a plurality of other hexagonal pyramidal projections at vertices of the base, and since the base of such a pyramidal projection is surrounded by a plurality of side surfaces forming an angle with the base, the pyramidal projection can easily reflect incident light in many directions. Therefore, such a hexagonal pyramidal projection having many vertices at its base has a higher anti-reflection function.

In this embodiment mode, an interval between the apexes of the plurality of pyramidal projections is preferably less than or equal to 350 nm and the height of each pyramidal projection is preferably greater than or equal to 800 nm. In addition, the fill rate per unit area of the display screen with the bases of the plurality of pyramidal projections is preferably greater than or equal to 80%, or more preferably greater than or equal to 90%. Accordingly, the percentage of light from external that is incident on the plane portion can be reduced, and reflection of incident light to a viewer side can be prevented, which is advantageous.

Since the plurality of pyramidal projections 177 in this embodiment mode is equally spaced from the apexes of a plurality of adjacent pyramidal projections, a cross section of each pyramidal projection is an isosceles triangle in the drawing.

The display device in this embodiment mode has a plurality of pyramidal projections formed on its surface. Since the side surfaces of each pyramidal projection do not form a plane that is parallel with a surface of a display screen, they reflect incident light from external, not to a viewer side but to an adjacent pyramidal projection. Otherwise, the reflected light propagates through a space between the adjacent pyramidal projections. A part of incident light from external propagates through a pyramidal projection whereas light reflected at a side surface of the pyramidal projection is incident on an adjacent pyramidal projection. In this manner, incident light from external that is reflected at a side surface of a pyramidal projection repeats incidence on adjacent pyramidal projections.

In other words, the number of times light from external is incident on the pyramidal projections of the display device can be increased, whereby the amount of incident light from external that is transmitted through the pyramidal projections is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in anti-reflection function due to entry of dust or the like can be prevented, and filling a space between the pyramidal projections can increase the physical strength of the display device. Accordingly, reliability can be improved.

This embodiment mode provides a display device having a plurality of hexagonal pyramidal projections formed contiguously on its surface and a protective layer provided between the pyramidal projections. Such a display device has highly visibility and has an anti-reflection function that can further reduce reflection of incident light from external. Therefore, a display device with higher image quality and higher performance can be fabricated.

This embodiment mode can be freely combined with Embodiment Mode 1.

Embodiment Mode 6

A display device having light-emitting elements can be formed by applying the present invention, and the light-emitting elements emit light to any one of a bottom side, a top side, and both the top and bottom sides. This embodiment mode will describe examples of dual-emission structure and a top-emission structure with reference to FIGS. 10 and 11.

Figure 11:
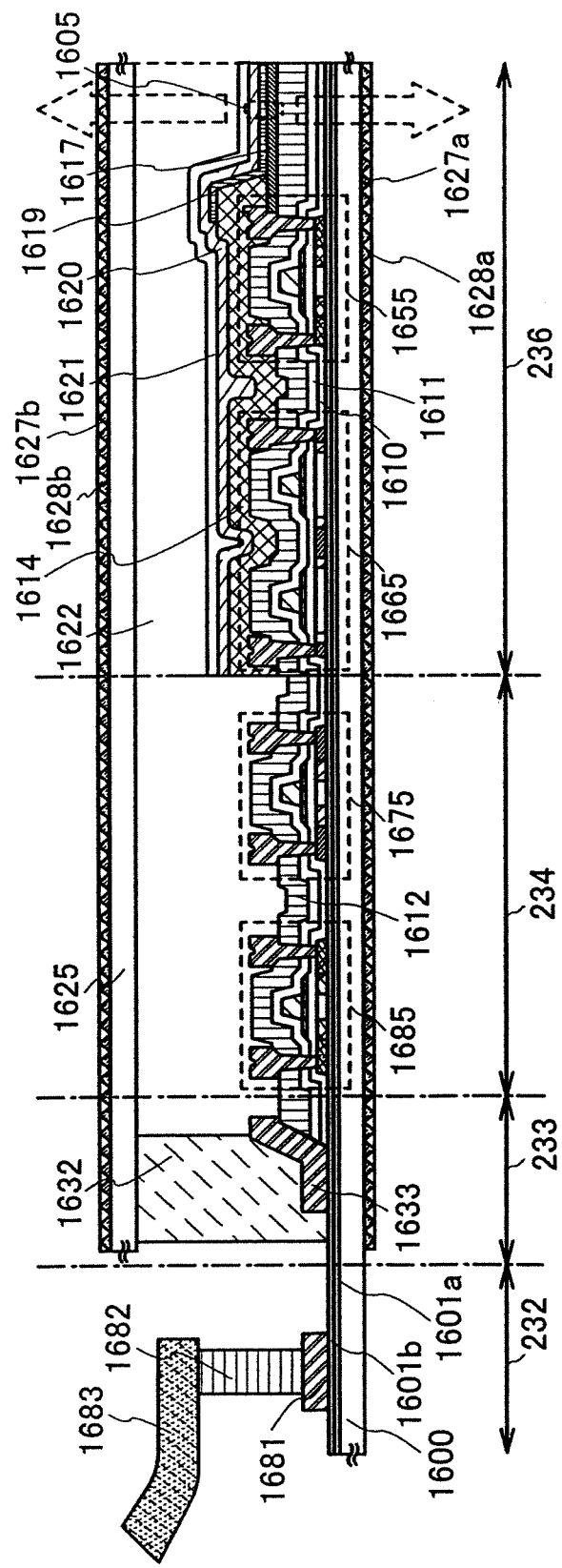
FIG. 11 is a cross-sectional view of a display device of the present invention.

A display device illustrated in FIG. 11 includes an element substrate 1600, a thin film transistor 1655, a thin film transistor 1665, a thin film transistor 1675, a thin film transistor 1685, a first electrode layer 1617, a light-emitting layer 1619, a second electrode layer 1620, a protective layer 1621, a filler 1622, a sealant 1632, an insulating film 1601a, an insulating film 1601b, a gate insulating layer 1610, an insulating film 1611, an insulating film 1612, an insulating layer 1614, a sealing substrate 1625, a wiring layer 1633, a terminal electrode layer 1681, an anisotropic conductive layer 1682, an FPC 1683, and hexagonal pyramidal projections 1627a and 1627b. The display device also includes an external terminal connection region 232, a sealing region 233, a peripheral driver circuit region 234, and a pixel region 236. The filler 1622 can be formed by dropping a liquid composition. A light-emitting display device is sealed by attaching the sealing substrate 1625 to the element substrate 1600 provided with the filler by a dropping method.

The display device illustrated in FIG. 11 has a dual-emission structure in which light is emitted through both the element substrate 1600 and the sealing substrate 1625 as shown by the arrows. Therefore, a light-transmissive electrode layer is used for each of the first electrode layer 1617 and the second electrode layer 1620.

In this embodiment mode, the first electrode layer 1617 and the second electrode layer 1620 each of which is a light-transmissive electrode layer may be formed using a transparent conductive film made of a light-transmissive conductive material, specifically, indium oxide containing tungsten oxide, indium zinc oxide containing tungsten oxide, indium oxide containing titanium oxide, indium tin oxide containing titanium oxide, or the like. Needless to say, indium tin oxide (ITO), indium zinc oxide (IZO), indium tin oxide to which silicon oxide is added (ITSO), or the like may also be used.

Further, even when a material having no light-transmitting property such as a metal film is used, light can be transmitted through the first electrode layer 1617 and the second electrode layer 1620 if the first electrode layer 1617 and the second electrode layer 1620 are formed to be thin (preferably, a thickness of approximately 5 to 30 nm) so as to be able to transmit light. A metal thin film that can be used for each of the first electrode layer 1617 and the second electrode layer

1620 is a conductive film made of titanium, tungsten, nickel, gold, platinum, silver, aluminum, magnesium, calcium, lithium, or an alloy thereof.

As described above, the display device in FIG. 11 has a dual-emission structure in which light emitted from a light-emitting element 1605 is extracted through both the first electrode layer 1617 and the second electrode layer 1620.

Figure 10:
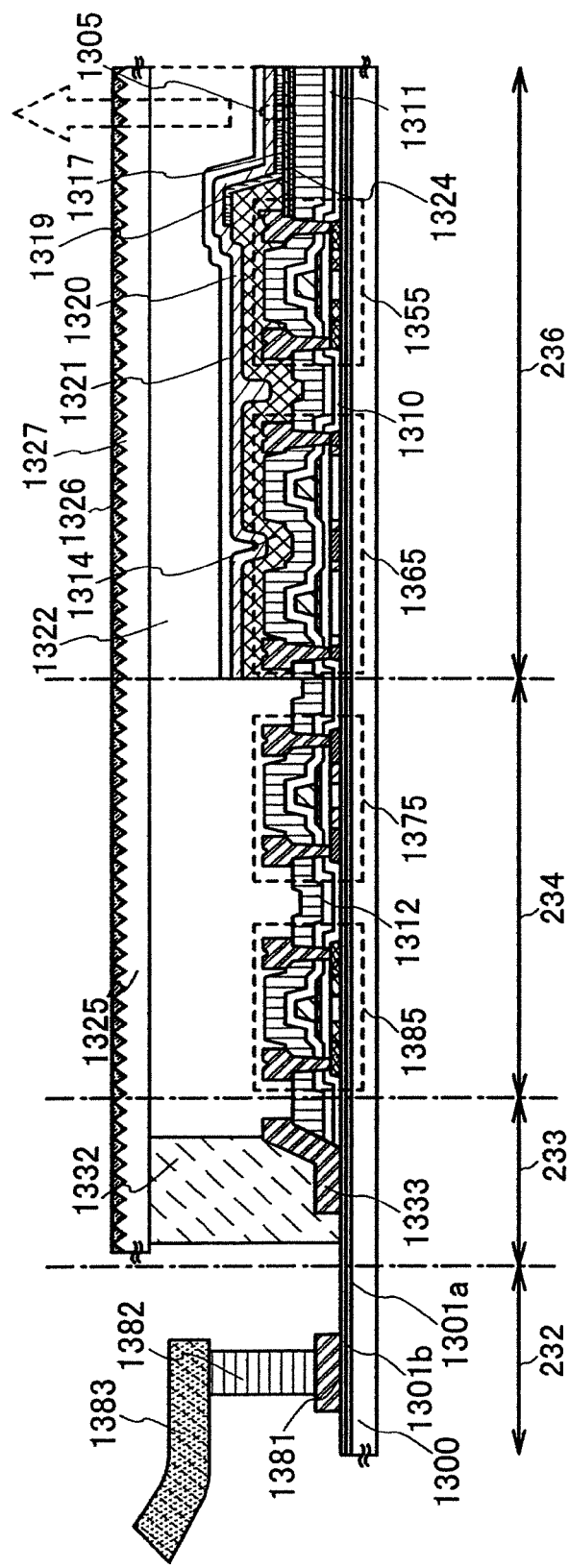
FIG. 10 is a cross-sectional view of a display device of the present invention.

A display device in FIG. 10 has a top-emission structure in which light is emitted to the top side as shown by the arrow. The display device illustrated in FIG. 10 includes an element substrate 1300, a display element 1305, a thin film transistor 1355, a thin film transistor 1365, a thin film transistor 1375, a thin film transistor 1385, a wiring layer 1324, a first electrode layer 1317, a light-emitting layer 1319, a second electrode layer 1320, a protective film 1321, a filler 1322, a sealant 1332, an insulating film 1301a, an insulating film 1301b, a gate insulating layer 1310, an insulating film 1311, an insulating film 1312, an insulating layer 1314, a sealing substrate 1325, a wiring layer 1333, a terminal electrode layer 1381, an anisotropic conductive layer 1382, and an FPC 1383.

In each of the display devices in FIGS. 10 and 11, an insulating layer stacked over the terminal electrode layer is removed by etching. When the display device does not have an insulating layer having moisture permeability around a terminal electrode layer, reliability of the device is improved. The display device in FIG. 10 includes an external terminal connection region 232, a sealing region 233, a peripheral driver circuit region 234, and a pixel region 236. In the display device in FIG. 10, the wiring layer 1324 that is a reflective metal layer is formed below the first electrode layer 1317 in the dual-emission display device illustrated in FIG. 11. The first electrode layer 1317 that is a transparent conductive film is formed over the wiring layer 1324. Since the wiring layer 1324 may be formed with any material as long as it has reflectivity, the wiring layer 1324 may be formed using a conductive film made of, for example, titanium, tungsten, nickel, gold, platinum, silver, copper, tantalum, molybdenum, aluminum, magnesium, calcium, lithium, or an alloy thereof. It is preferable to use a substance having high reflectivity in the visible light range, and a titanium nitride film is used in this embodiment mode. In addition, the first electrode layer 1317 may be formed using a conductive film, and in that case, the reflective wiring layer 1324 may be omitted.

Each of the first electrode layer 1317 and the second electrode layer 1320 may be formed using a transparent conductive film made of a light-transmissive conductive material, specifically, indium oxide containing tungsten oxide, indium zinc oxide containing tungsten oxide, indium oxide containing titanium oxide, indium tin oxide containing titanium oxide, or the like. Needless to say, indium tin oxide (ITO), indium zinc oxide (IZO), indium tin oxide to which silicon oxide is added (ITSO), or the like may also be used.

Further, even when a material having no light-transmitting property such as a metal film is used, light can be transmitted through the second electrode layer 1320 if the second electrode layer 1320 is formed to be thin (preferably, a thickness of approximately 5 to 30 nm) so as to be able to transmit light. A metal thin film that can be used for the second electrode layer 1320 is a conductive film made of titanium, tungsten, nickel, gold, platinum, silver, aluminum, magnesium, calcium, lithium, or an alloy thereof.

Pixels of the display device formed using the light-emitting elements can be driven by a passive matrix method or an active matrix method. Furthermore, either a digital drive or an analog drive may be employed.

The sealing substrate may be provided with a color filter (colored layer). The color filter (colored layer) can be formed by an evaporation method or a droplet discharge method. When the color filter (colored layer) is used, high-definition display can be performed. This is because broad peaks of emission spectra of R, and B can be corrected to sharp peaks by the color filter (colored layer).

When a material exhibiting monochromatic light emission is used in combination with a color filter or a color conversion layer, full color display can be achieved. For example, the color filter (colored layer) or the color conversion layer may be formed over the sealing substrate and then attached to the element substrate.

Needless to say, display with monochromatic light emission may be performed. For instance, an area-color display device using monochromatic light emission may be formed. A passive matrix display portion is suitable for the area-color display device, and such a display portion can mainly display characters and symbols.

Since the display device illustrated in FIG. 11 has a dual-emission structure in which light is emitted through both the element substrate 1600 and the sealing substrate 1625, both the element substrate 1600 side and the sealing substrate 1625 side can be viewer sides. Thus, a light-transmissive substrate is used for each of the element substrate 1600 and the sealing substrate 1625, and the hexagonal pyramidal projections 1627a and 1627b are provided on the outer sides, which are viewer sides, of the element substrate 1600 and the sealing substrate 1625, respectively. In addition, a protective layer 1628a is formed to fill a space between the pyramidal projections 1627a, and a protective layer 1628b is formed to fill a space between the pyramidal projections 1627b. Meanwhile, since the display device illustrated in FIG. 10 has a top-emission structure, the sealing substrate 1325 on a viewer side is a light-transmissive substrate. In addition, hexagonal pyramidal projections 1327 are provided on the outer side of the sealing substrate 1325, and a protective film 1326 is formed to fill a space between the pyramidal projections 1327.

The display device of this embodiment mode may have any structure as long as it has pyramidal projections that are densely arranged in a contiguous manner. For example, any of the following structures may be used: pyramidal projections, as one continuous structure, are directly formed in the surface of a substrate (film); the surface of a substrate (film) is patterned to form pyramidal projections; and pyramidal shapes are selectively formed by a printing method such as nanoimprinting. Alternatively, pyramidal projections may be formed on a substrate (film) through a different step.

The plurality of pyramidal projections may be either one continuous film or a structure obtained by densely arranging a plurality of pyramidal projections on the substrate. Alternatively, the pyramidal projections may be formed in advance in the substrate. FIG. 10A illustrates an example in which the plurality of pyramidal projections 1327 is provided as one continuous structure in the surface of the sealing substrate 1325.

The display device in this embodiment mode has a feature that it has a plurality of pyramidal projections formed on the surface of a display screen, in order to attain an anti-reflection function to prevent reflection of incident light from external. When a display screen has a plane surface (a plane that is parallel with the display screen) with respect to incident light from external, the incident light is reflected to a viewer side. Therefore, a display device with a smaller plane region can have a higher anti-reflection function. Further, the surface of the display screen preferably has a plurality of angles in order to scatter incident light from external more effectively.

The hexagonal pyramidal projections in this embodiment mode can be most densely arranged with no space therebetween. Further, such a pyramidal projection can have the largest possible number of side surfaces of all similar pyramidal shapes. Therefore, it has an optimal shape to attain a high anti-reflection function that can effectively scatter incident light in many directions.

The plurality of pyramidal projections is arranged in a contiguous pattern. A side of the base of each pyramidal projection is provided to be in contact with a side of the base of an adjacent pyramidal projection. The plurality of pyramidal projections has no space therebetween and covers the surface of the display screen. Accordingly, a plane portion of the surface of the display screen is not exposed by the plurality of pyramidal projections as illustrated in FIGS. 10 and 11, and light from external is incident on the sloping side surfaces of the plurality of pyramidal projections, whereby reflection of incident light from external at the plane portion can be reduced. Such a structure is preferable because each pyramidal projection has many side surfaces that differ in angle from the base and, therefore, incident light can be scattered in many directions.

Further, since each hexagonal pyramidal projection is in contact with a plurality of other hexagonal pyramidal projections at vertices of the base, and since the base of such a pyramidal projection is surrounded by a plurality of side surfaces forming an angle with the base, the pyramidal projection can easily reflect incident light in many directions. Therefore, such a hexagonal pyramidal projection having many vertices at its base has a higher anti-reflection function.

In this embodiment mode, an interval between the apexes of the plurality of pyramidal projections is preferably less than or equal to 350 nm and the height of each pyramidal projection is preferably greater than or equal to 800 nm. In addition, the fill rate per unit area of the display screen with the bases of the plurality of pyramidal projections is preferably greater than or equal to 80%, or more preferably greater than or equal to 90%. Accordingly, the percentage of light from external that is incident on the plane portion can be reduced, and reflection of incident light to a viewer side can be prevented, which is advantageous.

Since the plurality of pyramidal projections 1327, 1627a, and 1627b in this embodiment mode is equally spaced from the apexes of a plurality of adjacent pyramidal projections, a cross section of each pyramidal projection is an isosceles triangle in the drawing.

The display device in this embodiment mode has a plurality of pyramidal projections formed on its surface. Since the side surfaces of each pyramidal projection do not form a plane that is parallel with a surface of a display screen, they reflect incident light from external, not to a viewer side but to an adjacent pyramidal projection. Otherwise, the reflected light propagates through a space between the adjacent pyramidal projections. A part of incident light from external propagates through a pyramidal projection whereas light reflected at a side surface of the pyramidal projection is incident on an adjacent pyramidal projection. In this manner, incident light from external that is reflected at a side surface of a pyramidal projection repeats incidence on adjacent pyramidal projections.

In other words, the number of times light from external is incident on the pyramidal projections of the display device can be increased, whereby the amount of incident light from external that is transmitted through the pyramidal projections is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in anti-reflection function due to entry of dust or the like can be prevented, and filling a space between the pyramidal projections can increase the physical strength of the display device. Accordingly, reliability can be improved.

This embodiment mode provides a display device having a plurality of hexagonal pyramidal projections formed contiguously on its surface and a protective layer provided between the pyramidal projections. Such a display device has highly visibility and has an anti-reflection function that can further reduce reflection of incident light from external. Therefore, a display device with higher image quality and higher performance can be fabricated.

This embodiment mode can be freely combined with Embodiment Mode 1.

Embodiment Mode 7

This embodiment mode will describe an exemplary display device that has high visibility and has an anti-reflection function by which reflection of incident light from external can be further reduced. Specifically, this embodiment mode illustrates a light-emitting display device that uses light-emitting elements as display elements.

This embodiment mode will describe structures of a light-emitting element that can be used as a display element of the display device of the present invention, with reference to FIGS. 22A to 22D.

FIGS. 22A to 22D each illustrate an element structure of a light-emitting element. In the light-emitting element, an electroluminescent layer 860 containing a mixture of an organic compound and an inorganic compound is interposed between a first electrode layer 870 and a second electrode layer 850. The electroluminescent layer 860 includes a first layer 804, a second layer 803, and a third layer 802 as illustrated in the drawing. In particular, the first layer 804 and the third layer 802 are the main features of this embodiment mode.

The first layer 804 is a layer having a function of transporting holes to the second layer 803, and includes at least a first organic compound and a first inorganic compound showing an electron-accepting property to the first organic compound. What is important is that the first organic compound and the first inorganic compound are not just simply mixed, but the first inorganic compound shows an electron-accepting property to the first organic compound. Such a structure allows many holes (carriers) to be generated in the first organic compound, which inherently has almost no carriers, and thus, a highly excellent hole-injecting property and hole-transporting property can be obtained.

Therefore, the first layer 804 can provide not only an advantageous effect that is considered to be obtained by mixing an organic compound and an inorganic compound (such as improvement in heat resistance) but also excellent conductivity (particularly a hole-injecting property and a hole-transporting property with regard to the first layer 804). This excellent conductivity is an advantageous effect that cannot be obtained with a conventional hole-transporting layer in which an organic compound and an inorganic compound, which do not electronically interact with each other, are simply mixed. Such an advantageous effect allows a reduction in drive voltage than that of a conventional structure. In addition, since the first layer 804 can be made thicker without causing an increase in drive voltage, short circuit of the element due to dust and the like can be suppressed.

It is preferable to use an organic compound having a hole-transporting property for the first organic compound because holes (carriers) are generated in the first organic compound as described above. Examples of an organic compound having a hole-transporting property include, but are not limited to, phthalocyanine (abbr.: $H_2Pc$), copper phthalocyanine (abbr.: CuPc), vanadyl phthalocyanine (abbr.: VOPc), 4,4',4''-tris(N,N-diphenylamino)triphenylamine (abbr.: TDATA), 4,4',4''-tris[N-(3-methylphenyl)-N-phenylamino]triphenylamine (abbr.: MTDATA), 1,3,5-tris[N,N-di(m-tolyl)amino]benzene (abbr.: m-MTDAB), N,N'-diphenyl-N,N'-bis(3-methylphenyl)-1,1'-biphenyl-4,4'-diamine (abbr.: TPD), 4,4'-bis[N-(1-naphthyl)-N-phenylamino]biphenyl (abbr.: NPB), 4,4'-bis{N-[4-di(m-tolyl)amino]phenyl-N-phenylamino}biphenyl (abbr.: DNTPD), 4,4',4''-tris(N-carbazolyl)triphenylamine (abbr.: TCTA), and the like. In addition, among the compounds mentioned above, aromatic amine compounds as typified by TDATA, MTDATA, m-MTDAB, TPD, NPB, DNTPD, and TCTA can easily generate holes (carriers), and are suitable compounds for the first organic compound.

Meanwhile, the first inorganic compound may be any material as long as the material can easily accept electrons from the first organic compound, and various kinds of metal oxide and metal nitride can be used. Oxide of a transition metal that belongs to any of Groups 4 to 12 of the periodic table is preferable because such oxide of a transition metal easily shows an electron-accepting property. Specifically, titanium oxide, zirconium oxide, vanadium oxide, molybdenum oxide, tungsten oxide, rhenium oxide, ruthenium oxide, zinc oxide, or the like can be used. In addition, among the metal oxides mentioned above, oxide of a transition metal that belongs to any of Groups 4 to 8 is preferable because such oxide has a higher electron-accepting property. In particular, vanadium oxide, molybdenum oxide, tungsten oxide, and rhenium oxide are preferable since they can be formed by vacuum evaporation and can be easily handled.

Note that the first layer 804 may also be formed by stacking a plurality of layers each having the above-described combination of the organic compound and the inorganic compound, or may further include another organic compound or inorganic compound.

Next, the third layer 802 is described. The third layer 802 is a layer having a function of transporting electrons to the second layer 803, and includes at least a third organic compound and a third inorganic compound showing an electron-donating property to the third organic compound. What is important is that the third organic compound and the third inorganic compound are not just simply mixed but the third inorganic compound shows an electron-donating property to the third organic compound. Such a structure allows many electrons (carriers) to be generated in the third organic compound which inherently has almost no carriers, and a highly excellent electron-injecting property and electron-transporting property can be obtained.

Therefore, the third layer 802 can provide not only an advantageous effect that is considered to be obtained by mixing an organic compound and an inorganic compound (such as improvement in heat resistance) but also excellent conductivity (particularly a hole-injecting property and a hole-transporting property with regard to the third layer 802). This excellent conductivity is an advantageous effect that cannot be obtained with a conventional hole-transporting layer in which an organic compound and an inorganic compound, which do not electronically interact with each other, are simply mixed. Such an advantageous effect allows a reduction in drive voltage than that of a conventional structure. In addition, since the third layer 802 can be made thicker without causing an increase in drive voltage, short circuit of the element due to dust and the like can be suppressed.

It is preferable to use an organic compound having an electron-transporting property for the third organic compound because electrons (carriers) are generated in the third organic compound as described above. Examples of an organic compound having an electron-transporting property include, but are not limited to, tris(8-quinolinolato)aluminum (abbr.: $Alq_3$), tris(4-methyl-8-quinolinolato)aluminum (abbr.: $Almq_3$), bis(10-hydroxybenzo[h]-quinolinato)beryllium (abbr.: $BeBq_2$), bis(2-methyl-8-quinolinolato)(4-phenylphenolato)aluminum (abbr.: BAlq), bis[2-(2'-hydroxyphenyl)benzoxazolato]zinc (abbr.: $Zn(BOX)_2$), bis[2-(2'-hydroxyphenyl)benzothiazolato]zinc (abbr.: $Zn(BTZ)_2$), bathophenanthroline (abbr.: BPhen), bathocuproine (abbr.: BCP), 2-(4-biphenylyl)-5-(4-tert-butylphenyl)-1,3,4-oxadiazole (abbr.: PBD), 1,3-bis[5-(4-tert-butylphenyl)-1,3,4-oxadiazol-2-yl]benzene (abbr.: OXD-7), 2,2',2''-(1,3,5-benzenetriyl)-tris(1-phenyl-1H-benzimidazole) (abbr.: TPBI), 3-(4-biphenylyl)-4-phenyl-5-(4-tert-butylphenyl)-1,2,4-triazole (abbr.: TAZ), 3-(4-biphenylyl)-4-(4-ethylphenyl)-5-(4-tert-butylphenyl)-1,2,4-triazole (abbr.: p-EtTAZ), and the like. In addition, among the compounds mentioned above, chelate metal complexes each having a chelate ligand including an aromatic ring as typified by $Alq_3$, $Almq_3$, $BeBq_2$, BAlq, $Zn(BOX)_2$, $Zn(BTZ)_2$, and the like; organic compounds each having a phenanthroline skeleton as typified by BPhen, BCP, and the like; and organic compounds having an oxadiazole skeleton as typified by PBD, OXD-7, and the like can easily generate electrons (carriers), and are suitable compounds for the third organic compound.

Meanwhile, the third inorganic compound may be any material as long as the material can easily donate electrons to the third organic compound, and various kinds of metal oxide and metal nitride can be used. Alkali metal oxide, alkaline earth metal oxide, rare earth metal oxide, alkali metal nitride, alkaline earth metal nitride, and rare earth metal nitride are preferable because they easily show an electron-donating property. Specifically, lithium oxide, strontium oxide, barium oxide, erbium oxide, lithium nitride, magnesium nitride, calcium nitride, yttrium nitride, lanthanum nitride, and the like can be used. In particular, lithium oxide, barium oxide, lithium nitride, magnesium nitride, and calcium nitride are preferable because they can be formed by vacuum evaporation and can be easily handled.

Note that the third layer 802 may also be formed by stacking a plurality of layers each having the above-described combination of the organic compound and the inorganic compound, or may further include another organic compound or inorganic compound.

Next, the second layer 803 is described. The second layer 803 is a layer having a light-emission function, and includes a second organic compound with a light-emitting property. The second layer 803 may also include a second inorganic compound. The second layer 803 can be formed by using various light-emitting organic compounds and inorganic compounds. However, since it is believed that current flows through the second layer 803 less easily than through the first layer 804 or the third layer 802, the thickness of the second layer 803 is preferably approximately 10 100 nm.

The second organic compound is not particularly limited as long as it is a light-emitting organic compound, and examples of the second organic compound include, for example, 9,10-di(2-naphthyl)anthracene (abbr.: DNA), 9,10-di(2-naphthyl)-2-tert-butylanthracene (abbr.: t-BuDNA), 4,4'-bis(2,2-diphenylvinyl)biphenyl (abbr.: DPVBi), coumarin 30, coumarin 6, coumarin 545, coumarin 545T, perylene, rubrene, periflanthene, 2,5,8,11-tetra(tert-butyl)perylene (abbr.: TBP), 9,10-diphenylanthracene (abbr.: DPA), 5,12-diphenyltetracene, 4-(dicyanomethylene)-2-methyl-[p-(dimethylamino)styryl]-4H-pyran (abbr.: DCM1), 4-(dicyanomethylene)-2-methyl-6-[2-(julolidine-9-yl)ethenyl]-4H-pyran (abbr.: DCM2), 4-(dicyanomethylene)-2,6-bis[p-(dimethylamino)styryl]-4H-pyran (abbr.: BisDCM), and the like. In addition, it is also possible to use a compound capable of generating phosphorescence such as bis[2-(4',6'-difluorophenyl)pyridinato-N,$C^{2'}$]iridium(picolinate) (abbr.: FIrpic), bis{2-[3',5'-bis(trifluoromethyl)phenyl]pyridinato-N,$C^{2'}$}iridium(picolinate) (abbr.: Ir($CF_3$ppy)$_2$(pic)), tris(2-phenylpyridinato-N,$C^{2'}$)iridium (abbr.: Ir(ppy)$_3$), bis(2-phenylpyridinato-N,$C^{2'}$)iridium(acetylacetonate) (abbr.: Ir(ppy)$_2$(acac)), bis[2-(2'-thienyl)pyridinato-N,$C^{3'}$]iridium (acetylacetonate) (abbr.: Ir(thp)$_2$(acac)), bis(2-phenylquinolinato-N,$C^{2'}$)iridium(acetylacetonate) (abbr.: Ir(pq)$_2$(acac)), or bis[2-(2'-benzothienyl)pyridinato-N,$C^{3'}$]iridium(acetylacetonate) (abbr.: Ir(btp)$_2$(acac)).

A triplet excitation light-emitting material containing a metal complex or the like may be used for the second layer 803 in addition to a singlet excitation light-emitting material. For example, among pixels that emit red, green, and blue light, the pixel that emits red light whose luminance is reduced by half in a relatively short time is formed by using a triplet excitation light-emitting material and the other pixels are formed by using a singlet excitation light-emitting material. A triplet excitation light-emitting material has high light-emission efficiency and requires less power consumption to obtain the same luminance. In other words, when a triplet excitation light-emitting material is used for a red pixel, only a small amount of current needs to be supplied to a light-emitting element, and thus, reliability can be improved. In order to reduce power consumption, a pixel that emits red light and a pixel that emits green light may be formed using a triplet excitation light-emitting material and a pixel that emits blue light may be formed using a singlet excitation light-emitting material. When a light-emitting element that emits green light that is highly visible to human eyes is formed by using a triplet excitation light-emitting material, power consumption can be further reduced.

The second layer 803 may include not only the above-described second organic compound that exhibits light emission, but also another organic compound. Examples of organic compounds that can be added include, but are not limited to, TDATA, MTDATA, m-MTDAB, TPD, NPB, DNTPD, TCTA, Alq$_3$, Almq$_3$, BeBq$_2$, BAlq, Zn(BOX)$_2$, Zn(BTZ)$_2$, BPhen, BCP, PBD, OXD-7, TPBI, TAZ, p-EtTAZ, DNA, t-BuDNA, and DPVBi, which are mentioned above, and further, 4,4'-bis(N-carbazolyl)biphenyl (abbr.: CBP), 1,3,5-tris[4-(N-carbazolyl)phenyl]benzene (abbr.: TCPB), and the like. It is preferable that the organic compound, which is added in addition to the second organic compound, have higher excitation energy than the second organic compound and be added in larger amounts than that of the second organic compound in order that the second organic compound may emit light efficiently (accordingly, concentration quenching of the second organic compound can be prevented). Alternatively, the organic compound added may have a function of emitting light together with the second organic compound (accordingly, white light emission and the like becomes possible).

For the second layer 803, light-emitting layers having different light-emission wavelength bands may be formed in respective pixels so that color display is performed. Typically, light-emitting layers corresponding to respective luminescent colors of R (red), G (green), and B (blue) are formed. In this case, color purity can be improved and a specular surface (reflection) of a pixel portion can be prevented by providing a filter that transmits light with the above-mentioned light-emission wavelength bands on a light-emission side of the pixels. Provision of such a filter can eliminate the need of a circular polarizing plate or the like that has been conventionally required, whereby loss of light emitted from the light-emitting layers can be reduced. In addition, changes in hue, which are caused when a pixel portion (a display screen) is seen obliquely, can be reduced.

The material that can be used for the second layer 803 may be either a low-molecular organic light-emitting material or a high-molecular organic light-emitting material. A high-molecular organic light-emitting material has higher physical strength than a low-molecular organic light-emitting material, and the durability of an element formed using such a material is high. In addition, since a high-molecular organic light-emitting material can be deposited by coating, fabrication of an element can is relatively easy.

A light-emission color is determined by a material of the light-emitting layer. Therefore, a light-emitting element that emits light of a desired color can be formed by appropriately selecting the material. Examples of the high-molecular electroluminescent material that can be used for formation of the light-emitting layer include a polyparaphenylene vinylene based material, a polyparaphenylene based material, a polythiophene based material, and a polyfluorene based material.

Examples of the polyparaphenylene vinylene based material include derivatives of poly(paraphenylenevinylene) [PPV]; poly(2,5-dialkoxy-1,4-phenylenevinylene) [RO-PPV]; poly[2-(2'-ethyl-hexoxy)-5-methoxy-1,4-phenylenevinylene] [MEH-PPV]; and poly[2-(dialkoxyphenyl)-1,4-phenylenevinylene] [ROPh-PPV]. Examples of the polyparaphenylene based material include derivatives of polyparaphenylene [PPP]; poly(2,5-dialkoxy-1,4-phenylene) [RO-PPP]; and poly(2,5-dihexoxy-1,4-phenylene). Examples of the polythiophene based material include derivatives of polythiophene [PT]; poly(3-alkylthiophene) [PAT]; poly(3-hexylthiophene) [PHT]; poly(3-cyclohexylthiophene) [PCHT]; poly(3-cyclohexyl-4-methylthiophene) [PCHMT]; poly(3,4-dicyclohexylthiophene) [PDCHT]; poly [3-(4-octylphenyl)-thiophene] [POPT]; and poly[3-(4-octylphenyl)-2,2-bithiophene] [PTOPT]. Examples of the polyfluorene based material include derivatives of polyfluorene [PF]; poly(9,9-dialkylfluorene) [PDAF]; and poly(9,9-dioctylfluorene) [PDOF].

The second inorganic compound may be any inorganic compound as long as it does not easily quench light emission of the second organic compound, and various kinds of metal oxide and metal nitride can be used. In particular, oxide of a metal that belongs to Group 13 or 14 of the periodic table is preferably used because such oxide does not easily quench light emission of the second organic compound. Specifically, aluminum oxide, gallium oxide, silicon oxide, and germanium oxide are preferably used. However, the second inorganic compound is not limited thereto.

Note that the second layer 803 may also be formed by stacking a plurality of layers each having the above-described combination of the organic compound and the inorganic compound, or may further include another organic compound or inorganic compound. A layer structure of the light-emitting layer can be changed. For example, instead of providing a specific electron-injecting region or light-emitting region, an electrode layer for injecting electrons may be provided or a light-emitting material may be dispersed. Such modification is possible within the spirit and scope of the present invention.

A light-emitting element formed using the above-described material emits light when a forward bias is applied thereto. Pixels of a display device formed using light-emitting elements can be driven by a passive matrix method or an active matrix method. In either method, each pixel emits light when a forward bias is applied thereto at specific timing whereas the pixel is in a non-light-emission period for a given period. By applying a reverse bias at the non-light-emission period, reliability of the light-emitting element can be improved. As the kinds of deterioration modes of the light-emitting element, there is a deterioration mode in which light-emission intensity is decreased under specific driving conditions and a deterioration mode in which a non-light-emitting region is enlarged in the pixel and luminance is apparently decreased. However, progression of deterioration can be retarded by performing AC drive in which a forward bias and a reverse bias are applied. Thus, the reliability of the light-emitting display device can be improved. In addition, either a digital drive or an analog drive can be employed.

Thus, a color filter (colored layer) may be formed over a sealing substrate. The color filter (colored layer) can be formed by an evaporation method or a droplet discharge method. When the color filter (colored layer) is used, high-definition display can be performed. This is because broad peaks of the emission spectra of R, and B can be corrected to sharp peaks by the color filter (colored layer).

When a material exhibiting monochromatic light emission is used in combination with a color filter or a color conversion layer, full color display can be performed. For example, the color filter (colored layer) or the color conversion layer may be formed over the sealing substrate and then attached to the element substrate.

Needless to say, display with monochromatic light emission may also be performed. For instance, an area-color display device may be formed using monochromatic light emission. A passive matrix display portion is suitable for the area-color display device, and such a display portion can mainly display characters and symbols.

Figure 22A:
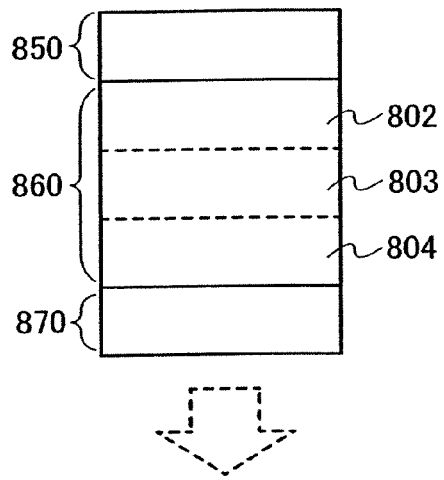
FIGS. 22A to 22D are cross-sectional views each illustrating a structure of a light-emitting element applicable to the present invention.
Figure 22B:
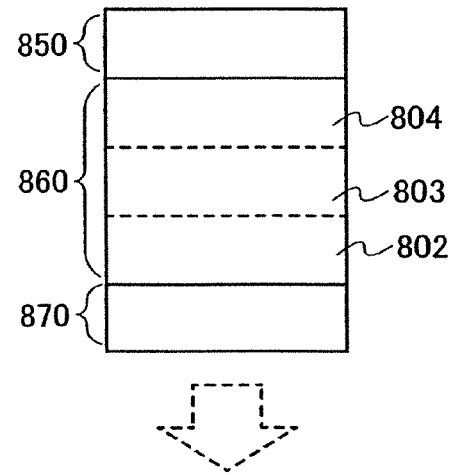

Materials of the first electrode layer 870 and the second electrode layer 850 need to be selected by taking into consideration the work function. Each of the first electrode layer 870 and the second electrode layer 850 can be either an anode or a cathode depending on the pixel structure. When the polarity of a driving thin film transistor is a p-channel type, the first electrode layer 870 and the second electrode layer 850 preferably serve as an anode and a cathode, respectively as illustrated in FIG. 22A. When the polarity of the driving thin film transistor is an n-channel type, the first electrode layer 870 and the second electrode layer 850 preferably serve as a cathode and an anode, respectively as illustrated in FIG. 22B. Materials that can be used for the first electrode layer 870 and the second electrode layer 850 will be described now. A material having a higher work function (specifically, a material having a work function of 4.5 eV or higher) is preferably used for one of the first electrode layer 870 and the second electrode layer 850, which serves as an anode, and a material having a lower work function (specifically, a material having a work function of 3.5 eV or lower) is preferably used for the other electrode layer which serves as a cathode. However, since the first layer 804 is superior in a hole-injecting property and a hole-transporting property and the third layer 802 is superior in an electron-injecting property and an electron transporting property, both of the first electrode layer 870 and the second electrode layer 850 can be formed using various materials with few limitations of work functions.

Each of the light-emitting elements illustrated in FIGS. 22A and 22B has a structure in which light is extracted through the first electrode layer 870 and, thus, the second electrode layer 850 does not necessarily need to have a light-transmitting property. The second electrode layer 850 may be formed to a total thickness of 100 to 800 nm, using an element selected from Ti, Ni, W, Cr, Pt, Zn, Sn, In, Ta, Al, Cu, Au, Ag, Mg, Ca, Li, or Mo; an alloy or compound material containing the above element as its main component, for example, titanium nitride, $TiSi_xN_y$, $WSi_x$, tungsten nitride, $WSi_xN_y$, or NbN; or a stacked film thereof.

The second electrode layer 850 can be formed by an evaporation method, a sputtering method, a CVD method, a printing method, a dispenser method, a droplet discharge method, or the like.

When the second electrode layer 850 is formed using a light-transmissive conductive material like the material used for the first electrode layer 870, light is also extracted through the second electrode layer 850, and a dual-emission structure can be constructed in which light emitted from the light-emitting element is emitted to both of the first electrode layer 870 side and the second electrode layer 850 side.

Note that the light-emitting element of the present invention can have various structures by changing the kind of materials used for the first electrode layer 870 and the second electrode layer 850.

FIG. 22B illustrates a case where the electroluminescent layer 860 has a structure in which the third layer 802, the second layer 803, and the first layer 804 are sequentially formed over the first electrode layer 870.

As described above, in the light-emitting element of the present invention, a layer interposed between the first electrode layer 870 and the second electrode layer 850 is formed from the electroluminescent layer 860 including a composite layer of an organic compound and an inorganic compound. The light-emitting element is an organic-inorganic composite light-emitting element provided with layers (that is, the first layer 804 and the third layer 802) that are formed by mixing an organic compound and an inorganic compound and provide functions such as a high carrier-injecting property and a carrier-transporting property. Such functions cannot be obtained when only one of the organic compound and the inorganic compound is used. Further, each of the first layer 804 and the third layer 802 needs to be a composite layer of an organic compound and an inorganic compound, particularly when the first layer 804 or the third layer 802 is provided on the first electrode layer 870 side. However, when the first layer 804 or the third layer 802 is provided on the second electrode layer 850 side, it may be formed to contain only one of an organic compound and an inorganic compound.

Further, various methods can be used as a method for forming the electroluminescent layer 860 that is a layer in which an organic compound and an inorganic compound are mixed. For example, the methods include a co-evaporation method in which both an organic compound and an inorganic compound are evaporated by resistance heating. Co-evaporation may also be carried out by evaporating an inorganic compound with an electron beam (EB) while at the same time evaporating an organic compound by resistance heating. Further, it is also possible to use a method of sputtering an inorganic compound while at the same time evaporating an organic compound by resistance heating so that both the compounds are deposited at the same time. Alternatively, the electroluminescent layer 860 may be formed by a wet process.

Similarly, the first electrode layer 870 and the second electrode layer 850 can be formed by an evaporation method using resistance heating, an EB evaporation method, sputtering, a wet process, and the like.

Figure 22C:
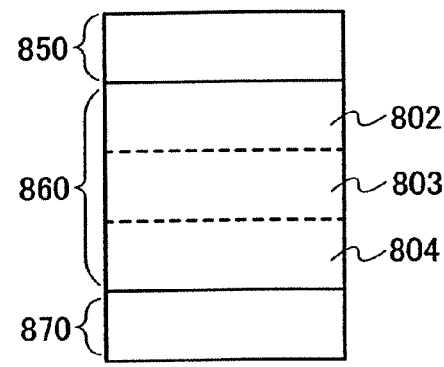
Figure 22D:
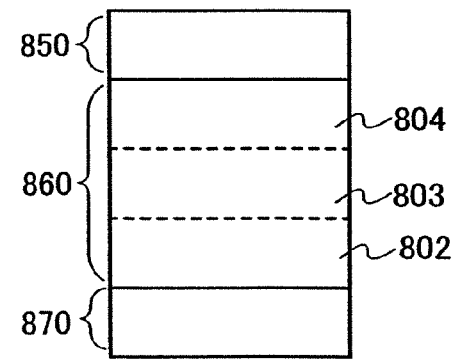

FIG. 22C illustrates a variation of FIG. 22A, in which a reflective electrode layer is used for the first electrode layer 870 and a light-transmissive electrode layer is used for the second electrode layer 850. Light emitted from the light-emitting element is reflected by the first electrode layer 870, and then transmitted through the second electrode layer 850 to be emitted outside. Similarly, FIG. 22D illustrates a variation of FIG. 22B, in which a reflective electrode layer is used for the first electrode layer 870 and a light-transmissive electrode layer is used for the second electrode layer 850. Light emitted from the light-emitting element is reflected by the first electrode layer 870, and then transmitted through the second electrode layer 850 to be emitted outside.

The display device in this embodiment mode also has a plurality of pyramidal projections that is densely arranged on the surface of its display screen. Therefore, the number of times light from external is incident on the pyramidal projections of the display device can be increased, whereby the amount of incident light from external that is transmitted through the pyramidal projections is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in anti-reflection function due to entry of dust or the like can be prevented, and filling a space between the pyramidal projections can increase the physical strength of the display device. Accordingly, reliability can be improved.

This embodiment mode provides a display device having a plurality of hexagonal pyramidal projections formed contiguously on its surface and a protective layer provided between the pyramidal projections. Such a display device has highly visibility and has an anti-reflection function that can further reduce reflection of incident light from external. Therefore, a display device with higher image quality and higher performance can be fabricated.

This embodiment mode can be freely combined with any of Embodiment Modes 1, 2, 3, 5, and 6.

Embodiment Mode 8

This embodiment mode will describe an exemplary display device that has high visibility and has an anti-reflection function by which reflection of incident light from external can be further reduced. Specifically, this embodiment mode illustrates a light-emitting display device that uses light-emitting elements as display elements. Described in this embodiment mode is the structure of a light-emitting element that can be used as a display element of a display device of the present invention, with reference to FIGS. 23A to 24C.

Light-emitting elements utilizing electroluminescence are classified according to whether a light-emitting material used is an organic compound or an inorganic compound. In general, the former light-emitting element is referred to as an organic EL element, and the latter light-emitting element is referred to as an inorganic EL element.

Inorganic EL elements are classified, according to their element structures, into dispersed inorganic EL elements and thin-film inorganic EL elements. The dispersed inorganic EL element and the thin-film inorganic EL element are different in that the former has an electroluminescent layer in which a particulate light-emitting material is dispersed in a binder whereas the latter has an electroluminescent layer formed of a thin film of a light-emitting material. However, they are common in requiring electrons accelerated by a high electric field. Note that mechanisms of light emission obtained include a donor-acceptor recombination light emission that utilizes a donor level and an acceptor level, and a localized light emission that utilizes inner-shell electron transition of metal ions. Generally, in many cases, the dispersed inorganic EL element exhibits the donor-acceptor recombination light emission whereas the thin-film inorganic EL element exhibits the localized light emission.

Light-emitting materials that can be used in the present invention include a base material and an impurity element serving as a light-emitting center. Light emission of various colors can be obtained by changing impurity elements to be used. As a method for forming a light-emitting material, various methods such as a solid phase method and a liquid phase method (coprecipitation method) can be used. In addition, a liquid phase method such as a spray pyrolysis method, a double decomposition method, a method of precursor pyrolysis, a reverse micelle method, a combined method of one of these methods and high-temperature baking, or a freeze-drying method can be used.

The solid phase method is a method by which a base material and an impurity element or a compound containing an impurity element are weighed, mixed in a mortar, and reacted by heating and baking in an electric furnace so that the impurity element is contained in the base material. The baking temperature is preferably in the range of 700 to 1500° C. This is because solid phase reaction does not proceed when the temperature is too low whereas the base material is decomposed when the temperature is too high. Note that the baking may be performed in powder form, but the baking is preferably performed in pellet form. The method requires baking at a relatively high temperature; however, it is a simple method. Therefore, the method provides good productivity and is suitable for mass production.

The liquid phase method (coprecipitation method) is a method by which a base material or a compound containing a base material is reacted in a solution with an impurity element or a compound containing an impurity element, and then the reactant is dried and baked. Particles of the light-emitting material are uniformly distributed, and the reaction can proceed even when the particle size is small and the baking temperature is low.

As an exemplary base material used for a light-emitting material, sulfide, oxide, or nitride can be given. Examples of sulfide include, for example, zinc sulfide (ZnS), cadmium sulfide (CdS), calcium sulfide (CaS), yttrium sulfide ($Y_2S_3$), gallium sulfide ($Ga_2S_3$), strontium sulfide (SrS), and barium sulfide (BaS). Examples of oxide include, for example, zinc oxide (ZnO) and yttrium oxide ($Y_2O_3$). Examples of nitride include, for example, aluminum nitride (AlN), gallium nitride (GaN), and indium nitride (InN). Further, zinc selenide (ZnSe), zinc telluride (ZnTe), or the like can also be used. It is also possible to use a ternary mixed crystal such as calcium gallium sulfide ($CaGa_2S_4$), strontium gallium sulfide ($SrGa_2S_4$), or barium gallium sulfide ($BaGa_2S_4$).

As a material serving as the light-emitting center of localized light emission, the following can be used: manganese (Mn), copper (Cu), samarium (Sm), terbium (Tb), erbium (Er), thulium (Tm), europium (Eu), cerium (Ce), praseodymium (Pr), and the like. Note that a halogen element such as fluorine (F) or chlorine (Cl) may be added thereto. A halogen element can also function as a charge compensation element.

On the other hand, as a material serving as the light-emitting center of donor-acceptor recombination light emission, a light-emitting material can be used which contains a first impurity element for forming a donor level and a second impurity element for forming an acceptor level. As the first impurity element, fluorine (F), chlorine (Cl), aluminum (Al), or the like can be used, for example. As the second impurity element, copper (Cu), silver (Ag), or the like can be used, for example.

In the case of synthesizing the light-emitting material of donor-acceptor recombination light emission by a solid phase method, a base material, a first impurity element or a compound containing a first impurity element, and a second impurity element or a compound containing a second impurity element are separately weighed, mixed in a mortar, and then heated and baked in an electric furnace. As the base material, the above-mentioned base material can be used. As the first impurity element or the compound containing the first impurity element, fluorine (F), chlorine (Cl), aluminum sulfide ($Al_2S_3$), or the like can be used, for example. As the second impurity element or the compound containing the second impurity element, copper (Cu), silver (Ag), copper sulfide ($Cu_2S$), silver sulfide ($Ag_2S$), or the like can be used, for example. The baking temperature is preferably in the range of 700 to 1500° C. This is because solid phase reaction does not proceed when the temperature is too low whereas the base material is decomposed when the temperature is too high. Note that the baking may be performed in powder form, but the baking is preferably performed in pellet form.

In the case of using solid phase reaction, a compound containing the first impurity element and the second impurity element can be used as the impurity element. In this case, the impurity element is easily diffused and the solid phase reaction easily proceeds, so that a uniform light-emitting material can be obtained. Furthermore, a high-purity light-emitting material can be obtained because an unnecessary impurity element is not mixed. As the compound containing the first impurity element and the second impurity element, copper chloride (CuCl), silver chloride (AgCl), or the like can be used, for example.

Note that the concentration of the impurity element to the base material may be in the range of 0.01 to 10 atomic %, preferably 0.05 to 5 atomic %.

In the case of the thin-film inorganic EL element, the electroluminescent layer is a layer containing the above-described light-emitting material, which can be formed by a vacuum evaporation method such as a resistance heating evaporation method or an electron beam evaporation (EB evaporation) method, a physical vapor deposition (PVD) method such as a sputtering method, a chemical vapor deposition (CVD) method such as a metal organic CVD method or a low-pressure hydride transport CVD method, an atomic layer epitaxy (ALE) method, or the like.

Figure 23A:
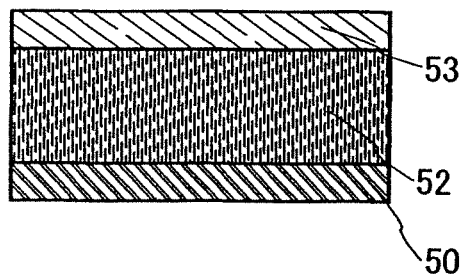
FIGS. 23A to 23C are cross-sectional views each illustrating a structure of a light-emitting element applicable to the present invention.
Figure 23B:
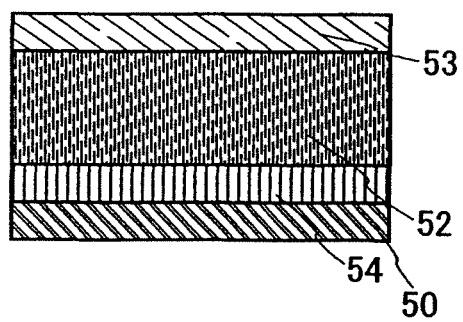
Figure 23C:
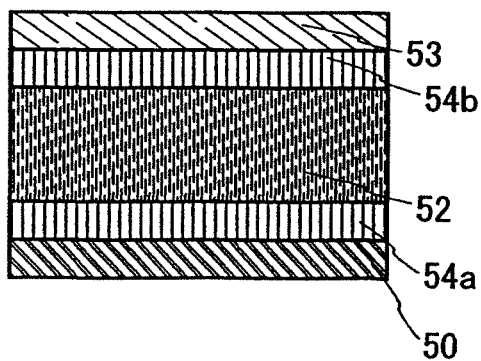

FIGS. 23A to 23C illustrate examples of a thin-film inorganic EL element that can be used as a light-emitting element. In FIGS. 23A to 23C, a light-emitting element includes a first electrode layer 50, an electroluminescent layer 52, and a second electrode layer 53.

Each of the light-emitting elements illustrated in FIGS. 23B and 23C is a variation of the light-emitting element in FIG. 23A, in which an insulating layer is provided between the electrode layer and the electroluminescent layer. The light-emitting element illustrated in FIG. 23B includes an insulating layer 54 between the first electrode layer 50 and the electroluminescent layer 52. The light-emitting element illustrated in FIG. 23C includes an insulating layer 54a between the first electrode layer 50 and the electroluminescent layer 52 and an insulating layer 54b between the second electrode layer 53 and the electroluminescent layer 52. As described above, the insulating layer may be provided between the electroluminescent layer and one or each of the pair of electrode layers sandwiching the electroluminescent layer therebetween. In addition, the insulating layer may be either a single layer or a stack of a plurality of layers.

In FIG. 23B, the insulating layer 54 is provided to be in contact with the first electrode layer 50. However, the insulating layer 54 may be provided to be in contact with the second electrode layer 53 by reversing the order of the insulating layer and the electroluminescent layer.

In the case of the dispersed inorganic EL element, a particulate light-emitting material is dispersed in a binder to form a film-form electroluminescent layer. In the case where a particle having a desired size cannot be sufficiently obtained depending on a fabrication method of a light-emitting material, the material may be processed into particles by being crushed in a mortar or the like. The binder is a substance for fixing a particulate light-emitting material in a dispersed state and keeping the material in shape as the electroluminescent layer. The light-emitting material is uniformly dispersed and fixed in the electroluminescent layer by the binder.

In the case of the dispersed inorganic EL element, the electroluminescent layer can be formed by a droplet discharge method that can selectively form the electroluminescent layer, a printing method (such as screen printing or offset printing), a coating method such as a spin coating method, a dipping method, a dispenser method, or the like. The thickness of the electroluminescent layer is not particularly limited, but it is preferably in the range of 10 to 1000 nm. In addition, in the electroluminescent layer containing the light-emitting material and the binder, the percentage of the light-emitting material is preferably in the range of 50 to 80 wt %.

Figure 24A:
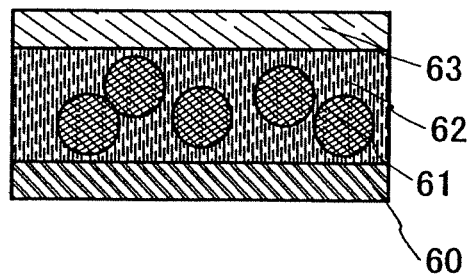
FIGS. 24A to 24C are cross-sectional views each illustrating a structure of a light-emitting element applicable to the present invention.
Figure 24B:
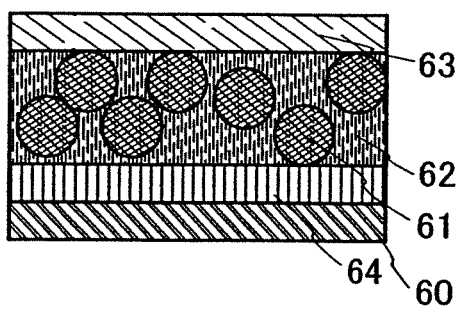
Figure 24C:
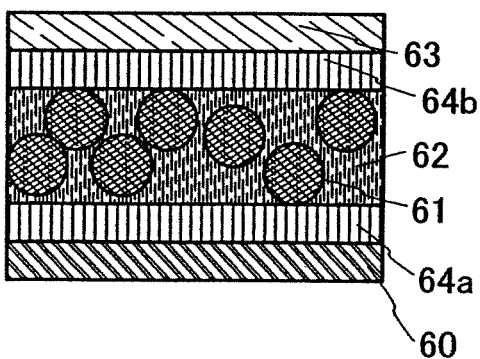

FIGS. 24A to 24C illustrate examples of a dispersed inorganic EL element that can be used as a light-emitting element. A light-emitting element in FIG. 24A has a stacked structure of a first electrode layer 60, an electroluminescent layer 62, and a second electrode layer 63, and contains a light-emitting material 61 held by a binder in the electroluminescent layer 62.

As the binder that can be used in this embodiment mode, an organic material, an inorganic material, or a mixed material of an organic material and an inorganic material can be given. Organic materials that can be used are a polymer having a relatively high dielectric constant such as a cyanoethyl cellulose resin, and a resin such as polyethylene, polypropylene, a polystyrene resin, a silicone resin, an epoxy resin, and vinylidene fluoride. Alternatively, a heat resistant high-molecular compound such as aromatic polyamide or polybenzimidazole, or a siloxane resin may be used. Note that the siloxane resin corresponds to a resin having Si—O—Si bonds. Siloxane is composed of a skeleton formed by the bond of silicon (Si) and oxygen (O). As a substituent, an organic group containing at least hydrogen (for example, an alkyl group or aromatic hydrocarbon) is used. Alternatively, a fluoro group may be used as the substituent. As a further alternative, both a fluoro group and an organic group containing at least hydrogen may be used as the substituent. Further, a resin material such as a vinyl resin like polyvinyl alcohol or polyvinylbutyral, a phenol resin, a novolac resin, an acrylic resin, a melamine resin, a urethane resin, or an oxazole resin (polybenzoxazole) may be used. A dielectric constant can be controlled by appropriately mixing high dielectric constant fine particles of barium titanate ($BaTiO_3$), strontium titanate ($SrTiO_3$), or the like into the above resin.

As an inorganic material included in the binder, a material selected from substances containing inorganic materials can be used, such as silicon oxide ($SiO_x$), silicon nitride ($SiN_x$), silicon containing oxygen and nitrogen, aluminum nitride (AlN), aluminum containing oxygen and nitrogen, aluminum oxide ($Al_2O_3$), titanium oxide ($TiO_2$), $BaTiO_3$, $SrTiO_3$, lead titanate ($PbTiO_3$), potassium niobate ($KNbO_3$), lead niobate ($PbNbO_3$), tantalum oxide ($Ta_2O_5$), barium tantalate ($BaTa_2O_6$), lithium tantalate ($LiTaO_3$), yttrium oxide ($Y_2O_3$), or zirconium oxide ($ZrO_2$). The dielectric constant of the electroluminescent layer containing the light-emitting material and the binder can be controlled by adding a high dielectric constant inorganic material to an organic material, so that the dielectric constant can be increased. When a mixed layer of an inorganic material and an organic material is used as a binder to obtain a high dielectric constant, higher electric charge can be induced by the light-emitting material.

In a fabrication process, a light-emitting material is dispersed in a solution containing a binder. As a solvent of the solution containing the binder that can be used in this embodiment mode, a solvent in which a binder material is soluble and which can produce a solution having a viscosity suitable for a method for forming the electroluminescent layer (various wet processes) and a desired thickness, may be selected as appropriate. An organic solvent or the like can be used. In the case of using a siloxane resin as the binder, for example, propylene glycol monomethyl ether, propylene glycol monomethyl ether acetate (also referred to as PGMEA), 3-methoxy-3-methyl-1-butanol (also referred to as MMB), or the like can be used.

Each of the light-emitting elements illustrated in FIGS. 24B and 24C is a variation of the light-emitting element in FIG. 24A, in which an insulating layer is provided between the electrode layer and the electroluminescent layer. The light-emitting element illustrated in FIG. 24B includes an insulating layer 64 between the first electrode layer 60 and the electroluminescent layer 62. The light-emitting element illustrated in FIG. 24C includes an insulating layer 64a between the first electrode layer 60 and the electroluminescent layer 62 and an insulating layer 64b between the second electrode layer 63 and the electroluminescent layer 62. As described above, the insulating layer may be provided between the electroluminescent layer and one or each of the pair of electrodes sandwiching the electroluminescent layer therebetween. In addition, the insulating layer may be either a single layer or a stack of a plurality of layers.

In FIG. 24B, the insulating layer 64 is provided to be in contact with the first electrode layer 60. However, the insulating layer 64 may be provided in contact with the second electrode layer 63 by reversing the order of the insulating layer and the electroluminescent layer.

An insulating layer such as the insulating layer 54 in FIGS. 23A to 23C or the insulating layer 64 in FIGS. 24A to 24C is not particularly limited, but it preferably has a high withstand voltage and dense film quality. Furthermore, it preferably has a high dielectric constant. For example, a film of silicon oxide ($SiO_2$), yttrium oxide ($Y_2O_3$), titanium oxide ($TiO_2$), aluminum oxide ($Al_2O_3$), hafnium oxide ($HfO_2$), tantalum oxide ($Ta_2O_5$), barium titanate ($BaTiO_3$), strontium titanate ($SrTiO_3$), lead titanate ($PbTiO_3$), silicon nitride ($Si_3N_4$), zirconium oxide ($ZrO_2$), or the like; a mixed film thereof; or a stacked film of two or more kinds of such materials can be used. These insulating films can be formed by sputtering, evaporation, CVD, or the like. Alternatively, the insulating layer may be formed by dispersing particles of the insulating material in a binder. A binder material may be formed using a material and a method similar to those of the binder included in the electroluminescent layer. The thickness of the insulating layer is not particularly limited, but it is preferably in the range of 10 to 1000 nm.

The light-emitting element described in this embodiment mode, which can provide light emission when a voltage is applied across a pair of electrode layers sandwiching the electroluminescent layer therebetween, can be operated by either DC drive or AC drive.

The display device in this embodiment mode also has a plurality of pyramidal projections that is densely arranged on the surface of its display screen. Therefore, the number of times light from external is incident on the pyramidal projections of the display device can be increased, whereby the amount of incident light from external that is transmitted through the pyramidal projections is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in anti-reflection function due to entry of dust or the like can be prevented, and filling a space between the pyramidal projections can increase the physical strength of the display device. Accordingly, reliability can be improved.

This embodiment mode provides a display device having a plurality of hexagonal pyramidal projections formed contiguously on its surface and a protective layer provided between the pyramidal projections. Such a display device has high visibility and has an anti-reflection function that can further reduce reflection of incident light from external. Therefore, a display device with higher image quality and higher performance can be fabricated.

This embodiment mode can be freely combined with any of Embodiment Modes 1, 2, 3, 5, and 6.

Embodiment Mode 9

This embodiment mode describes a structure of a backlight. A backlight is provided in a display device as a backlight unit having a light source. In the backlight unit, the light source is surrounded by a reflection plate so that light is scattered efficiently.

Figure 16A:
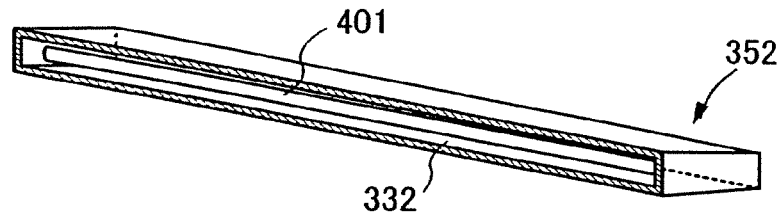
FIGS. 16A to 16D are backlights that can be used for a display device of the present invention.

As illustrated in FIG. 16A, a cold cathode tube 401 can be used as a light source in a backlight unit 352. In order to efficiently reflect light from the cold cathode tube 401, a lamp reflector 332 may be provided. The cold cathode tube 401 is often used for a large-sized display device because of the high intensity of luminance from the cold cathode tube. Therefore, the backlight unit having a cold cathode tube can be used for a display of a personal computer.

Figure 16B:
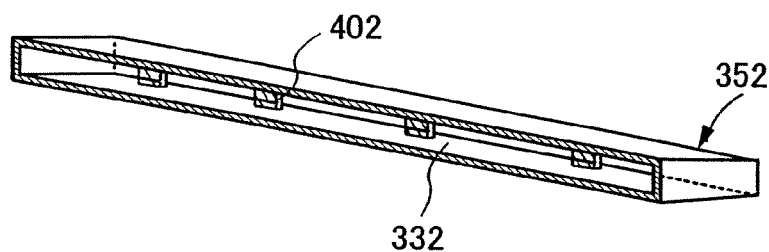

As illustrated in FIG. 16B, light-emitting diodes (LED) 402 can be used as a light source in the backlight unit 352. For example, white light-emitting diodes (W) 402 are arranged at predetermined intervals. In order to efficiently reflect light from the light-emitting diodes (W) 402, the lamp reflector 332 may be provided.

Figure 16C:
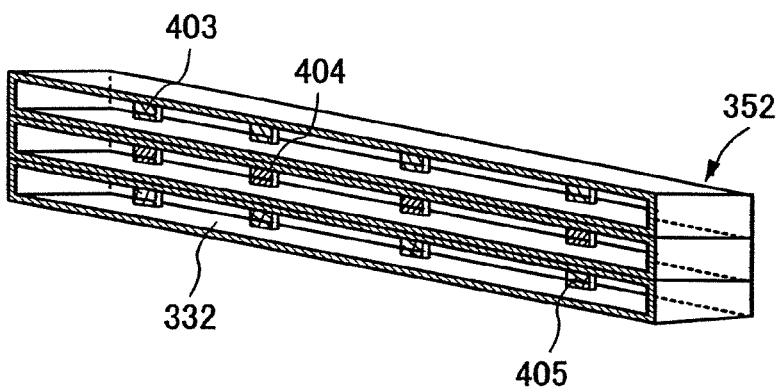

As illustrated in FIG. 16C, RGB light-emitting diodes (LED) 403 to 405 can be used as a light source in the backlight unit 352. When the RGB light-emitting diodes (LED) 403 to 405 are used, color reproducibility can be enhanced as compared with the case where only the white light-emitting diodes (W) 402 are used. In order to efficiently reflect light from the light-emitting diodes, the lamp reflector 332 may be provided.

Figure 16D:
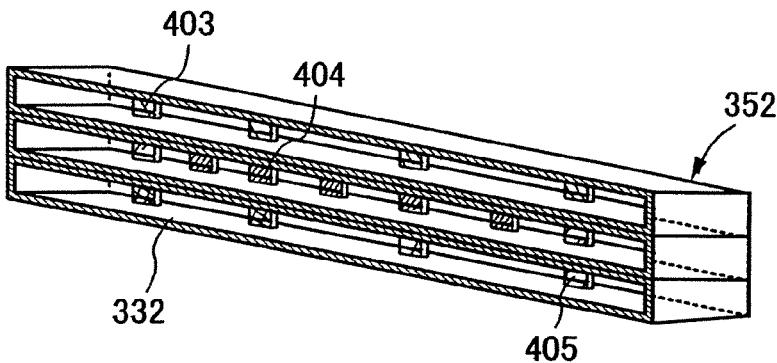

As illustrated in FIG. 16D, when the RGB light-emitting diodes (LED) 403 to 405 are used as a light source, the number and position of the light-emitting diodes of each color do not have to be equal. For example, a plurality of light-emitting diodes of a color with light-emission intensity (for example, green) may be arranged.

Furthermore, the white light-emitting diodes 402 and the RGB light-emitting diodes (LED) 403 to 405 may be combined.

When RGB light-emitting diodes are used and a field sequential mode is applied, color display can be performed by sequentially lighting the RGB light-emitting diodes in accordance with time.

The light-emitting diodes are suitable for a large-sized display device because of their high luminance. In addition, color reproducibility of the light-emitting diodes is superior to that of a cold cathode tube because of the high color purity of each color of RGB and a small area required for arrangement. Therefore, when the light-emitting diodes are applied to a small-sized display device, a narrower frame can be achieved.

A light source does not need to be provided as the backlight units illustrated in FIGS. 16A to 16D. For example, in the case of mounting a backlight having light-emitting diodes on a large-sized display device, the light-emitting diodes may be arranged on the rear side of the substrate. In this case, the light-emitting diodes of respective colors can be sequentially arranged at predetermined intervals. The light-emitting diodes arranged in this manner can enhance the color reproducibility.

By providing a display device using such a backlight with an anti-reflection film that has a plurality of pyramidal projections formed on its surface, a display device can be provided which has high visibility and has a high anti-reflection function by which reflection of incident light from external can be further reduced. Accordingly, a display device with higher image quality and higher performance can be fabricated in accordance with the present invention. In particular, a backlight having light-emitting diodes is suitable for a large-sized display device. Thus, increasing the contrast ratio of the large-sized display device can provide high-quality images even in a dark place.

This embodiment mode can be freely combined with any of Embodiment Modes 1 to 4.

Embodiment Mode 10

Figure 15:
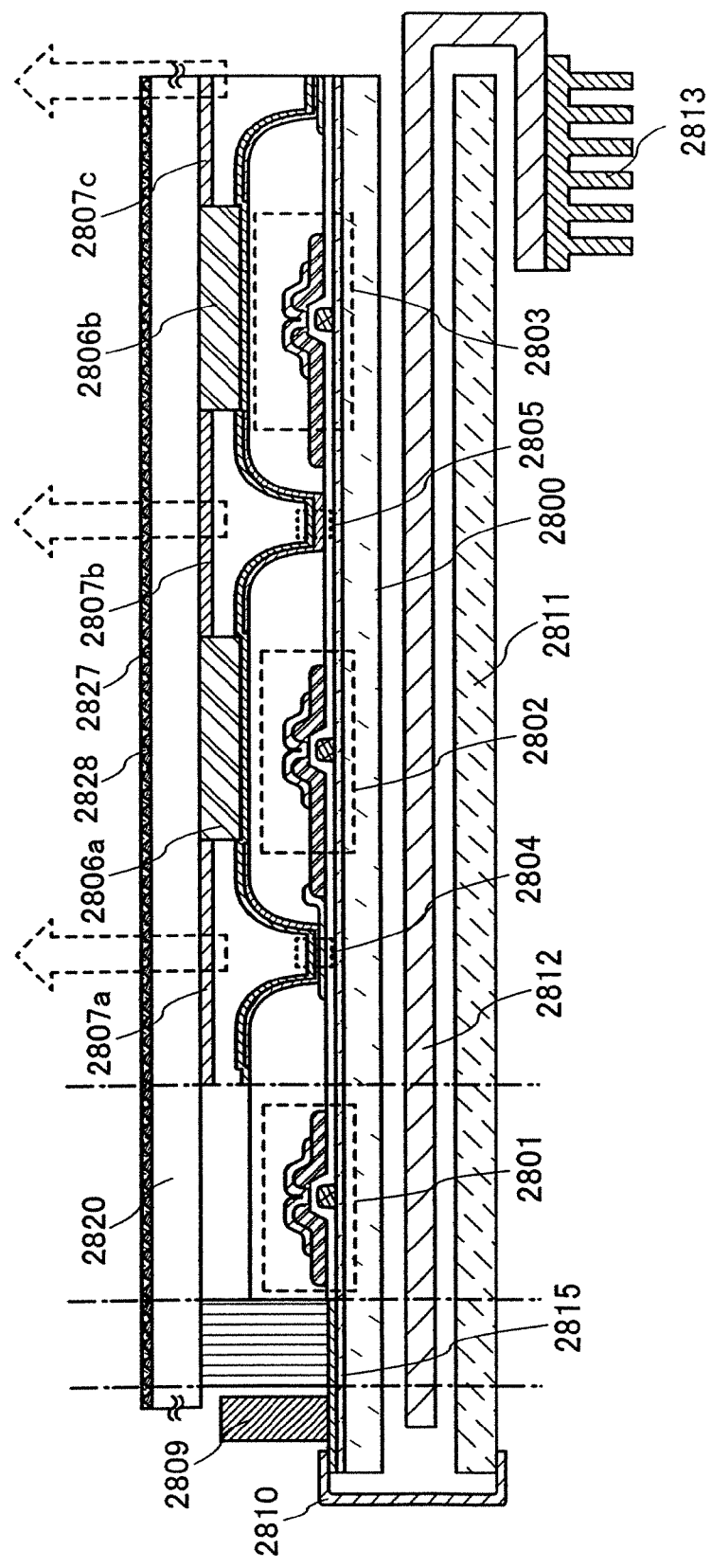
FIG. 15 is a cross-sectional view of a display module of the present invention.

FIG. 15 exemplarily illustrates a construction of an EL display module fabricated in accordance with the present invention. In FIG. 15, an insulating film 2815 and a pixel portion having pixels is formed over a substrate 2800. A flexible substrate is used for each of the substrate 2800 and a sealing substrate 2820.

In FIG. 15, a TFT having a similar structure to a TFT formed in the pixel, or a protective circuit portion 2801 having a whose gate is connected to one of its source and drain so as to be operated in a similar manner to a diode is provided between a driver circuit and the pixel, outside the pixel portion. A driver IC formed of a single crystalline semiconductor, a stick driver IC formed of a polycrystalline semiconductor film over a glass substrate, a driver circuit formed of a SAS, or the like is applied to a driver circuit 2809.

The substrate 2800 having an element layer is fixed to the sealing substrate 2820 with spacers 2806a and 2806b formed by a droplet discharge method interposed therebetween. The spacers are preferably provided to keep a constant distance between the two substrates even when the substrate is thin or an area of the pixel portion is enlarged. A space between the substrate 2800 and the sealing substrate 2820, which is located above light-emitting elements 2804 and 2805 connected to TFTs 2802 and 2803, respectively may be filled with a light-transmissive resin material and the resin material may be solidified, or may be filled with anhydrous nitrogen or an inert gas. Hexagonal pyramidal projections 2827 are provided on the outer side of the sealing substrate 2820 that is a viewer side, and a protective layer 2828 is formed to fill a space between the pyramidal projections 2827.

FIG. 15 illustrates the case where the light-emitting elements 2804 and 2805 have a top-emission structure in which light is emitted in the direction of the arrows illustrated in the drawing. When light-emission colors of respective pixels are varied such as red, green, and blue colors, multicolor display can be performed. At this time, color purity of the light emitted outside can be improved by forming colored layers 2807a to 2807c corresponding to the respective colors on the sealing substrate 2820 side. Moreover, it is also possible to form white light-emitting elements in the pixels and combine them with the colored layers 2807a to 2807c.

The driver circuit 2809 that is an external circuit is connected by a wiring board 2810 to a scan line or signal line connection terminal that is provided at one end of an external circuit board 2811. In addition, a heat pipe 2813, which is a high-efficiency heat conduction device in a pipe form, and a heat sink 2812 may be provided to be in contact with or adjacent to the substrate 2800 so that a heat dissipation effect is enhanced.

Although FIG. 15 illustrates the top-emission EL module, a bottom-emission structure may be employed by changing the structure of the light-emitting element or the position of the external circuit board. Needless to say, a dual-emission structure may be used in which light is emitted to both the top and bottom sides. In the case of the top-emission structure, an insulating layer serving as a partition may be colored and used as a black matrix. This partition can be formed by a droplet discharge method, using a material formed by mixing a black resin of a pigment, carbon black, or the like into a resin material such as polyimide. Alternatively, a stacked structure thereof may also be used.

In addition, reflected light of incident light from external may be blocked by using a retardation plate or a polarizing plate. Also, an insulating layer serving as a partition may be colored and used as a black matrix. This partition can be formed by a droplet discharge method, using a material formed by mixing carbon black or the like into a resin material such as polyimide. Alternatively, a stacked structure thereof may also be used. The partition may also be formed by discharging different materials in the same region a plurality of times, by a droplet discharge method. A quarter-wave plate or a half-wave plate may be used as the retardation plate and may be designed to be capable of controlling light. The module has a structure in which a TFT element substrate, the light-emitting element, the sealing substrate (sealant), the retardation plate (a quarter-wave plate or a half-wave plate), and the polarizing plate are sequentially stacked. Light emitted from the light-emitting element is transmitted through these layers to be emitted outside from the side of the polarizing plate. The retardation plate and the polarizing plate are acceptable as long as they are provided on a light-emission side. In the case of a dual-emission display device in which light is emitted to both the top and bottom sides, the retardation plate and the polarizing plate may be provided on both sides. In addition, a plurality of pyramidal projections may be provided on the outer side of the polarizing plate. Accordingly, images with higher definition and resolution can be displayed.

In this embodiment mode, the plurality of pyramidal projections is densely arranged on a substrate of a viewer side. As for a sealing structure on a side opposite to the viewer side with respect to the element, a sealing structure may be formed by attaching a resin film to the side of the pixel portion, with the use of a sealant or an adhesive resin. Various sealing methods such as resin sealing using a resin, plastic sealing using plastic, and film sealing using a film can be used. A gas barrier film that prevents moisture vapor from penetrating the resin film is preferably provided on the surface of the resin film. When a film sealing structure is employed, further reduction in thickness and weight can be achieved.

The display device in this embodiment mode also has a plurality of pyramidal projections that is densely arranged on the surface of its display screen. Therefore, the number of times light from external is incident on the pyramidal projections of the display device can be increased, whereby the amount of incident light from external that is transmitted through the pyramidal projections is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in anti-reflection function due to entry of dust or the like can be prevented, and filling a space between the pyramidal projections can increase the physical strength of the display device. Accordingly, reliability can be improved.

This embodiment mode provides a display device having a plurality of hexagonal pyramidal projections formed contiguously on its surface and a protective layer provided between the pyramidal projections. Such a display device has hi My visibility and has an anti-reflection function that can further reduce incident light from external. Therefore, a display device with higher image quality and higher performance can be fabricated.

This embodiment mode can be freely combined with any of Embodiment Modes 1 to 3 and 5 to 8.

Embodiment Mode 11

Figure 14A:
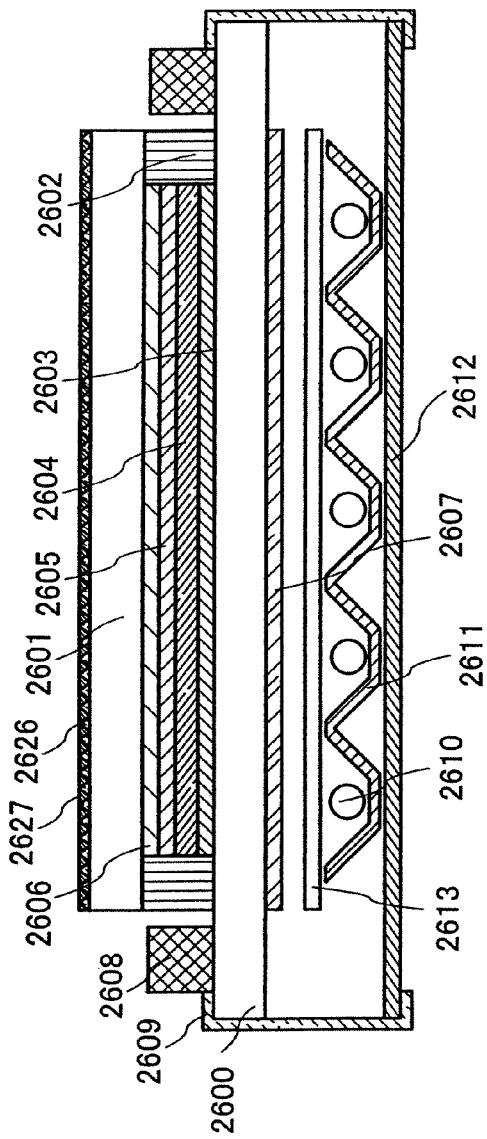
FIGS. 14A and 14B are cross-sectional views of display modules of the present invention.
Figure 14B:
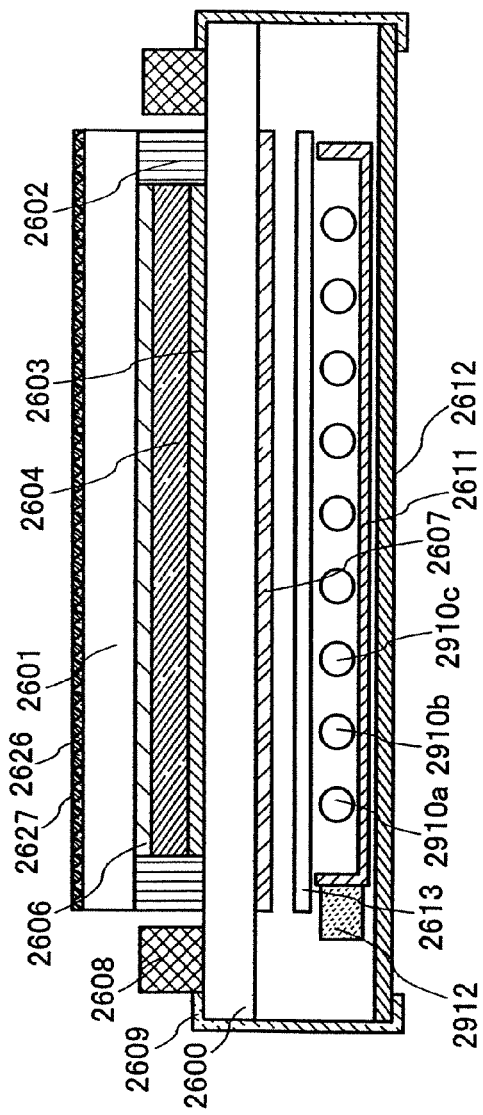

This embodiment mode is described with reference to FIGS. 14A and 14B. FIGS. 14A and 14B exemplarily illustrate constructions of a display device (a liquid crystal display module) formed by using a TFT substrate 2600 that is fabricated in accordance with the present invention.

FIG. 14A illustrates an example of a liquid crystal display module, in which the TFT substrate 2600 and an opposite substrate 2601 are attached to each other with a sealant 2602. A display region is formed between the substrates, which includes a pixel portion 2603 having TFTs and the like, a display element 2604 including a liquid crystal layer, a colored layer 2605, and a polarizing plate 2606. The colored layer 2605 is necessary to perform color display. In the case of an RGB display method, colored layers corresponding to red, green, and blue colors are provided for respective pixels. A polarizing plate 2607 and a diffusion plate 2613 are provided on the outer side of the TFT substrate 2600. A polarizing plate 2606 is provided on the inner side of the opposite substrate 2601 whereas hexagonal pyramidal projections 2626 are provided on the outer side of the opposite substrate 2601. A light source includes a cold cathode tube 2610 and a reflection plate 2611. A circuit board 2612 is connected to the TFT substrate 2600 through a flexible wiring board 2609. External circuits such as a control circuit and a power supply circuit are incorporated in the circuit board 2612. In addition, reference numeral 2608 denotes a driver circuit. In addition, the polarizing plate and the liquid crystal layer may be stacked with a retardation plate interposed therebetween. In this embodiment mode, a protective layer 2627 is formed to fill a space between the pyramidal projections 2626.

The display device in FIG. 14A illustrates the example in which the pyramidal projections 2626 are provided on the outer side of the opposite substrate 2601, and the polarizing plate 2606 and the colored layer 2605 are sequentially provided on the inner side of the opposite substrate 2601. However, the polarizing plate 2606 may be provided on the outer side (a viewer side) of the opposite substrate 2601, and in that case, the pyramidal projections 2626 may be provided on the surface of the polarizing plate 2606. The stacked structure of the polarizing plate 2606 and the colored layer 2605 is also not limited to that illustrated in FIG. 14A and may be appropriately determined depending on materials of the polarizing plate 2606 and the colored layer 2605 or conditions of a fabrication process.

The liquid crystal display module can employ a TN (Twisted Nematic) mode, an IPS (In-Plane-Switching) mode, an FFS (Fringe Field Switching) mode, an MVA (Multi-domain Vertical Alignment) mode, a PVA (Patterned Vertical Alignment) mode, an ASM (Axially Symmetric aligned Micro-cell) mode, an OCB (Optical Compensated Birefringence) mode, an FLC (Ferroelectric Liquid Crystal) mode, an AFLC (Anti Ferroelectric Liquid Crystal) mode, or the like.

FIG. 14B illustrates an example in which an OCB mode is applied to the liquid crystal display module of FIG. 14A, that is, FIG. 14B illustrates an FS-LCD (Field Sequential-LCD). The FS-LCD performs red, green, and blue light emissions in one frame period. Thus, color display can be performed by composing an image using a time division method. In addition, since light emission of each color is obtained by using a light-emitting diode, a cold cathode tube, or the like, color filters are not required. Therefore, there is no need to arrange color filters of the three primary colors to restrict the display region of each color. Thus, all of the three colors can be displayed in any region. Meanwhile, since light emission of the three colors is performed in one frame period, high-speed response of liquid crystals is required. When an FLC mode using an FS system or the OCB mode is applied to the display device of the present invention, a display device or a liquid crystal television device having high performance and high image quality can be completed.

A liquid crystal layer of the OCB mode has a so-called $\pi$ cell structure. In the $\pi$ cell structure, liquid crystal molecules are oriented such that their pretilt angles are symmetrical with respect to the center plane between the active matrix substrate and the opposite substrate. In the $\pi$ cell structure, liquid crystal molecules are in a splay orientation when a voltage is not applied across the substrates, whereas the liquid crystal molecules shift to a bend orientation when a voltage is applied. When the liquid crystal molecules are in the bend orientation, white display is performed. When a voltage is further continuously applied, liquid crystal molecules in the bend orientation become perpendicular to the substrates, whereby light transmission is blocked. Note that when the OCB mode is used, a response speed approximately ten times as high as that of a conventional TN mode can be achieved.

Further, as a mode corresponding to the FS system, it is also possible to use an HV (Half V)-FLC, an SS (Surface Stabilized)-FLC, or the like that uses a ferroelectric liquid crystal (FLC) capable of high-speed operation. A nematic liquid crystal that has relatively low viscosity can be used for the OCB mode. A smectic liquid crystal that has a ferroelectric phase can be used for the HV-FLC or the SS-FLC.

The optical response speed of the liquid crystal display module is increased by narrowing a cell gap of the liquid crystal display module. Alternatively, the optical response speed can be increased by reducing the viscosity of the liquid crystal material. The above method of increasing the optical response speed is more effective when a pixel region of a TN-mode liquid crystal display module has a pixel pitch of 30 µm or less. The optical response speed can be further increased by an overdrive method in which an applied voltage is increased (or decreased) only for a moment.

The liquid crystal display module of FIG. 14B is a transmissive liquid crystal display module, in which a red light source 2910*a*, a green light source 2910*b*, and a blue light source 2910*c* are provided as light sources. A controller 2912 is provided in the liquid crystal display module to separately control on/off switching of the red light source 2910*a*, the green light source 2910*b*, and the blue light source 2910*c*. The light emission of each color is controlled by the controller 2912, and light enters the liquid crystals. Color display is performed by composing an image using a time division method.

The display device in this embodiment mode also has a plurality of pyramidal projections that is densely arranged on the surface of its display screen. Therefore, the number of times light from external is incident on the pyramidal projections of the display device can be increased, whereby the amount of incident light from external that is transmitted through the pyramidal projections is increased. Thus, the amount of incident light from external that is reflected to a viewer side can be reduced, which eliminates the cause of a reduction in visibility such as reflection.

Furthermore, since the protective layer is formed between the pyramidal projections in the present invention, entry of contaminants such as dust into spaces between the pyramidal projections can be prevented. Therefore, a decrease in antireflection function due to entry of dust or the like can be prevented, and filling a space between the pyramidal projections can increase the physical strength of the display device. Accordingly, reliability can be improved.

This embodiment mode provides a display device having a plurality of hexagonal pyramidal projections formed contiguously on its surface and a protective layer provided between the pyramidal projections. Such a display device has highly visibility and has an anti-reflection function that can further reduce reflection of incident light from external. Therefore, a display device with higher image quality and higher performance can be fabricated.

This embodiment mode can be freely combined with any of Embodiment Modes 1 to 4 and 9.

Embodiment Mode 12

Figure 19:
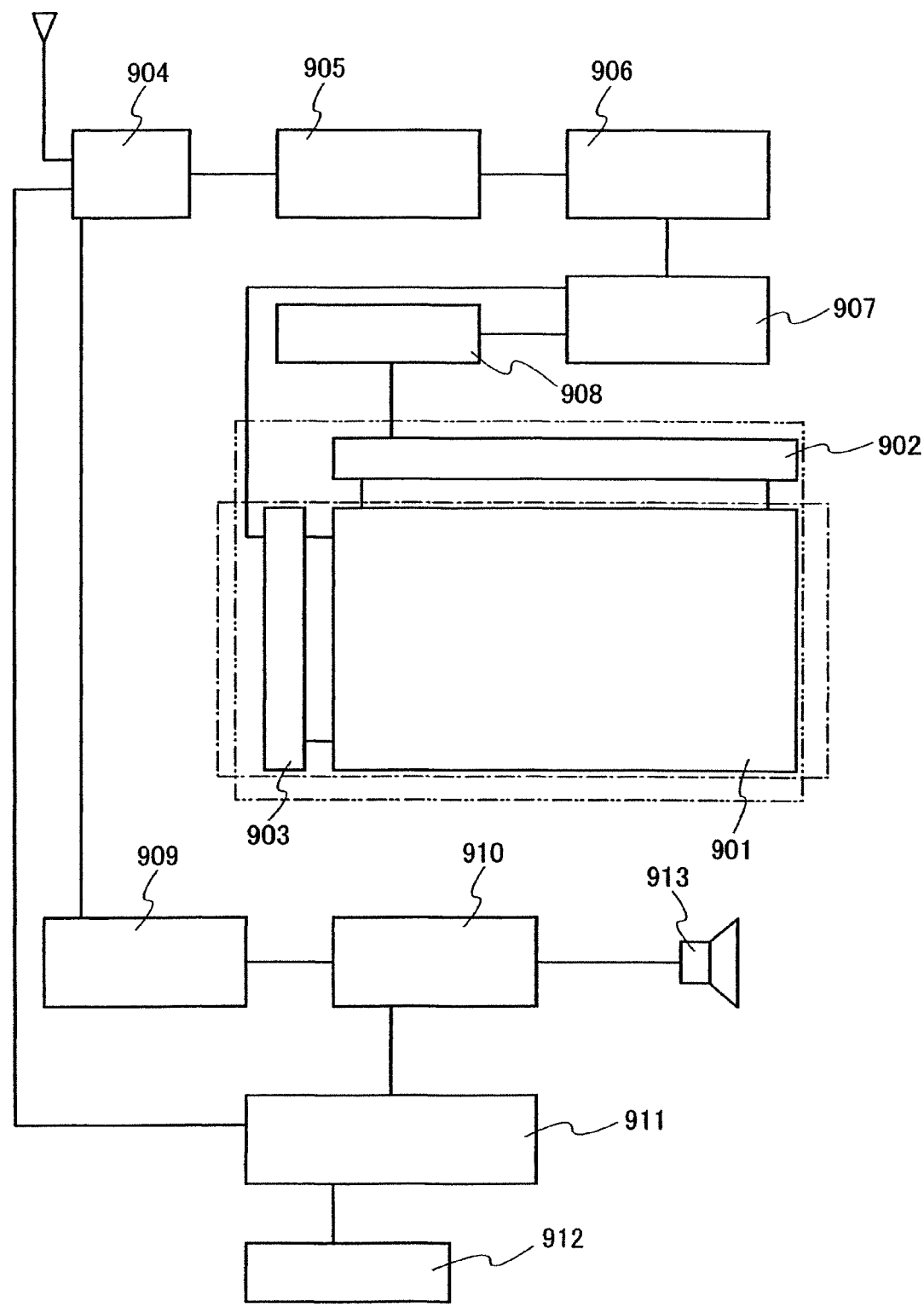
FIG. 19 is a block diagram illustrating the main components of an electronic device to which the present invention is applied.

With the display device formed in accordance with the present invention, a television device (also simply referred to as a television or a television receiver) can be completed. FIG. 19 is a block diagram illustrating the main components of the television device.

Figure 17A:
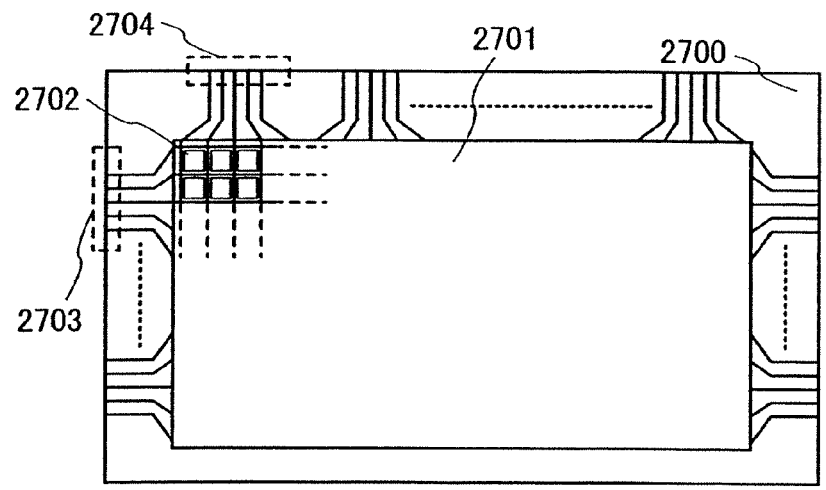
FIGS. 17A to 17C are top views of display devices of the present invention.

FIG. 17A is a top view illustrating a structure of a display panel according to the present invention. A pixel portion 2701 having a matrix arrangement of pixels 2702, a scan line input terminal 2703, and a signal line input terminal 2704 are formed over a substrate 2700 having an insulating surface. The number of pixels may be determined in accordance with various standards. For example, the number of pixels may be 1024×768×3 (RGB) for XGA full-color display using RGB; 1600×1200×3 (RGB) for UXGA full-color display using RGB; and 1920×1080×3 (RGB) for full-spec, high-definition, and full-color display using RGB.

The pixels 2702 are arranged in matrix by the intersection of scan lines extending from the scan line input terminal 2703 and signal lines extending from the signal line input terminal 2704. Each pixel 2702 in the pixel portion 2701 is provided with a switching element and a pixel electrode layer connected thereto. A typical example of the switching element is a TFT. A gate electrode layer of the TFT is connected to the scan line, and a source or a drain of the TFT is connected to the signal line, so that each pixel can be independently controlled by a signal input from outside.

Figure 18A:
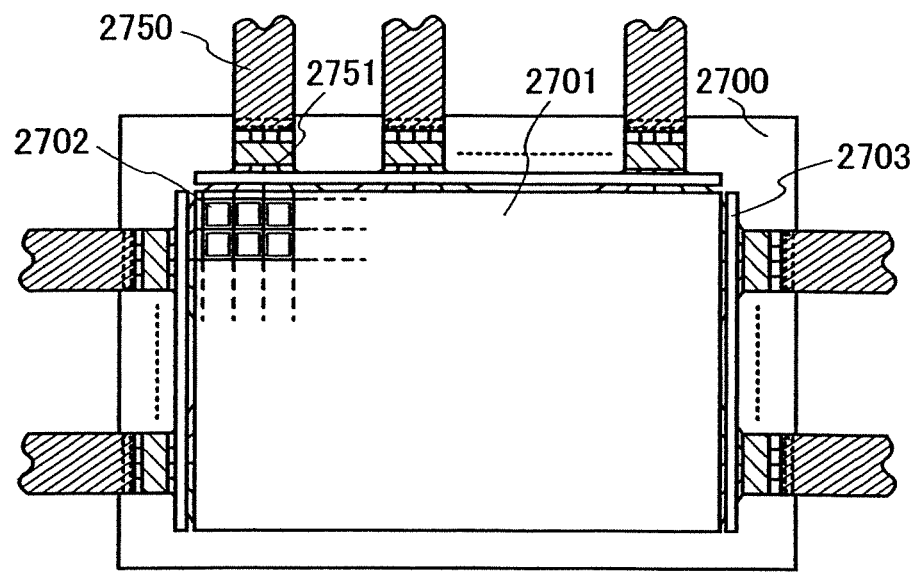
FIGS. 18A and 18B are top views of display devices of the present invention.
Figure 18B:
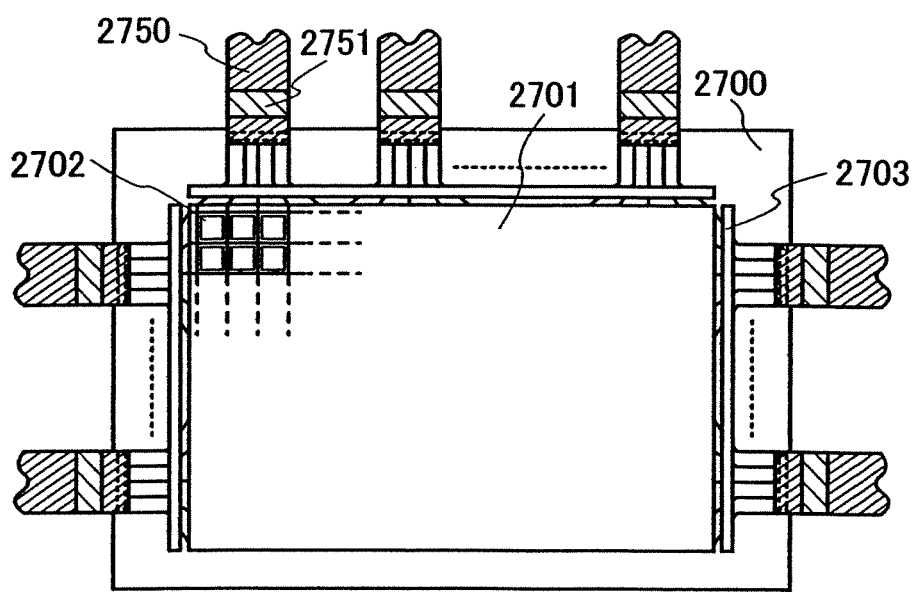

FIG. 17A illustrates a structure of a display panel in which signals input to the scan lines and the signal lines are controlled by external driver circuits. However, a structure as illustrated in FIG. 18A may be used in which driver ICs 2751 are mounted on the substrate 2700 by a COG (Chip On Glass) method. Further, a TAB (Tape Automated Bonding) method may be used as another mounting method as illustrated in FIG. 18B. The driver ICs may be formed on single crystalline semiconductor substrates or may be formed using TFTs over a glass substrate. In FIGS. 18A and 18B, the driver ICs 2751 are connected to FPCs (Flexible Printed Circuits) 2750.

Figure 17B:
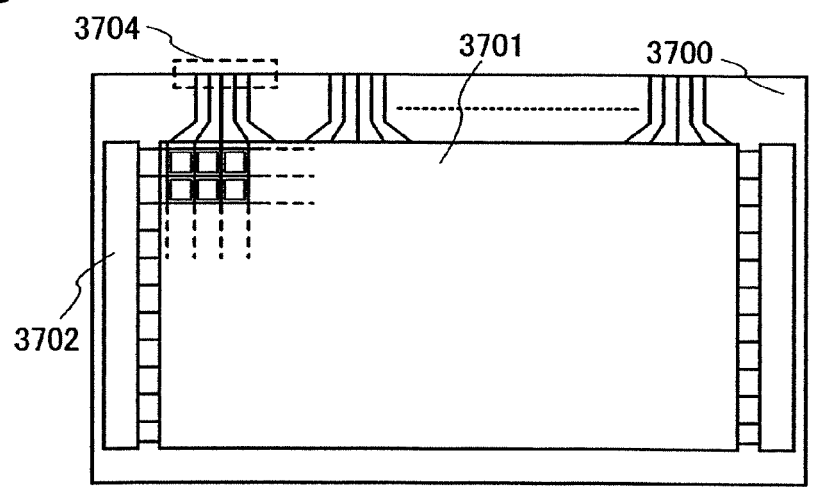

When a TFT provided in a pixel is formed with a crystalline semiconductor, a scan line driver circuit 3702 can be formed over a substrate 3700 as illustrated in FIG. 17B. In FIG. 17B, a pixel portion 3701 is controlled by an external driver circuit connected to a signal line input terminal 3704, similarly to FIG. 17A. When the TFT provided in the pixel is formed with a polycrystalline (microcrystalline) semiconductor, a single crystalline semiconductor, or the like that has high mobility, a pixel portion 4701, a scan line driver circuit 4702, and a signal line driver circuit 4704 can all be formed over a glass substrate 4700 as illustrated in FIG. 17C.

Figure 17C:
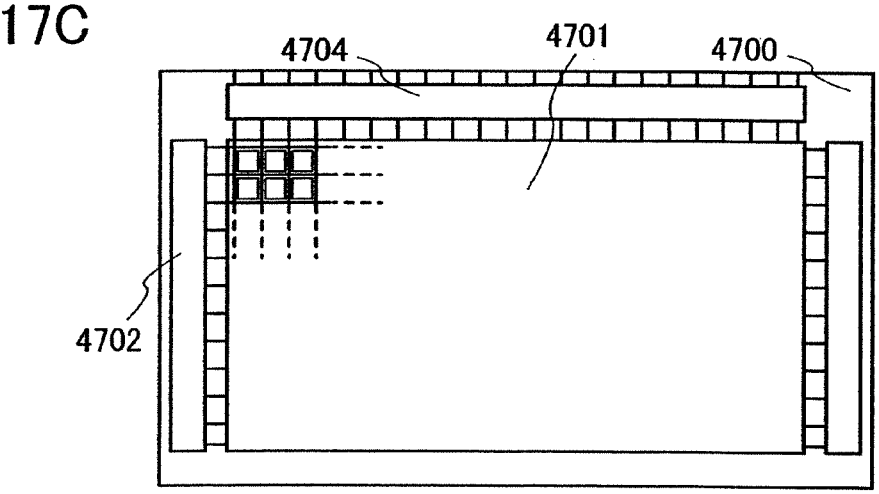

A display panel in FIG. 19 may have any of the following structures: a structure in which only a pixel portion 901 is formed over a substrate as illustrated in FIG. 17A and a scan line driver circuit 903 and a signal line driver circuit 902 are mounted thereon by a TAB method as illustrated in FIG. 18B or by a COG method as illustrated in FIG. 18A; a structure in which the pixel portion 901 and the scan line driver circuit 903 are formed using TFTs over a substrate whereas the signal line driver circuit 902 is mounted thereon as a driver IC as illustrated in FIG. 17B; and a structure in which the pixel portion 901, the signal line driver circuit 902, and the scan line driver circuit 903 are all formed over the same substrate illustrated in FIG. 17C.

The structure of other external circuits in FIG. 19 is described now. The external circuits on the input side of video signals include a video signal amplifier circuit 905 that amplifies a video signal among signals received by a tuner 904, a video signal processing circuit 906 that converts signals output from the video signal amplifier circuit 905 into chrominance signals corresponding to respective colors of red, green, and blue, a control circuit 907 that converts the video signals to be input to the driver ICs, and the like. The control circuit 907 outputs signals to both the scan line side and the signal line side. In the case of performing digital drive, a signal dividing circuit 908 may be provided on the signal line side and an input digital signal may be divided into m signals to be supplied.

An audio signal among signals received by the tuner 904 is transmitted to an audio signal amplifier circuit 909 and is supplied to a speaker 913 through an audio signal processing circuit 910. A control circuit 911 receives control information of a receiving station (reception frequency) or sound volume from an input portion 912 and transmits signals to the tuner 904 and the audio signal processing circuit 910.

Figure 20A:
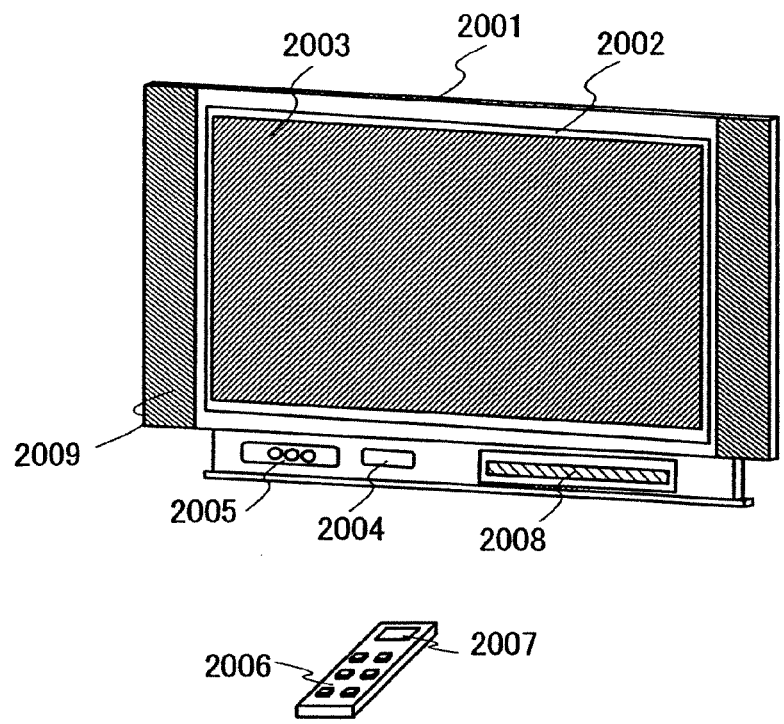
FIGS. 20A and 20B each illustrate an electronic device of the present invention.
Figure 20B:
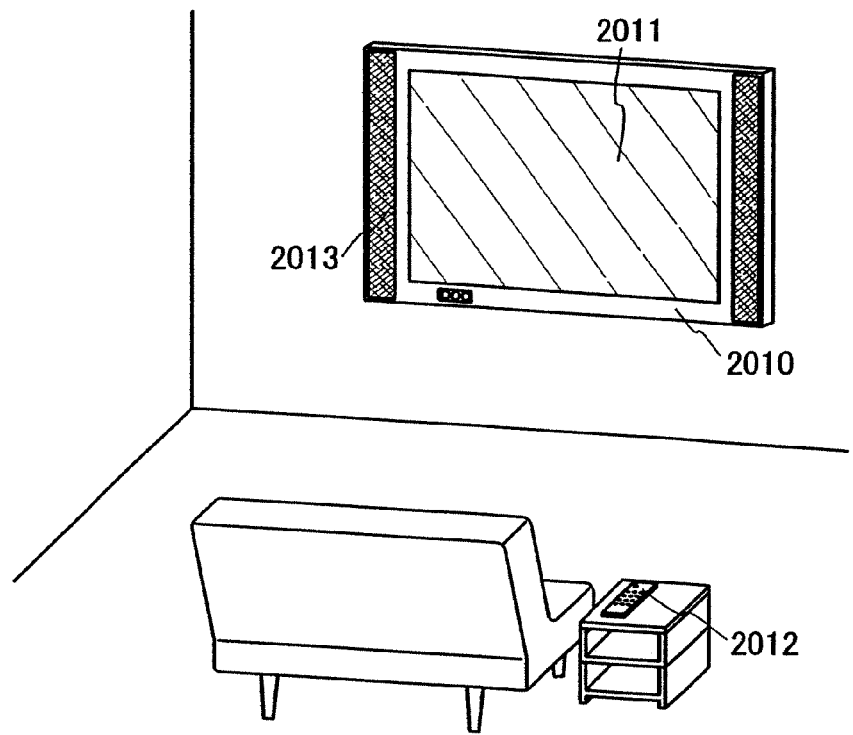

A television device can be completed by incorporating the display module into a chassis as illustrated in FIGS. 20A and 20B. When a liquid crystal display module is used as a display module, a liquid crystal television device can be fabricated. When an EL display module is used, an EL television device can be fabricated. In FIG. 20A, a main screen 2003 is formed by using the display module, and speaker portions 2009, operation switches, and the like are provided as accessory equipment. Thus, a television device can be completed in accordance with the present invention.

A display panel 2002 is incorporated in a chassis 2001, and general TV broadcast can be received by a receiver 2005. When the television device is connected to a wired or wireless communication network via a modem 2004, one-way (from a sender to a receiver) or two-way (between a sender and a receiver or between receivers) information communication can be performed. The television device can be operated with switches built in the chassis 2001 or with a remote controller 2006. The remote controller 2006 may also be provided with a display portion 2007 that displays information to be output.

Further, the television device may also include a sub screen 2008 formed using a second display panel to display channels, volume, or the like, in addition to the main screen 2003. In this structure, both the main screen 2003 and the sub screen 2008 can be formed using the liquid crystal display panel of the present invention. Alternatively, the main screen 2003 may be formed using an EL display panel having a wide viewing angle, and the sub screen 2008 may be formed using a liquid crystal display panel capable of displaying images with less power consumption. When priority is given to low power consumption, the main screen 2003 may be formed using a liquid crystal display panel, and the sub screen may be formed using an EL display panel. In addition, the sub screen may be capable of blinking. With the present invention, a highly reliable display device can be formed even when a large-sized substrate is used and a large number of TFTs or electronic components are used.

FIG. 20B illustrates a television device having a large-sized display portion, for example, a 20 to 80-inch display portion. The television device includes a chassis 2010, a display portion 2011, a remote controller 2012 that is an operation portion, speaker portions 2013, and the like. The present invention is applied to fabrication of the display portion 2011. Since the television device in FIG. 20B is a wall-hanging type, it does not require a large installation space.

Needless to say, the present invention is not limited to the television device, and can be applied to various uses particularly as a large-sized display medium such as an information display board at the train station, airport, or the like, or an advertisement display board on the street as well as a monitor of a personal computer.

This embodiment mode can be freely combined with any of Embodiment Modes 1 to 11.

Embodiment Mode 13

Examples of electronic devices in accordance with the present invention include a television device (also simply referred to as a television or a television receiver), a camera such as a digital camera or a digital video camera, a cellular telephone device (also simply referred to as a cellular phone or a cell-phone), an information terminal such as PDA, a portable game machine, a computer monitor, a computer, an audio reproducing device such as a car audio system, an image reproducing device having a recording medium such as a home-use game machine, and the like. Further, the present invention can be applied to various amusement machines having a display device such as pachinko machines, slot machines, pinball machines, and large game machines. Specific examples thereof will be described with reference to FIGS. 21A to 21F.

Figure 21A:
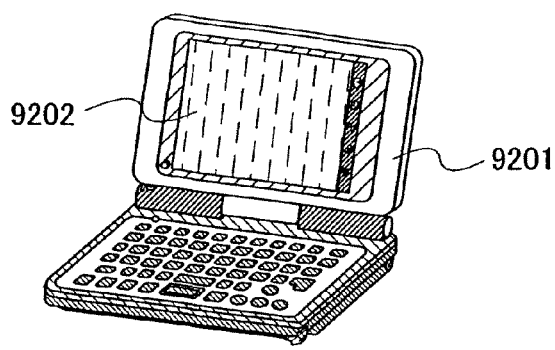
FIGS. 21A to 21F each illustrate an electronic device of the present invention.

A portable information terminal device illustrated in FIG. 21A includes a main body 9201, a display portion 9202, and the like. The display device of the present invention can be applied to the display portion 9202. Accordingly, a high-performance portable information terminal device that can display high-quality images with high visibility can be provided.

Figure 21B:
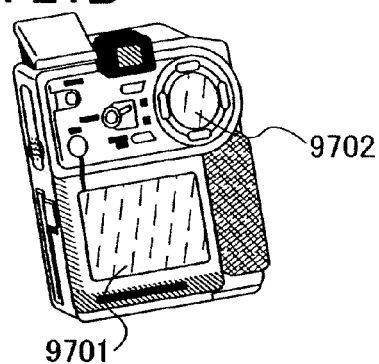

A digital video camera illustrated in FIG. 21B includes a display portion 9701, a display portion 9702, and the like. The display device of the present invention can be applied to the display portion 9701. Accordingly, a high-performance digital video camera that can display high-quality images with high visibility can be provided.

Figure 21C:
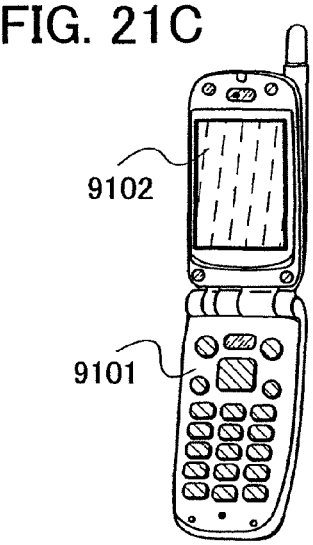

A cellular phone illustrated in FIG. 21C includes a main body 9101, a display portion 9102, and the like. The display device of the present invention can be applied to the display portion 9102. Accordingly, a high-performance cellular phone that can display high-quality images with high visibility can be provided.

Figure 21D:
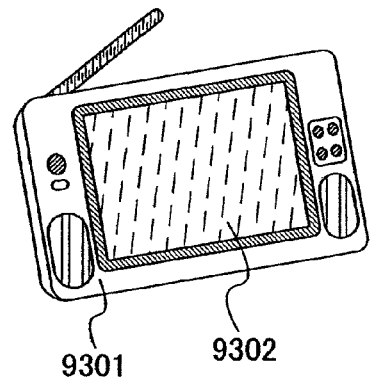

A portable television device illustrated in FIG. 21D includes a main body 9301, a display portion 9302, and the like. The display device of the present invention can be applied to the display portion 9302. Accordingly, a high-performance portable television device that can display high-quality images with high visibility can be provided. The display device of the present invention can be applied to a wide range of television devices such as a small-sized television device mounted on a portable terminal such as a cellular phone, a medium-sized television device that can be carried, and a large-sized (for example, 40-inch or larger) television device.

Figure 21E:
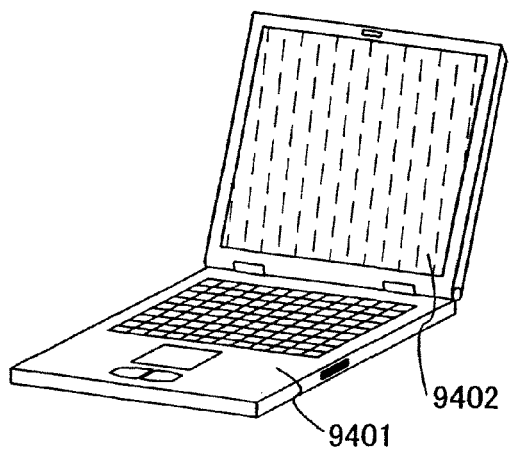

A portable computer illustrated in FIG. 21E includes a main body 9401, a display portion 9402, and the like. The display device of the present invention can be applied to the display portion 9402. Accordingly, a high-performance portable computer that can display high-quality images with high visibility can be provided.

Figure 21F:
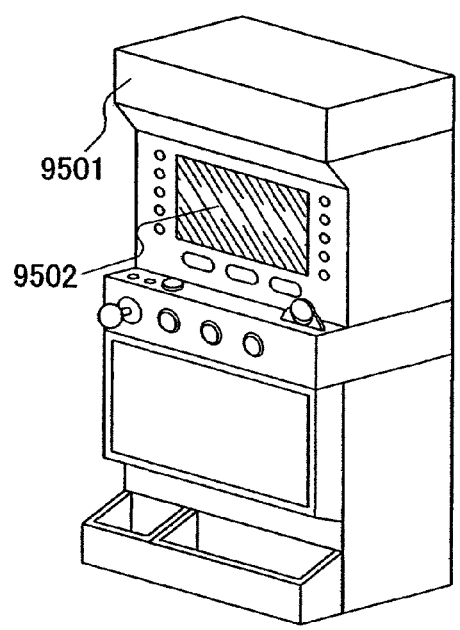

A slot machine illustrated in FIG. 21F includes a main body 9501, a display portion 9502, and the like. The display device of the present invention can be applied to the display portion 9502. Accordingly, a high-performance slot machine that can display high-quality images with high visibility can be provided.

As described above, using the display device of the present invention can provide a high-performance electronic device that can display high-quality images with high visibility.

This embodiment mode can be freely combined with any of Embodiment Modes 1 to 12.

This application is based on Japanese Patent Application serial no. 2006-327789 filed in Japan Patent Office on Dec. 5, 2006, the entire contents of which are hereby incorporated by reference.

EXPLANATION OF REFERENCE

50: electrode layer, 52: electroluminescent layer, 53: electrode layer, 54: insulating layer, 60: electrode layer, 61: light-emitting material, 62: electroluminescent layer, 63: electrode layer, 64: insulating layer, 100: substrate, 107: gate insulating layer, 167: insulating film, 168: insulating film, 176: protective layer, 177: pyramidal projection, 178: terminal electrode layer, 181: insulating film, 185: electrode layer, 186: insulating layer, 188: light-emitting layer, 189: electrode layer, 190: light-emitting element, 192: sealant, 193: filler, 194: FPC, 195: sealing substrate, 196: anisotropic conductive layer, 199: wiring layer, 201: cut-off region, 202: external terminal connection region, 203: wiring region, 204: peripheral driver circuit region, 206: pixel region, 207: peripheral driver circuit region, 208: peripheral driver circuit region, 209: peripheral driver circuit region, 209: external terminal connection region, 233: sealing region, 234: peripheral driver circuit region, 236: pixel region, 255: thin film transistor, 265: thin film transistor, 275: thin film transistor, 285: thin film transistor, 332: lamp reflector, 352: backlight unit, 395: electrode layer, 396: electrode layer, 401: cold cathode tube, 410: display device, 414: incident light ray from external, 415: reflected light ray, 416: protective layer, 450: display device, 451: pyramidal projection, 452: protective layer, 460: display device, 470: display device, 471: pyramidal projection, 480: display device, 481: pyramidal projection, 486: film, 490: display device, 491: pyramidal projection, 492: protective layer, 493: protective layer, 494: protective layer, 495: protective layer, 502: gate electrode layer, 504: semiconductor layer, 520: substrate, 521: transistor, 523: insulating layer, 524: substrate, 526: gate insulating layer, 528: partition (insulating layer), 529: pyramidal projection, 530: light-emitting element, 531: electrode layer, 532: electroluminescent layer, 533: electrode layer, 534: insulating layer, 536: protective layer, 538: substrate, 54a: insulating layer, 54b: insulating layer, 550: substrate, 551: transistor, 554: semiconductor layer, 556: polarizer, 557: insulating layer, 558: gate insulating layer, 560: pixel electrode layer, 561: insulating layer, 562: liquid crystal layer, 563: insulating layer, 564: conductive layer, 565: colored layer, 566: protective layer, 567: pyramidal projection, 568: substrate, 569: polarizer, 580: substrate, 581: transistor, 582: gate electrode layer, 584: gate insulating layer, 586: semiconductor layer, 589: spherical particle, 594: cavity, 597: pyramidal projection, 595: filler, 599: substrate, 596: protective layer, 598: insulating layer, 600: substrate, 602: external terminal connection region, 603: wiring region, 606: pixel region, 607: driver circuit region, 611: insulating film, 612: insulating film, 615: insulating film, 616: insulating film, 620: transistor, 621: transistor, 622: transistor, 623: capacitor, 630: pixel electrode layer, 631: insulating layer, 632: liquid crystal layer, 633: insulating layer, 634: conductive layer, 635: colored layer, 637: spacer, 641: polarizer, 642: pyramidal projection, 644: polarizer (pyramidal projection), 643: protective layer, Ma: insulating layer, 64b: insulating layer, 678: terminal electrode layer, 692: sealant, 694: FPC, 695: opposite substrate, 696: anisotropic conductive layer, 752: electroluminescent layer, 754: insulating layer, 756: protective layer, 757: pyramidal projection, 758: substrate, 759: substrate, 762: electroluminescent layer, 764: insulating layer, 765: partition (insulating layer), 768: protective layer, 769: substrate, 772: electroluminescent layer, 774: insulating layer, 775: partition (insulating layer), 776: insulating layer, 777: pyramidal projection, 778: substrate, 779: substrate, 792: electroluminescent layer, 794: insulating layer, 798: substrate, 799: substrate, 802: third layer, 803: second layer, 804: first layer, 850: electrode layer, 860: electroluminescent layer, 870: electrode layer, 901: pixel portion, 902: signal line driver circuit, 903: scan line driver circuit, 904: tuner, 905: video signal amplifier circuit, 906: video signal processing circuit, 907: control circuit, 908: signal dividing circuit, 909: audio signal amplifier circuit, 910: audio signal processing circuit, 911: control circuit, 912: input portion, 913: speaker, 101a: base film, 101b: base film, 1300: element substrate, 1305: display element, 1310: gate insulating layer, 1311: insulating film, 1312: insulating film, 1314: insulating layer, 1317: electrode layer, 1319: light-emitting layer, 1320: electrode layer, 1321: protective film, 1322: filler, 1324: wiring layer, 1325 sealing substrate, 1326: protective layer, 1327: pyramidal projection, 1332: sealant, 1333: wiring layer, 1355: thin film transistor, 1365: thin film transistor, 1375: thin film transistor, 1381: terminal electrode layer, 1382: anisotropic conductive layer, 1383: FPC, 1385: thin film transistor, 1600: element substrate, 1605: light-emitting element, 1610: gate insulating layer, 1611: insulating film, 1612: insulating film, 1614: insulating layer, 1617: electrode layer, 1619: light-emitting layer, 1620: electrode layer, 1621: protective film, 1622: filler, 1625: sealing substrate, 1632: sealant, 1633: wiring layer, 1655: thin film transistor, 1665: thin film transistor, 1675: thin film transistor, 1681: terminal electrode layer, 1682: anisotropic conductive layer, 1683: FPC, 1685: thin film transistor, 1700: substrate, 1703: liquid crystal layer, 1704: insulating layer, 1705: opposite electrode layer, 1706: colored layer, 1710: substrate, 1712: insulating layer, 1714: polarizing plate, 179a: wiring, 179b: wiring, 2001: chassis, 2002: display panel, 2003: main screen, 2004: modem, 2005: receiver, 2006: remote controller, 2007: display portion, 2008: sub screen, 2009: speaker portion, 2010: chassis, 2011: display portion, 2012: remote controller, 2013: speaker portion, 2600: TFT substrate, 2601: opposite substrate, 2602: sealant, 2603: pixel portion, 2604: display element, 2605: colored layer, 2606: polarizing plate, 2607: polarizing plate, 2608: driver circuit, 2609: flexible wiring board, 2610: cold cathode tube, 2611: reflection plate, 2612: circuit board, 2613: diffusion plate, 2626: pyramidal projection, 2627: protective layer, 2700: substrate, 2701: pixel portion, 2702: pixel, 2703: scan line input terminal, 2704: signal line input terminal, 2750: FPC, 2751: driver IC, 2800: substrate, 2801: protective circuit portion, 2802: TFT, 2803: TFT, 2804: light-emitting element, 2805: light-emitting element, 2809: driver circuit, 2810: wiring board, 2811: external circuit board, 2812: heat sink, 2813: heat pipe, 2815: insulating film, 2820: sealing substrate, 2827: pyramidal projection, 2828: protective layer, 2912: controller, 3700: substrate, 3701: pixel portion, 3702: scan line driver circuit, 3704: signal line driver circuit, 411a: pyramidal projection, 411b: pyramidal projection, 411c: pyramidal projection, 412a: transmitted light ray, 412b: reflected light ray, 412c: reflected light ray, 412d: reflected light ray, 413a: transmitted light ray, 413b: transmitted light ray, 413c: transmitted light ray, 413d: transmitted light ray, 4700: substrate, 4701: pixel portion, 4702: scan line driver circuit, 4704: signal line driver circuit, 5000: pyramidal projection, 503a: semiconductor layer, 5100: apex, 5200: conical projection, 5230: square pyramidal projection, 5250: triangular pyramidal projection, 525a: wiring layer, 525b: wiring layer, 5300: pyramidal projection, 5301: pyramidal projection, 552a: gate electrode layer, 553a: semiconductor layer, 555a: wiring layer, 585a: wiring layer, 585b: wiring layer, 587a: first electrode layer, 587b: first electrode layer, 588: second electrode layer, 590a: black region, 590b: white region, 604a: base film, 604b: base film, 608a: driver circuit region, 608b: driver circuit region, 751a: electrode layer, 751b: electrode layer, 751c: electrode layer, 753a: electrode layer, 753b: electrode layer, 753c: electrode layer, 759: substrate, 761a: electrode layer, 761b: electrode layer, 761c: electrode layer, 763a: electrode layer, 771a: electrode layer, 771b: electrode layer, 771c: electrode layer, 773b: electrode layer, 785: display element, 791a: electrode layer, 791b: electrode layer, 791c: electrode layer, 793b: electrode layer, 9101: main body, 9102: display portion, 9201: main body, 9202: display portion, 9301: main body, 9302: display portion, 9401: display portion, 9402: display portion, 9701: display portion, 9702: display portion, 1301a: insulating film, 1301b: insulating film, 1601a: insulating film, 1601b: insulating film, 1627a: pyramidal projection, 1627b:

pyramidal projection, 1628a: protective layer, 1628b: protective layer, 1701a: pixel electrode layer, 1713: display element, 2806a: spacer, 2806b: spacer, 2807a: colored layer, 2807b: colored layer, 2807c: colored layer, 2910a: red light source, 2910b: green light source, 2910c: blue light source, 5001a to 5001f: pyramidal projections, 5005: display device, 5101a to 5101f: apexes, 5201a to 5201f: conical projections, 5231a to 5231h: square pyramidal projections, and 5251a to 5251l: triangular pyramidal projections

What is claimed is:

1. A light-emitting device comprising:
    a pair of substrates, wherein at least one of the pair of substrates is a light-transmissive substrate;
    a light-emitting element provided between the pair of substrates;
    a plurality of projections in contact with an outer side of the light-transmissive substrate; and
    a protective layer having a lower refractive index than the plurality of projections,
    wherein the protective layer is provided so as to fill a recess produced by an arrangement of the plurality of projections, and
    wherein a refractive index of each of the plurality of projections increases from an apex toward a base thereof.

2. The light-emitting device according to claim 1, wherein the plurality of projections are pyramidal,
    wherein each of the plurality of pyramidal projections has a hexagonal pyramidal shape.

3. The light-emitting device according to claim 1, wherein the light-emitting element comprises an organic compound as a light-emitting material.

4. The light-emitting device according to claim 1, wherein each of the plurality of projections is surrounded by six adjacent projections.

5. The light-emitting device according to claim 1, wherein an interval between apexes of the plurality of projections is less than or equal to 350 nm and a height of each of the projections is greater than or equal to 800 nm.

6. The light-emitting device according to claim 1, wherein a fill rate per unit area of a display screen with bases of the plurality of projections is greater than or equal to 80%.

7. The light-emitting device according to claim 1, wherein a height of each of the plurality of projections is five times or more larger than a base width of each of the plurality of projections.

8. The light-emitting device according to claim 1, wherein the plurality of projections include at least a first pyramidal projection and a second pyramidal projection adjacent to the first pyramidal projection, and
    wherein the plurality of projections is arranged so that a side of a base of the first projection is in contact with a side of a base of the second pyramidal projection.

9. The light-emitting device according to claim 1, wherein the plurality of projections is provided so as to attain an anti-reflection function.

10. The light-emitting device according to claim 1, wherein the apex of each of the plurality of projections protrudes from a top surface of the protective layer.

11. The light-emitting device according to claim 1, wherein the plurality of pyramidal projections is formed by a nanoimprinting.

12. A light-emitting device comprising:
    a pair of substrates, wherein at least one of the pair of substrates is a light-transmissive substrate;
    a light-emitting element provided between the pair of substrates;
    a plurality of projections in contact with an outer side of the light- transmissive substrate; and
    a protective layer having a lower refractive index than the plurality of projections,
    wherein apexes of the plurality of projections are evenly spaced from each other,
    wherein the protective layer is provided so as to fill a recess produced by an arrangement of the plurality of projections, and
    wherein a refractive index of each of the plurality of projections increases from an apex toward a base thereof.

13. The light-emitting device according to claim 12, wherein the plurality of projections are pyramidal,
    wherein each of the plurality of pyramidal projections has a hexagonal pyramidal shape.

14. The light-emitting device according to claim 12, wherein the light-emitting element comprises an organic compound as a light-emitting material.

15. The light-emitting device according to claim 12, wherein each of the plurality of projections is surrounded by six adjacent pyramidal projections.

16. The light-emitting device according to claim 12, wherein an interval between the apexes of the plurality of projections is less than or equal to 350 nm and a height of each of the projections is greater than or equal to 800 nm.

17. The light-emitting device according to claim 12, wherein a fill rate per unit area of a display screen with bases of the plurality of projections is greater than or equal to 80%.

18. The light-emitting device according to claim 12, wherein a height of each of the plurality of projections is five times or more larger than a base width of each of the plurality of projections.

19. The light-emitting device according to claim 12, wherein the plurality of projections include at least a first pyramidal projection and a second pyramidal projection adjacent to the first pyramidal projection, and
    wherein the plurality of projections is arranged so that a side of a base of the first pyramidal projection is in contact with a side of a base of the second pyramidal projection.

20. The light-emitting device according to claim 12, wherein the plurality of projections is provided so as to attain an anti-reflection function.

21. The light-emitting device according to claim 12, wherein the apex of each of the plurality of projections protrudes from a top surface of the protective layer.

22. The light-emitting device according to claim 12, wherein the plurality of projections is formed by a nanoimprinting.

23. The light-emitting device according to claim 1, wherein the protective layer comprises a same material as the plurality of projections.

24. The light-emitting device according to claim 12, wherein the protective layer comprises a same material as the plurality of projections.

* * * * *

UNITED STATES PATENT AND TRADEMARK OFFICE
CERTIFICATE OF CORRECTION

PATENT NO.         : 8,467,023 B2
APPLICATION NO.    : 13/323892
DATED              : June 18, 2013
INVENTOR(S)        : Jiro Nishida et al.

It is certified that error appears in the above-identified patent and that said Letters Patent is hereby corrected as shown below:

In the Specification:

Col. 48, line 4, "spectra of R, and B can" should read "spectra of R, G, and B can"

Col. 55, line 25, "spectra of R, and B can" should read "spectra of R, G, and B can"

Col. 63, line 50, "a whose gate is connected" should read "a TFT whose gate is connected"

Col. 65, line 30, "a display device has hi My" should read "a display device has highly"

In the Claims:

Col. 73, line 51, "base of the first projection" should read "base of the first pyramidal projection"

Signed and Sealed this
Twenty-eighth Day of January, 2014

Michelle K. Lee
*Deputy Director of the United States Patent and Trademark Office*